US012801265B2

(12) United States Patent
Duan et al.

(10) Patent No.: US 12,801,265 B2
(45) Date of Patent: Nov. 17, 2026

(54) METHOD AND APPARATUS FOR SCROLLING TO CAPTURE SCREENSHOT

(71) Applicant: HUAWEI TECHNOLOGIES CO., LTD., Guangdong (CN)

(72) Inventors: Yun Duan, Wuhan (CN); Wuquan Tang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 490 days.

(21) Appl. No.: 18/284,221

(22) PCT Filed: Mar. 26, 2022

(86) PCT No.: PCT/CN2022/083234
§ 371 (c)(1),
(2) Date: Sep. 26, 2023

(87) PCT Pub. No.: WO2022/206645
PCT Pub. Date: Oct. 6, 2022

(65) Prior Publication Data

US 2024/0371058 A1 Nov. 7, 2024

(30) Foreign Application Priority Data

Mar. 31, 2021 (CN) ......................... 202110350586.4

(51) Int. Cl.
*G06F 3/04842* (2022.01)
*G06F 3/0483* (2013.01)
(Continued)

(52) U.S. Cl.
CPC ........ *G06F 3/04842* (2013.01); *G06F 3/0483* (2013.01); *G06F 3/0485* (2013.01);
(Continued)

(58) Field of Classification Search
CPC ... G06T 11/60; G06T 2200/24; G06F 3/0483; G06F 3/0485; G06F 2203/04803; G06F 3/04842
See application file for complete search history.

(56) References Cited

U.S. PATENT DOCUMENTS 6,912,694 B1 6/2005 Harrison et al.
2017/0337168 A1* 11/2017 Kunze .................... H04L 67/02
(Continued)

FOREIGN PATENT DOCUMENTS

CN 105094628 A 11/2015
CN 110737386 A 1/2020
(Continued)

OTHER PUBLICATIONS

Camtasia: "Snagit 2019: Scrolling Capture", Nov. 1, 2017 (Nov. 1, 2017), XP093179414, total 2 pages.

*Primary Examiner* — Daniel Samwel
(74) *Attorney, Agent, or Firm* — WOMBLE BOND DICKINSON (US) LLP

(57) ABSTRACT

This application discloses a scrolling screenshot method. When displaying a multi-column interface, an electronic device may receive an operation of triggering scrolling screenshot by a user. In response to the operation, the electronic device may simultaneously/sequentially take scrolling screenshots of a plurality of display areas, to obtain column-wise screenshot images of the display areas. The electronic device may compare lengths of the column-wise screenshot images to obtain a long column-wise screenshot image and a short column-wise screenshot image. The electronic device extends, with reference to a length of the long column-wise screenshot image, the short column-wise screenshot image by a length the same as that of the long column-wise screenshot image, and splices the short column-wise screenshot image and the long column-wise
(Continued)

screenshot image together to obtain a long screenshot image. In this way, the long screenshot image with complete content can be obtained.

20 Claims, 57 Drawing Sheets

(51) Int. Cl.
*G06F 3/0485* (2022.01)
*G06T 11/60* (2026.01)

(52) U.S. Cl.
CPC .... *G06T 11/60* (2013.01); *G06F 2203/04803* (2013.01); *G06T 2200/24* (2013.01)

(56) References Cited

U.S. PATENT DOCUMENTS

| | | | | |
|---|---|---|---|---|
| 2018/0046341 | A1* | 2/2018 | Lee | G06F 3/04883 |
| 2020/0348825 | A1 | 11/2020 | Rogers et al. | |
| 2021/0064222 | A1* | 3/2021 | Mo | G06F 3/04842 |
| 2022/0206645 | A1* | 6/2022 | Zadina | G06F 3/04845 |
| 2022/0276768 | A1* | 9/2022 | Lei | G06F 40/169 |

FOREIGN PATENT DOCUMENTS

| | | | |
|---|---|---|---|
| CN | 110780796 | A | 2/2020 |
| CN | 111027293 | A | 4/2020 |

* cited by examiner

Memo application interface 300

Long column-wise screenshot image

Filled screenshot image

METHOD AND APPARATUS FOR SCROLLING TO CAPTURE SCREENSHOT

CROSS-REFERENCE TO RELATED APPLICATIONS

This application is a national stage of International Application No. PCT/CN2022/083234, filed on Mar. 26, 2022, which claims priority to Chinese Patent Application No. 202110350586.4, filed on Mar. 31, 2021. Both of the aforementioned applications are hereby incorporated by reference in their entireties.

TECHNICAL FIELD

This application relates to the terminal field, and in particular, to a scrolling screenshot method and apparatus.

BACKGROUND

Currently, most electronic devices provide a scrolling screenshot function, and a user may obtain a long screenshot image of a current display interface of an electronic device by using the function. However, when the electronic device performs scrolling screenshot on a multi-column interface, for example, the multi-column interface may be an interface 10 shown in FIG. 1A, a long screenshot image obtained by the electronic device has a repeated part, or the electronic device can obtain only an image of a display area (for example, a display area 11 shown in FIG. 1A) on a currently displayed multi-column interface.

SUMMARY

This application provides a scrolling screenshot method and a related apparatus, so that when an electronic device displays a multi-column interface, all page content of the multi-column interface can be captured, to obtain and display a long screenshot image. In this way, the electronic device may obtain a long screenshot image that includes all content of a displayed page and in which the content is not repeated, so that a user can take a screenshot and share the screenshot.

According to a first aspect, this application provides a scrolling screenshot method, including: An electronic device displays a first interface, where the first interface includes a first scrolling window and a second scrolling window: the first scrolling window displays a first part of a first page, and the second scrolling window displays a second part of a second page.

The electronic device controls, after the electronic device receives a first input for screenshot, the first scrolling window to display a third part of the first page in response to the first input. The electronic device controls the second scrolling window to display a fourth part of the second page.

The electronic device obtains a first long screenshot image through synthesis and displays the first long screenshot image, where the first long screenshot image includes the first part and the third part of the first page and the second part and the fourth part of the second page, and the first part, the second part, the third part, and the fourth part are different from each other.

In the scrolling screenshot method provided in this application, when the electronic device displays a multi-column interface, interface elements of the multi-column interface may be identified, the multi-column interface is divided into a plurality of display areas, a scrolling screenshot operation is separately performed on each display area, and images obtained by each display area are spliced together, to obtain a long screenshot image including all content of all pages in the multi-column interface. In this way, a user can be provided with a long screenshot image with complete content.

In an embodiment, after the electronic device controls the first scrolling window to display the third part of the first page, the method further includes: The electronic device receives a second input performed by the user on the first interface. That the electronic device controls the second scrolling window to display a fourth part of the second page includes: After receiving the second input, the electronic device controls the second scrolling window to display the fourth part of the second page in response to the second input. In this way, the electronic device may stop display of another part of the first page in advance, for example, a fifth part (where the fifth part is located below the third part), and discard page content that is not required by the user.

In an embodiment, that the electronic device controls the second scrolling window to display the fourth part of the second page includes: After the electronic device detects that the first scrolling window displays the bottom of the first page, the electronic device controls the second scrolling window to display the fourth part of the second page.

In an embodiment, after the electronic device controls the second scrolling window to display the fourth part of the second page, the method further includes: The electronic device receives a third input performed on the first interface. That the electronic device obtains a first long screenshot image through synthesis and displays the first long screenshot image includes: The electronic device obtains the first long screenshot image through synthesis and displays the first long screenshot image in response to the third input. In this way, the electronic device may stop display of another part of the second page in advance, for example, a sixth part (where the sixth part is located below the fourth part), and discard page content that is not required by the user.

In an embodiment, that the electronic device obtains a first long screenshot image through synthesis and displays the first long screenshot image includes: After the electronic device detects that the second scrolling window displays the bottom of the second page, the electronic device obtains the first long screenshot image through synthesis and displays the first long screenshot image.

In an embodiment, before the electronic device controls the first scrolling window to display the third part of the first page, the method further includes: The electronic device receives a first drag operation of dragging the first page upward by a user. That the electronic device controls the first scrolling window to display a third part of the first page includes: The electronic device controls the first scrolling window to display the third part of the first page in response to the first drag operation.

In an embodiment, after the electronic device controls the first scrolling window to display the third part of the first page, the method further includes: The electronic device controls the first scrolling window to display a fifth part of the first page, where the fifth part is below the third part of the first page, and the first long screenshot image further includes the fifth part of the first page.

In an embodiment, after the electronic device controls the first scrolling window to display the third part of the first page in response to the first drag operation, the method further includes: When duration in which the electronic device controls the first scrolling window to display the third part of the first page in response to the first drag operation is greater than a first preset time threshold, the electronic device controls the first scrolling window to display the first part of the first page. The electronic device controls the first scrolling window to automatically scroll to display the third part of the first page.

In an embodiment, that the electronic device controls the second scrolling window to display the fourth part of the second page includes: After receiving the first drag operation, the electronic device controls the second scrolling window to display the fourth part of the second page.

In an embodiment, after the electronic device controls the first scrolling window to display the third part of the first page, the method further includes: The electronic device controls the first scrolling window to display a fifth part of the first page, where the fifth part is below the third part of the first page. The electronic device receives a second drag operation of dragging the first page downward by the user. The electronic device controls the first scrolling window to display the third part of the first page in response to the second drag operation.

In an embodiment, after the electronic device controls the first scrolling window to display the third part of the first page in response to the second drag operation, the method further includes: The electronic device controls the first scrolling window to display the fifth part of the first page, where the first long screenshot image further includes the fifth part of the first page.

In an embodiment, after the electronic device controls the first scrolling window to display the third part of the first page in response to the second drag operation, the method further includes: When duration in which the electronic device controls the first scrolling window to display the first part of the first page in response to the second drag operation is greater than a second preset time threshold, the electronic device controls the first scrolling window to display the fifth part of the first page. The electronic device controls the first scrolling window to automatically scroll to display a seventh part of the first page, where the seventh part is below the fifth part of the first page, and the first long screenshot image further includes the fifth part of the first page and the seventh part of the first page.

In an embodiment, that the electronic device controls the second scrolling window to display the fourth part of the second page includes: After receiving the second drag operation, the electronic device controls the second scrolling window to display the fourth part of the second page.

In an embodiment, before the electronic device controls the second scrolling window to display the fourth part of the second page, the method further includes: The electronic device receives a third drag operation of dragging the second page upward by the user. That the electronic device controls the second scrolling window to display a fourth part of the second page includes: The electronic device controls the second scrolling window to display the fourth part of the second page in response to the third drag operation.

In an embodiment, after the electronic device controls the second scrolling window to display the fourth part of the second page, the method further includes: The electronic device controls the second scrolling window to display a sixth part of the second page, where the sixth part is below the fourth part of the second page, and the first long screenshot image further includes the sixth part of the second page.

In an embodiment, after the electronic device controls the second scrolling window to display the fourth part of the second page in response to the third drag operation, the method further includes: When duration in which the electronic device controls the second scrolling window to display the fourth part of the second page in response to the third drag operation is greater than a third preset time threshold, the electronic device controls the second scrolling window to display the second part of the second page. The electronic device controls the second scrolling window to automatically scroll to display the fourth part of the second page.

In an embodiment, that the electronic device controls the second scrolling window to display the fourth part of the second page includes: After the electronic device receives the first drag operation, the electronic device obtains the first long screenshot image through synthesis and displays the first long screenshot image.

In an embodiment, after the electronic device controls the second scrolling window to display the fourth part of the second page, the method further includes: The electronic device controls the second scrolling window to display a sixth part of the second page, where the sixth part is below the fourth part of the second page. The electronic device receives a fourth drag operation of dragging the second page downward by the user. The electronic device control the second scrolling window to display the fourth part of the second page in response to the fourth drag operation.

In an embodiment, after the electronic device controls the second scrolling window to display the fourth part of the second page in response to the second drag operation, the method further includes: The electronic device controls the second scrolling window to display the sixth part of the second page, where the first long screenshot image further includes the sixth part of the second page.

In an embodiment, after the electronic device controls the second scrolling window to display the fourth part of the second page in response to the second drag operation, the method further includes: When duration in which the electronic device controls the second scrolling window to display the second part of the second page in response to the second drag operation is greater than a fourth preset time threshold, the electronic device controls the second scrolling window to display the sixth part of the second page.

The electronic device controls the second scrolling window to automatically scroll to display an eighth part of the second page, where the eighth part is below the sixth part of the second page, and the first long screenshot image further includes the sixth part of the second page and the eighth part of the second page.

In an embodiment, that the electronic device controls the second scrolling window to display the fourth part of the second page includes: After receiving the second drag operation, the electronic device obtains the first long screenshot image through synthesis and displays the first long screenshot image.

In an embodiment, that the electronic device controls, after receiving a first input for screenshot, the first scrolling window to display a third part of the first page includes: The electronic device controls, from a first moment after receiving the first input, the first scrolling window to scroll to display the third part of the first page at a preset speed.

That the electronic device controls the second scrolling window to display a fourth part of the second page includes: The electronic device controls, from the first moment after receiving the first input, the second scrolling window to scroll to display the fourth part of the second page at the preset speed.

In an embodiment, the electronic device may simultaneously control two scrolling windows to scroll to display two pages. In an embodiment, the preset speed at which the electronic device controls the first page to scroll may be the same as or different from the preset speed for controlling the second page to scroll. In this way, a time required for scrolling screenshot can be reduced, and a long screenshot image can be obtained more quickly.

In an embodiment, the electronic device may receive an input performed by the user on the first scrolling window; and stop the first scrolling window from scrolling to display content at the bottom of the first page. The electronic device may receive an input performed by the user on the second scrolling window; and stop the second scrolling window from scrolling to display content at the bottom of the second page.

In an embodiment, after the electronic device displays the third part of the first page in the first scrolling window; and displays the fourth part of the second page in the second scrolling window, the method further includes: The electronic device receives a fourth input performed by a user on the first interface. That the electronic device obtains a first long screenshot image through synthesis and displays the first long screenshot image includes: The electronic device obtains the first long screenshot image through synthesis and displays the first long screenshot image in response to the fourth input.

In this way, the electronic device may stop, in advance, displaying content below a corresponding page in the two scrolling windows in a scrolling manner, to obtain a long screenshot image that includes all content of the page that has been displayed before the input operation.

In an embodiment, the method further includes: The electronic device receives a fifth input performed by the user on the first interface. The electronic device controls to change the preset speed at which the first scrolling window scrolls to display in response to the fifth input. In this way, the electronic device can accelerate or reduce the preset speed, thereby saving a time for scrolling screenshot.

In an embodiment, the method further includes: The electronic device captures, in response to the first input, the first part of the first page displayed in the first scrolling window, to obtain a first image. When the electronic device controls the first scrolling window to display the third part of the first page, the electronic device captures the third part of the first page displayed in the first scrolling window: to obtain a third image. The electronic device obtains a first column-wise screenshot image through synthesis, where the first column-wise screenshot image includes the first image and the third image. The electronic device captures the second part of the second page in the second scrolling window: to obtain a second image. When the electronic device controls the first scrolling window to display the fourth part of the second page, the electronic device captures the fourth part of the second page displayed in the second scrolling window: to obtain a fourth image. The electronic device obtains a second column-wise screenshot image through synthesis, where the second column-wise screenshot image includes the second image and the fourth image. That the electronic device obtains a first long screenshot image through synthesis and displays the first long screenshot image includes: The electronic device synthesizes the first column-wise screenshot image and the second column-wise screenshot image to obtain the first long screenshot image, and displays the first long screenshot image.

In an embodiment, that the electronic device synthesizes the first column-wise screenshot image and the second column-wise screenshot image to obtain the first long screenshot image includes: The electronic device splices the second column-wise screenshot image in a first direction of the first column-wise screenshot image to obtain the first long screenshot image, where the second scrolling window is in the first direction of the first scrolling window:

In an embodiment, that the electronic device splices the second column-wise screenshot image in a first direction of the first column-wise screenshot image to obtain the first long screenshot image includes: When a length of the first column-wise screenshot image in a second direction is greater than a length of the second column-wise screenshot image in the second direction, the electronic device splices the second column-wise screenshot image in the first direction of the first column-wise screenshot image, and splices a preset background image in each of the first direction of the first column-wise screenshot image and the second direction of the second column-wise screenshot image.

The first direction is perpendicular to the second direction, a width of the preset background image in the first direction is the same as a width of the second column-wise screenshot image in the first direction, and a sum of a length of the preset background image in the second direction and the length of the second column-wise screenshot image in the second direction is the same as the length of the first column-wise screenshot image in the second direction.

In an embodiment, that the electronic device splices the second column-wise screenshot image in a first direction of the first column-wise screenshot image to obtain the first long screenshot image includes: When a length of the first column-wise screenshot image in a second direction is less than a length of the second column-wise screenshot image in the second direction, the electronic device splices the second column-wise screenshot image in the first direction of the first column-wise screenshot image, and splices a preset image in each of the second direction of the first column-wise screenshot image and a third direction of the second column-wise screenshot image.

The first direction is perpendicular to the second direction, the third direction is opposite to the first direction, a width of the preset background image in the first direction is the same as a width of the first column-wise screenshot image in the first direction, and a sum of a length of the preset background image in the second direction and the length of the first column-wise screenshot image in the second direction is the same as the length of the second column-wise screenshot image in the second direction.

In an embodiment, the preset background image includes: The preset background image may include a pure-color image or an image with a pattern. The pattern of the preset background image may be obtained by capturing the first column-wise screenshot image or the second column-wise screenshot image.

In an embodiment, the method further includes: displaying a ninth part of a third page in a third scrolling window; where the first interface further includes the third scrolling window. After the electronic device receives the first input for screenshot, the electronic device controls the third scrolling window to display a tenth part of the third page.

The first long screenshot image further includes the ninth part and the tenth part of the third page, where the first part, the second part, the third part, the fourth part, the ninth part, and the tenth part are different from each other. Similarly, the first interface may further include more scrolling windows.

According to a second aspect, this application provides another scrolling screenshot method, including: An electronic device displays a second interface, where the second interface includes a first display area and a second display area: the first display area displays a fourth page; and the second display area includes a fourth scrolling window; and the fourth scrolling window displays an eleventh part of a fifth page.

After the electronic device receives a sixth input performed by a user for screenshot, the electronic device captures the fourth page displayed in the first display area to obtain a third column-wise screenshot image, and captures the eleventh part of the fifth page displayed in the fourth scrolling window to obtain an eleventh image. The electronic device controls the fourth scrolling window to display a twelfth part of the fifth page, and the electronic device captures the twelfth part displayed in the fourth scrolling window to obtain a twelfth image.

The electronic device obtains a fourth column-wise screenshot image through synthesis, where the fourth column-wise screenshot image includes the eleventh image and the twelfth image. The electronic device splices the third column-wise screenshot image and the fourth column-wise screenshot image to obtain a second long screenshot image.

In this way, the electronic device may obtain a long screenshot image that is the same as the displayed page.

According to a third aspect, this application provides an electronic device, including one or more processors, a display screen, and one or more memories. The display screen and the one or more memories are coupled to the one or more processors. The one or more memories are configured to store computer program code, and the computer program code includes computer instructions. When the one or more processors execute the computer instructions, the electronic device is enabled to perform the scrolling screenshot method in any possible implementation of any one of the foregoing aspects.

According to a fourth aspect, an embodiment of this application provides a computer-readable storage medium, including computer instructions. When the computer instructions are run on an electronic device provided in this application, the electronic device is enabled to perform the scrolling screenshot method in any possible implementation of any one of the foregoing aspects.

According to a fifth aspect, an embodiment of this application provides a computer program product. When the computer program product is run on an electronic device, the electronic device is enabled to perform the scrolling screenshot method in any possible implementation of any one of the foregoing aspects.

DESCRIPTION OF EMBODIMENTS

The following clearly describes technical solutions in embodiments of this application in detail with reference to the accompanying drawings. In description of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists.

The following terms "first" and "second" are merely intended for a purpose of description, and shall not be understood as an indication or implication of relative importance or implicit indication of a quantity of indicated technical features. Therefore, a feature defined to be "first" or "second" may explicitly or implicitly include one or more features. In the description of embodiments of this application, unless otherwise specified. "a plurality of" refers to two or more.

A multi-column interface includes at least one scrolling window; and the scrolling window displays only a part of a long page each time. When an electronic device receives a slide operation performed by a user on the scrolling window; the electronic device may display another part of the long page. In the multi-column interface, another interface element is further included in a first direction of a position of the scrolling window: The first direction is a direction perpendicular to a scrolling direction of the long page. The another interface element may include a non-scrolling display element and/or another scrolling window. For example, a setting application interface 10 shown in FIG. 1A, a memo application interface 420 shown in FIG. 4B, a setting application interface 1700 shown in FIG. 17, and a split-screen interface 1800 shown in FIG. 18 are all multi-column interfaces.

Figure 1A:
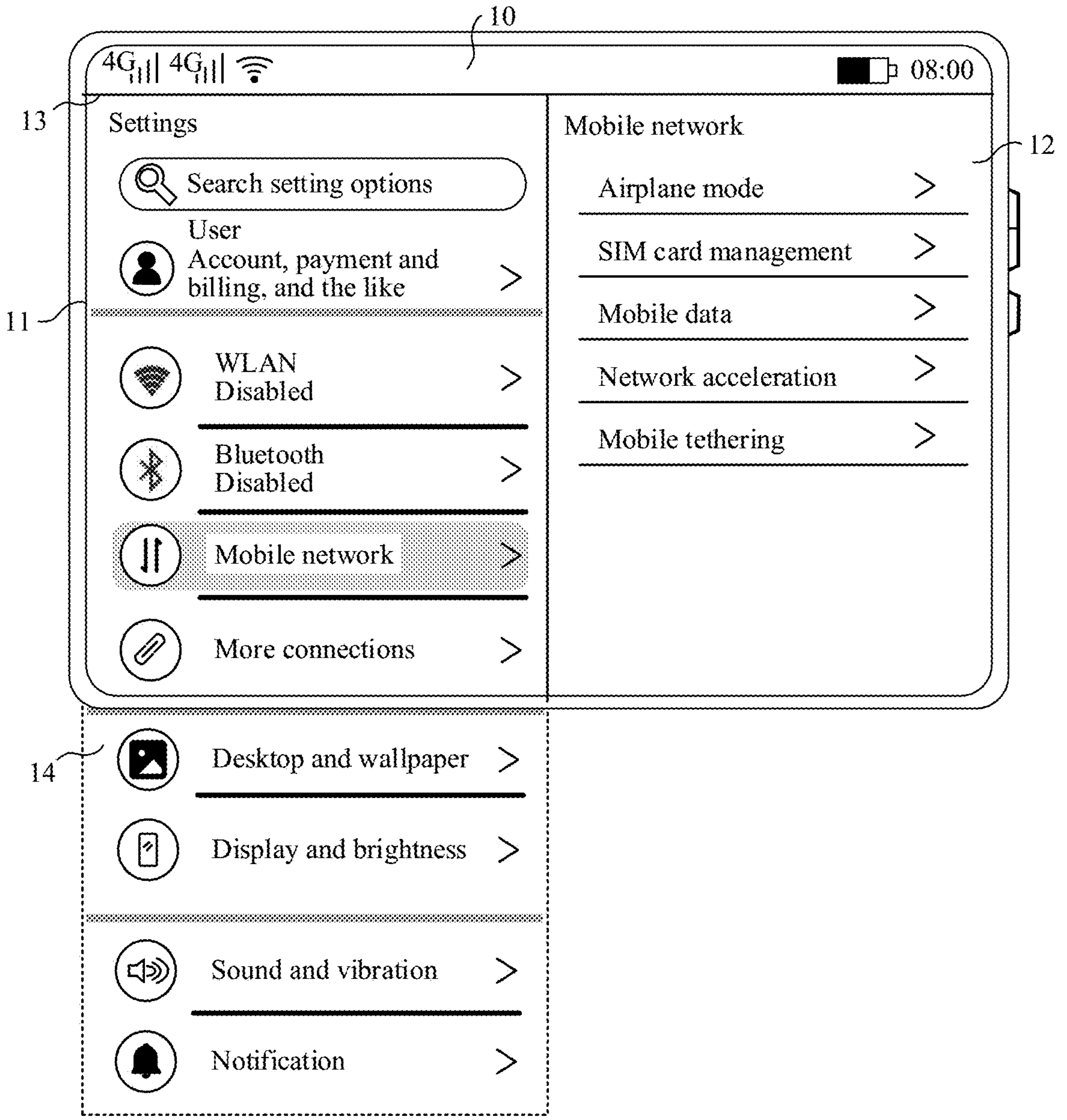
FIG. 1A to FIG. 1C show a scrolling screenshot scenario according to an embodiment of this application.
Figure 1B:
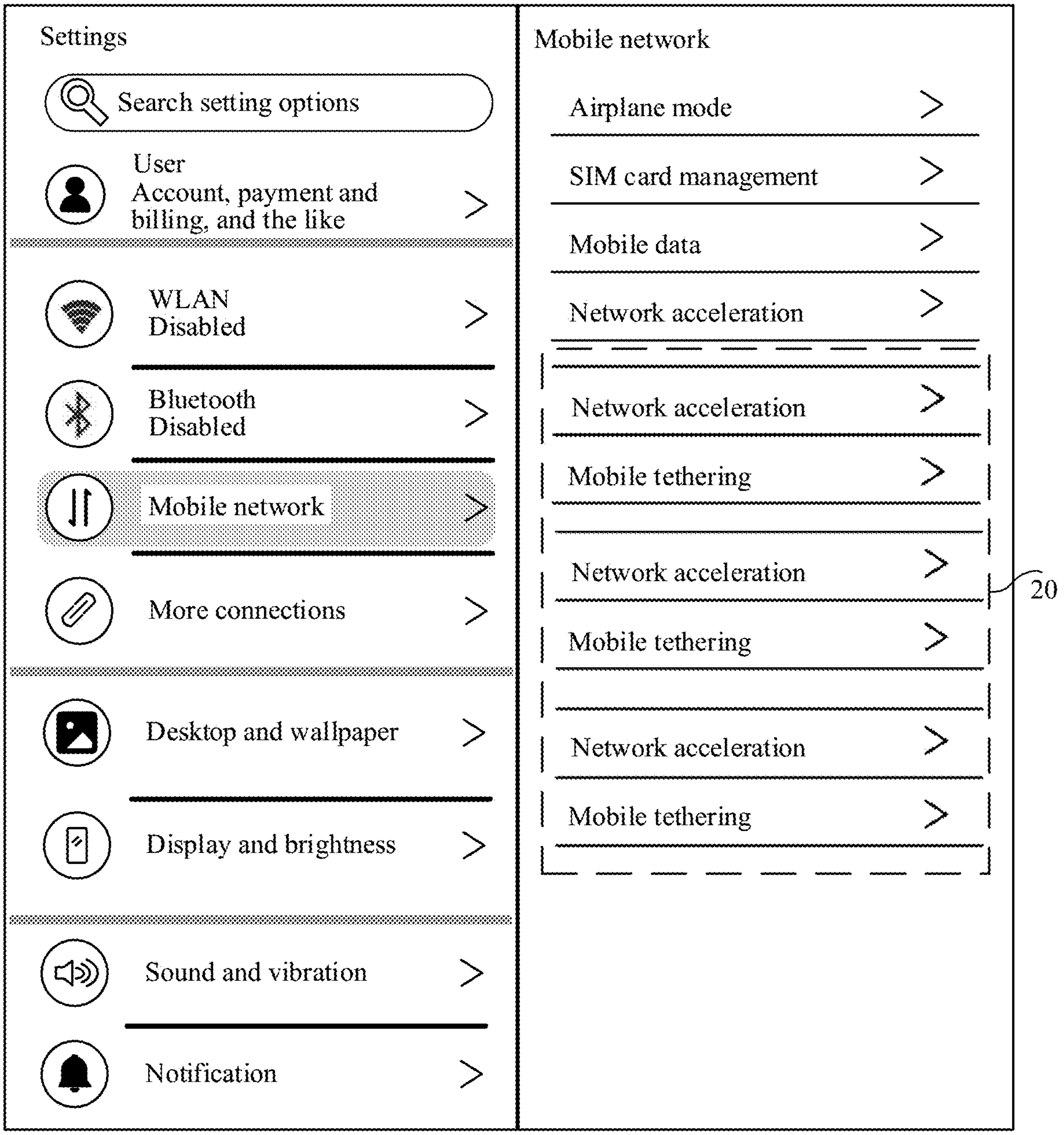
Figure 1C:
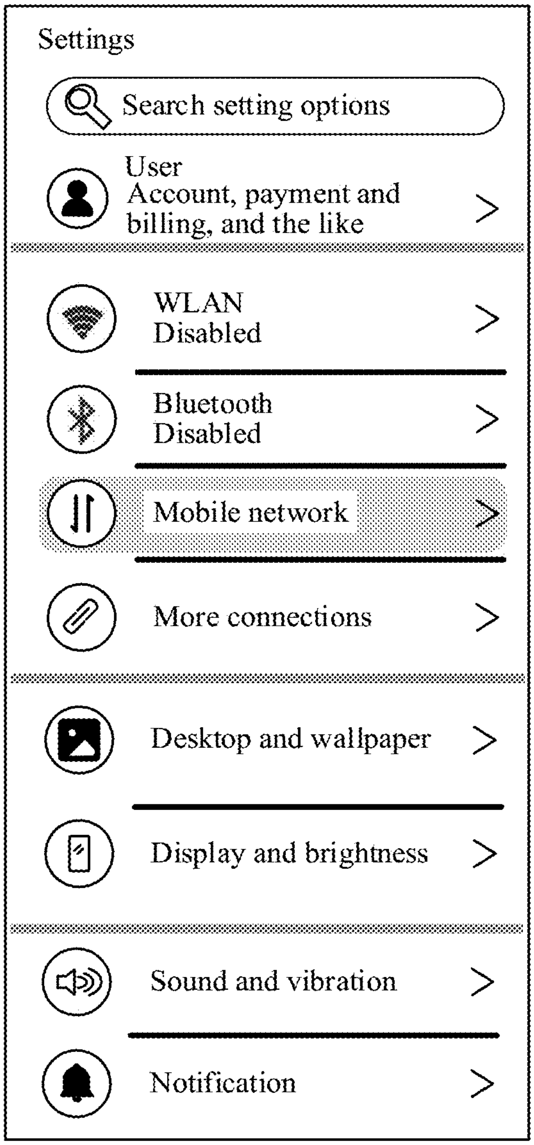

FIG. 1A to FIG. 1C show a scrolling screenshot scenario according to an embodiment of this application.

For example, the multi-column interface may be the setting application interface 10 shown in FIG. 1A. As shown in FIG. 1A, the setting application interface 10 may include a primary setting bar area 11 (which may also be referred to as a display area 11) and a secondary setting bar area 12. The primary setting bar area 11 includes a scrolling window 13, and the scrolling window 13 may display a part of a primary setting long page 14. The primary setting long page 14 includes a plurality of main setting options, for example, a user setting option, a WLAN setting option, a Bluetooth setting option, a mobile network setting option, a more connection setting option, a desktop and wallpaper setting option, a display and brightness setting option, a sound and vibration setting option, and a notification setting option.

As shown in FIG. 1A, the scrolling window currently displays only the user setting option, the WLAN setting option, the Bluetooth setting option, the mobile network setting option, and the more connection setting option. The desktop and wallpaper setting option, the display and brightness setting option, the sound and vibration setting option, and the notification setting option are not currently displayed in the scrolling window 13. The secondary setting bar area 12 includes a plurality of secondary setting options (for example, an airplane mode setting option, a SIM card management option, and the like).

When the electronic device takes a scrolling screenshot of the setting application interface 10 shown in FIG. 1A, the electronic device may control the long page 14 to scroll and take a screenshot. After the long page 14 is scrolled to the bottom, the electronic device splices a plurality of screenshot images into a long screenshot image. When the electronic device splices the plurality of screenshot images, display content of the secondary setting bar area 12 in the plurality of screenshot images is spliced with display content of the scrolling window 13. As a result, the display content of the secondary setting bar area 12 overlaps in the long screenshot image. As shown in FIG. 1B, the long screenshot image includes repeated content in the secondary setting bar area 12. For example, a dashed-line box 20 shows the repeated content in the long screenshot image.

When taking a scrolling screenshot of the setting application interface 10 shown in FIG. 1A, the electronic device may control the long page 14 to scroll and take a screenshot. After the long page 14 is scrolled to the bottom, the electronic device splices a plurality of screenshot images into a long screenshot image. When splicing the plurality of screenshot images, the electronic device first removes display content of the secondary setting bar area 12 in the plurality of screenshot images. For a long screenshot image finally spliced, refer to FIG. 1C. Because the obtained long screenshot image includes only content of the primary setting bar area 11, content displayed in the long screenshot image is incomplete.

In view of this, embodiments of this application provide a scrolling screenshot method. When displaying a multi-column interface, an electronic device may receive an operation of triggering scrolling screenshot by the user. In response to the operation, the electronic device may simultaneously/sequentially take scrolling screenshots of a plurality of display areas obtained by dividing an actual column line, to obtain column-wise screenshot images of the display areas. The electronic device may compare lengths of the column-wise screenshot images to obtain a long column-wise screenshot image and a short column-wise screenshot image. The electronic device fills, by using a length of the long column-wise screenshot image as a standard, the short column-wise screenshot image with a length the same as that of the long column-wise screenshot image, and splices the short column-wise screenshot image and the long column-wise screenshot image together to obtain a long screenshot image. In this way, a problem of repeated content of a scrolling screenshot can be resolved, to obtain a long screenshot image with complete content.

The following describes an electronic device provided in embodiments of this application.

An electronic device 100 may be a mobile phone, a tablet computer, a desktop computer, a laptop computer, a handheld computer, a notebook computer, an ultra-mobile personal computer (UMPC), a netbook, a cellular phone, a personal digital assistant (PDA), an augmented reality (AR) device, a virtual reality (virtual reality. VR) device, an artificial intelligence (AI) device, a wearable device, a vehicle-mounted device, a smart home device, and/or a smart city device. A type of the electronic device is not specially limited in an embodiment of the application.

Figure 2A:
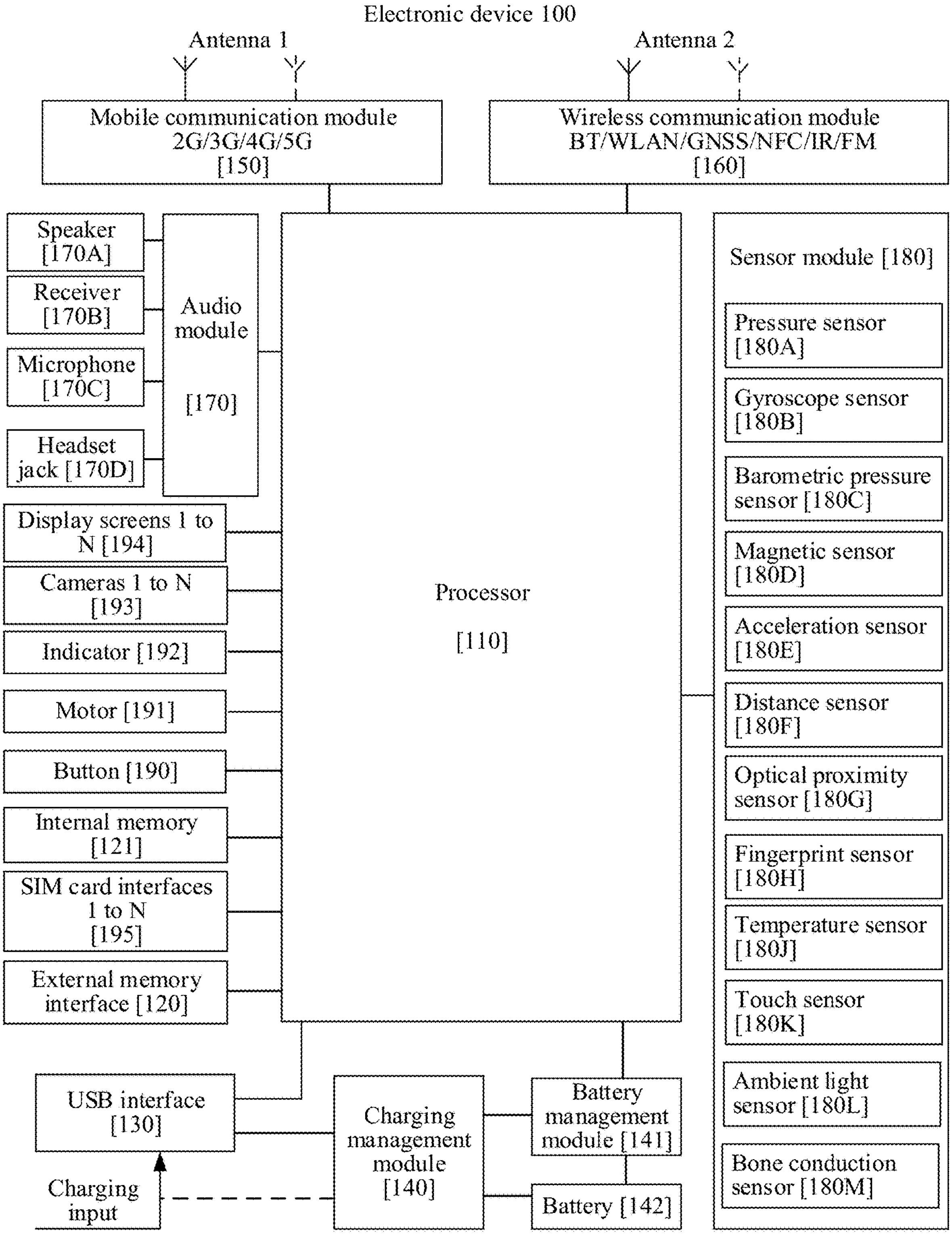
FIG. 2A is a schematic diagram of a structure of an electronic device 100 according to an embodiment of this application.

FIG. 2A is a schematic diagram of a structure of an electronic device 100.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure in an embodiment of the present application does not constitute a limitation on the electronic device 100. In some other embodiments of this application, the electronic device 100 may further include more or fewer components than those shown in the figure, some components may be combined, some components may be split, or different component arrangements may be used. The components in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces a waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) interface, and/or the like.

It may be understood that an interface connection relationship between the modules that is shown in an embodiment of the present application is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive charging input from a charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input by using a wireless charging coil of the electronic device 100. When charging the battery 142, the charging management module 140 may supply power to the electronic device by using the power management module 141.

The power management module 141 is configured to connect the battery 142, the charging management module 140, and the processor 110. The power management module 141 receives an input from the battery 142 and/or the charging management module 140, and supplies power to the processor 110, the internal memory 121, the display screen 194, the camera 193, the wireless communication module 160, and the like. The power management module 141 may be further configured to monitor parameters such as a battery capacity, a battery cycle count, a battery health status (electric leakage or impedance), and the like. In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communication module 150 may provide a solution to wireless communication such as 2G/3G/4G/5G applied to the electronic device 100. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same device.

The modem processor may include a modulator and a demodulator. The modulator is configured to modulate a to-be-sent low-frequency baseband signal into a medium- and high-frequency signal. The demodulator is configured to demodulate the received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display screen 194. In some embodiments, the modem processor may be an independent device. In some other embodiments, the modem processor may be independent of the processor 110, and is disposed in a same device as the mobile communication module 150 or another functional module.

The wireless communication module 160 may provide a wireless communication solution that is applied to the electronic device 100 and that includes a wireless local area network (WLAN) (for example, a wireless fidelity (Wi-Fi) network). Bluetooth (BT), a global navigation satellite system (GNSS), frequency modulation (FM), a near field communication (NFC) technology, an infrared (IR) technology, and the like. The wireless communication module 160 may be one or more devices integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 may implement a display function by using the GPU, the display screen 194, the application processor, and the like. The GPU is a microprocessor for image processing, and is connected to the display screen 194 and the application processor. The GPU is configured to perform mathematical and geometric calculation, and is used for graphics rendering. The processor 110 may include one or more GPUs, and execute program instructions to generate or change display information.

The display screen 194 is configured to display an image, a video, and the like. The display screen 194 includes a display panel. The display panel may use a liquid crystal display (LCD), an organic light-emitting diode (OLED), an active-matrix organic light emitting diode (AMOLED), a flex light-emitting diode (FLED), a mini-LED, a micro-LED, a micro-OLED, a quantum dot light emitting diode (QLED), or the like. In some embodiments, the electronic device 100 may include one or N display screens 194, where N is a positive integer greater than 1.

The electronic device 100 may implement a photographing function by using the ISP, the camera 193, the video codec, the GPU, the display screen 194, the application processor, and the like.

The ISP is configured to process data fed back by the camera 193. For example, during photographing, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image is generated for an object by using the lens and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal, and may further process another digital signal in addition to a digital image signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (MPEG)-1, MPEG-2. MPEG-3. MPEG-4, and the like.

The NPU is a neural-network (NN) computing processor, quickly processes input information by referring to a structure of a biological neural network, for example, a transmission mode between neurons in a human brain, and may further continuously perform self-learning. The NPU can implement applications such as intelligent cognition of the electronic device 100, for example, image recognition, facial recognition, speech recognition, and text understanding.

The external memory interface 120 may be configured to connect to an external non-volatile memory: to extend a storage capability of the electronic device 100. The external non-volatile memory communicates with the processor 110 by using the external memory interface 120, to implement a data storage function, for example, storing a file such as a music or a video in the external non-volatile memory.

The internal memory 121 may be configured to store computer-executable program code. The executable program code includes instructions. The processor 110 runs the instructions stored in the internal memory 121, to perform various function applications and data processing of the electronic device 100. The internal memory 121 may include a program storage area and a data storage area. The program storage area may store an operating system, an application required by at least one function (for example, a voice playing function or an image playing function), and the like. The data storage area may store data (for example, audio data or an address book) and the like created during use of the electronic device 100. In addition, the internal memory 121 may include a high-speed random access memory, and may further include a non-volatile memory, for example, at least one magnetic disk storage device, a flash memory, or a universal flash storage (UFS).

The electronic device 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal output, and is further configured to convert an analog audio input into a digital audio signal.

The speaker 170A, also referred to as a “horn”, is configured to convert an audio electrical signal into a sound signal.

The receiver 170B, also referred to as an “earpiece”, is configured to convert an audio electrical signal into a sound signal.

The microphone 170C, also referred to as a “mike” or a “mic”, is configured to convert a sound signal into an electrical signal.

The pressure sensor 180A is configured to sense a pressure signal, and can convert the pressure signal into an electrical signal. In some embodiments, the pressure sensor 180A may be disposed on the display screen 194. The gyroscope sensor 180B may be configured to determine a motion posture of the electronic device 100. The barometric pressure sensor 180C is configured to measure barometric pressure. The magnetic sensor 180D includes a Hall sensor, and opening and closing of a flip cover may be detected by using the magnetic sensor 180D. The acceleration sensor 180E may detect magnitudes of accelerations of the electronic device 100 in all directions (usually on three axes). The distance sensor 180F is configured to measure a distance. The optical proximity sensor 180G may also be used in a flip cover mode or a pocket mode to automatically perform screen unlocking or locking. The ambient light sensor 180L is configured to sense luminance of ambient light. The fingerprint sensor 180H is configured to collect a fingerprint. The temperature sensor 180J is configured to detect a temperature. The touch sensor 180K is also referred to as a "touch panel". The touch sensor 180K may be disposed on the display screen 194, and the touch sensor 180K and the display screen 194 form a touchscreen, which is also referred to as a "touch screen". The touch sensor 180K is configured to detect a touch operation performed on or near the touch sensor. The touch sensor may transfer the detected touch operation to the application processor, to determine a touch event type. A visual output related to the touch operation may be provided through the display screen 194. In some other embodiments, the touch sensor 180K may alternatively be disposed on a surface of the electronic device 100, and is at a position different from that of the display screen 194. The bone conduction sensor 180M may obtain a vibration signal. The button 190 includes a power button, a volume button, and the like. The motor 191 may generate a vibration prompt. The indicator 192 may be an indicator light, and may be configured to indicate a charging state and a power change, or may be configured to indicate a message, a missed call, a notification, and the like. The SIM card interface 195 is configured to connect to a SIM card.

The following describes a schematic diagram of a software structure of an electronic device 100 according to an embodiment of this application.

A software system of the electronic device 100 may use a layered architecture, an event-driven architecture, a microkernel architecture, a micro service architecture, or a cloud architecture. In an embodiment of the present application, an Android system with a layered architecture is used as an example to illustrate the software structure of the electronic device 100.

Figure 2B:
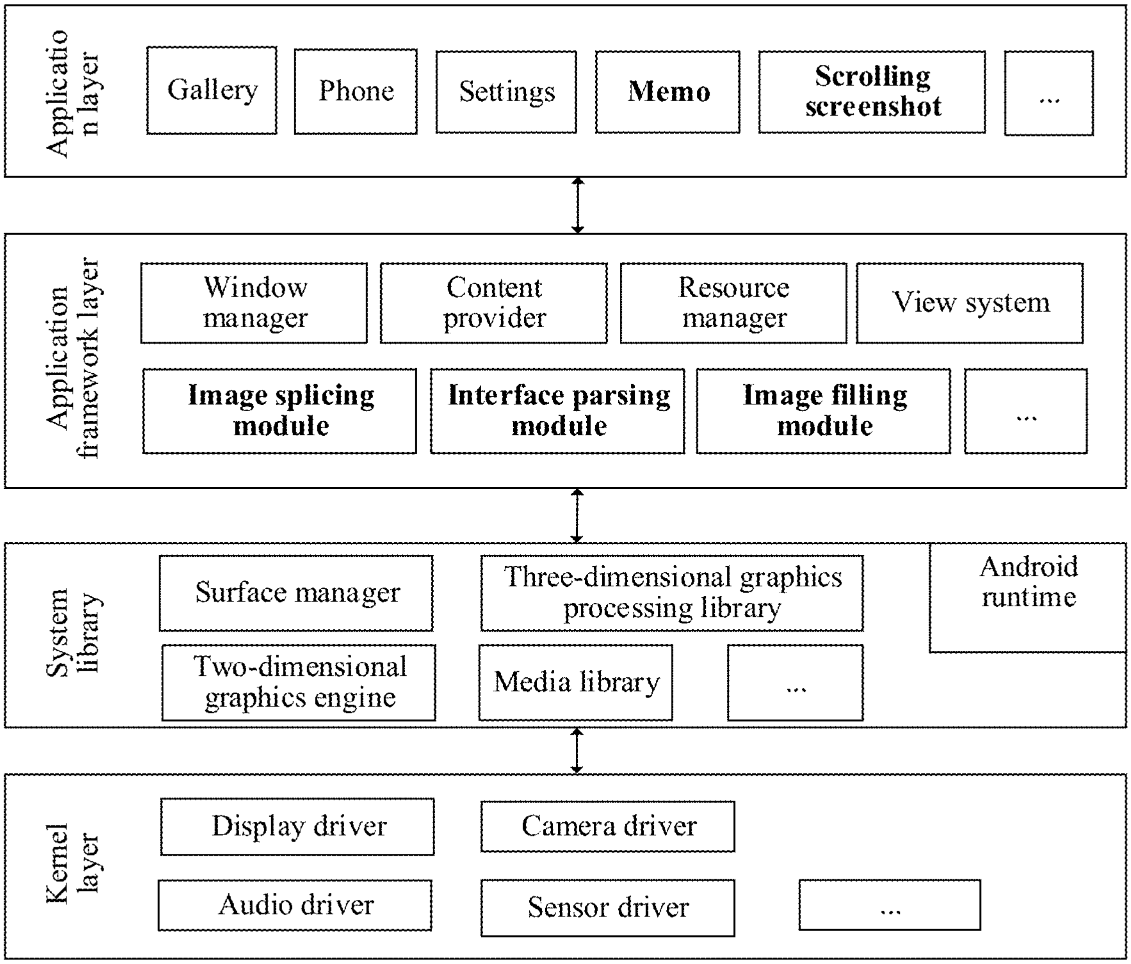
FIG. 2B is a block diagram of a software structure of an electronic device 100 according to an embodiment of this application.

FIG. 2B is a block diagram of a software structure of an electronic device 100 according to an embodiment of the present application.

In a layered architecture, software is divided into several layers, and each layer has a clear role and task. The layers communicate with each other through software interfaces. In some embodiments, the Android system is divided into four layers, namely, an application layer, an application framework layer, an Android runtime and system library, and a kernel layer from top to bottom.

The application layer may include a series of application packages.

As shown in FIG. 2B, the application package may include applications such as Gallery, Phone, Settings, Memo, Scrolling screenshot, and the like.

A scrolling screenshot application may invoke some generic interface functions to control scrolling of a long page in the multi-column interface and take a screenshot of an interface currently displayed by the electronic device 100. The scrolling screenshot application may further splice obtained screenshot images to obtain a long screenshot image. The scrolling screenshot application may generate an interface for displaying the long screenshot image, and the interface includes a plurality of controls configured to edit the long screenshot image.

The application framework layer provides an application programming interface (API) and a programming framework for the applications at the application layer. The application framework layer includes some predefined functions.

The application framework layer may include a window manager, a content provider, a resource manager, a view system, an image splicing module, an interface parsing module, an image filling module, and the like.

The window manager is configured to manage a window program. The window manager may obtain a size of the display screen, determine whether there is a status bar, perform screen locking, take a screenshot, and the like.

The content provider is configured to store and obtain data, and enable the data to be accessed by an application. The data may include a video, an image, an audio, calls that are made and answered, a browsing history and bookmarks, an address book, and the like.

The resource manager provides various resources for an application, for example, a localized character string, an icon, a picture, a layout file, and a video file.

The view system includes visual controls such as a control for displaying text and a control for displaying a picture. The view system may be configured to construct an application. The display interface may include one or more views. For example, a display interface including an SMS notification icon may include a view for displaying text and a view for displaying a picture.

The interface parsing module may obtain an actual column line in a multi-column interface currently displayed by the electronic device 100. The interface parsing module may further obtain all interface elements of the interface, to obtain a suspected column line and a scrollable scrolling window: The interface parsing module may further determine an actual column line.

The image splicing module may control scrolling of a long page in a currently displayed interface. The image splicing module may further capture a screenshot image of the currently displayed interface. The image splicing module may compare pixels of two images to obtain a same area and different areas of the two images. The image splicing module can splice a plurality of images. In other words, the image splicing module may remove repeated areas from a plurality of screenshot images and then splice the plurality of screenshot images, to obtain a column-wise screenshot image. The image screenshot module may further splice a filled screenshot image and a long column-wise screenshot image into a long screenshot image.

The image filling module may fill a short column-wise screenshot image. The image filling module may compare lengths of column-wise screenshot images, where a column-wise screenshot image with a longer length is a long column-wise screenshot image, and the other column-wise screenshot image is a short column-wise screenshot image. The image filling module may further calculate a difference between lengths of the long column-wise screenshot image and the short column-wise screenshot image, to obtain a size of a to-be-filled area of the short column-wise screenshot image. The image filling module may further generate a preset background image, and a size of the preset background image is the same as that of the to-be-filled area. The image filling module may splice the preset background image at the bottom of the short column-wise screenshot image, to obtain the filled screenshot image. The image filling module may splice the long column-wise screenshot image and the filled screenshot image to obtain the long screenshot image.

The Android runtime includes a kernel library and a virtual machine. The Android runtime is responsible for scheduling and managing the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording of a plurality of commonly used audio and video formats, static image files, and the like. The media library may support a plurality of audio and video encoding formats, for example, MPEG4, H.264, MP3, AAC, AMR. JPG, PNG, and the like.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

With reference to an application scenario, the following describes a scrolling screenshot method provided in embodiments of this application.

Figure 3A:
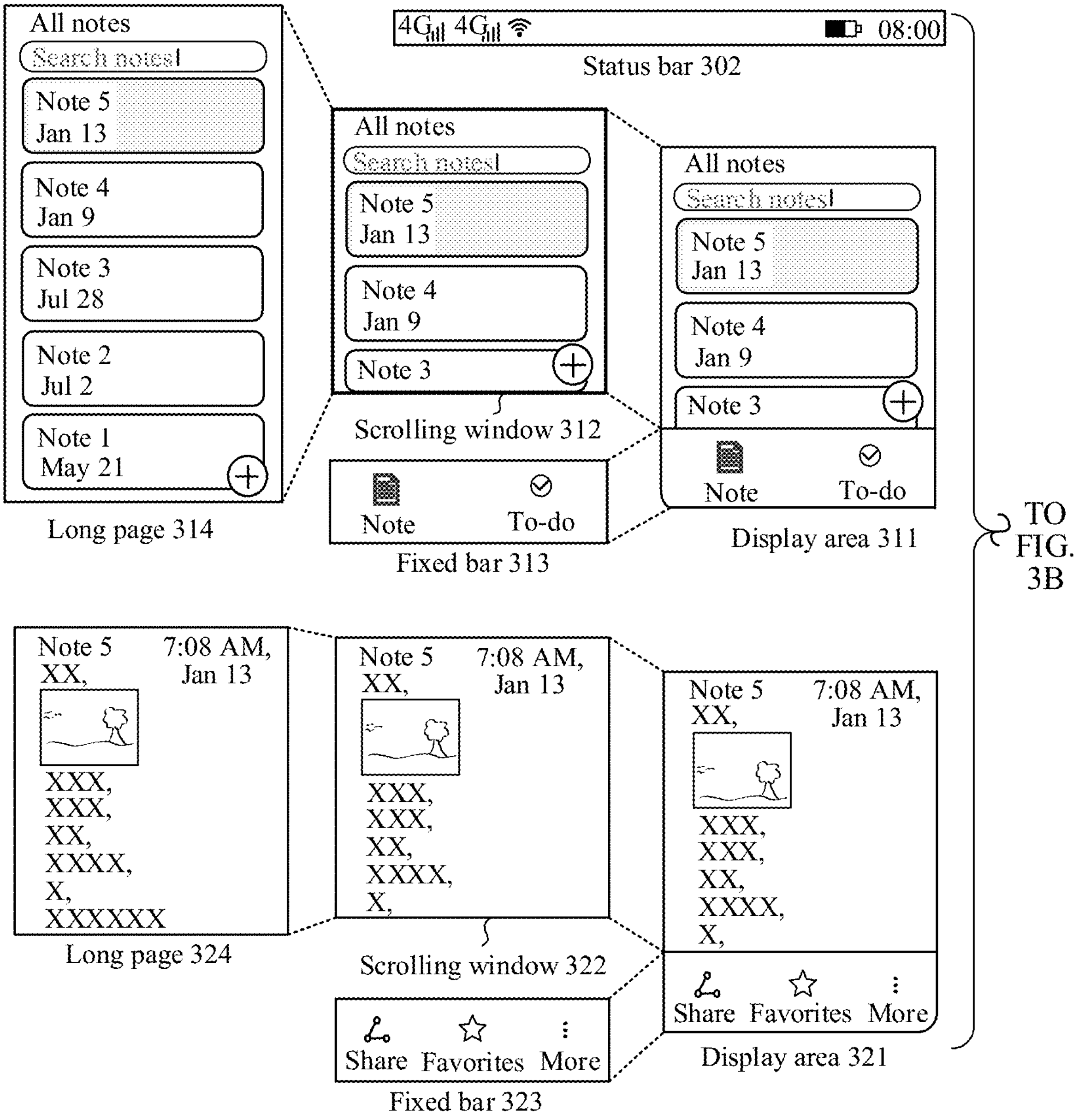
FIG. 3A and FIG. 3B is a schematic diagram of an interface according to an embodiment of this application.
Figure 3B:
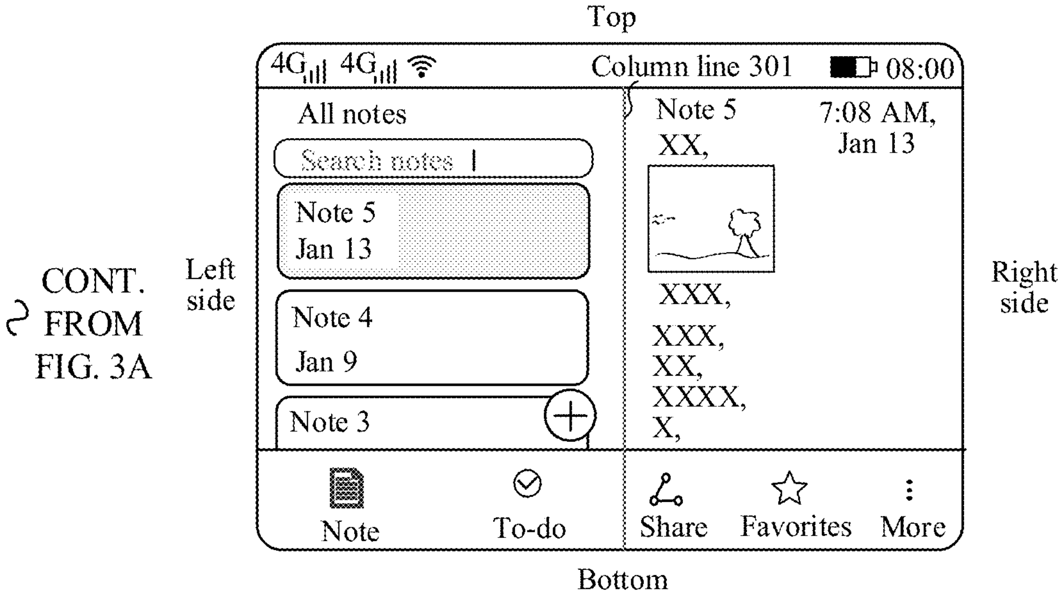

To better describe application scenario diagrams in FIG. 4A to FIG. 4L, the following describes a layout of interface elements on a multi-column interface with reference to FIG. 3A and FIG. 3B by using a memo application interface as an example.

For example, the multi-column interface may be a memo application interface 300 shown in FIG. 3A and FIG. 3B. An actual column line may separate a scrolling window in the multi-column interface from another interface element in the multi-column interface in a first direction of a position of the scrolling window: As shown in FIG. 3A and FIG. 3B, the memo application interface 300 may include but is not limited to a status bar 302, a display area 311, and a display area 321. The display area 311 and the display area 321 are separated by an actual column line 301. The status bar 302 may include but is not limited to a network signal identifier icon, a time identifier icon, a power identifier icon, and the like.

The display area 311 may include a scrolling window 312 and a fixed bar 313. The fixed bar 313 may include a "Note" icon, a "To-do" icon, and the like. A user may switch a note function or a to-do function by using the two icons. The scrolling window 312 may display a part of content of a long page 314. The page 314 may include a search box, a note list, a new note creation control, and the like. The electronic device 100 may receive an input operation (for example, a slide input for the long page 314) by the user, and display content of different parts of the long page 314 in the scrolling window 312.

The display area 321 may include a scrolling window 322 and a fixed bar 323. The fixed bar 323 may include a "Share" icon, a "Favorites" icon, a "More" icon, and the like. The scrolling window 322 may display a part of content of a long page 324. The page 324 may include content such as a note title, note content, a note storage time, and the like. The electronic device 100 may receive an input operation (for example, a slide input for the long page 324) by the user, and display content of different parts of the long page 324 in the scrolling window 322. As shown in FIG. 3A and FIG. 3B, relative positions of the top, the bottom, the left, and the right of the interface are marked. These positions may be used to describe a position on a touch screen of the electronic device, or a position on an interface displayed by the electronic device. In addition, downward means from top to bottom, upward means from bottom to top, rightward means from left to right, and leftward means from right to left. The description of the position is also applicable to subsequent descriptions of the accompanying drawings.

In some application scenarios, when taking a screenshot of an interface by using a scrolling screenshot application, the electronic device 100 may obtain a long screenshot image including a complete long page. The electronic device 100 may start to perform a scrolling screenshot operation on a current interface in response to an input operation (for example, sliding down with three fingers) by the user. The electronic device 100 may sequentially perform a scrolling screenshot operation (for example, first scrolling a left long page, and then scrolling a right long page) on a plurality of display areas, to obtain a column-wise screenshot image of each display area. The electronic device 100 may compare lengths of the column-wise screenshot images to obtain a long column-wise screenshot image and a short column-wise screenshot image. The electronic device 100 fills, by using a length of the long column-wise screenshot image as an example, the short column-wise screenshot image with a length the same as that of the long column-wise screenshot image, to obtain a filled screenshot image. The long column-wise screenshot image and the filled screenshot image are result images of each display area of an interface currently displayed by the electronic device 100 (where a result image of a display area includes all content of a long page of the display area). The electronic device 100 may splice (for example, splice left and right) the long column-wise screenshot image and the filled screenshot image to obtain a long screenshot image (where the long screenshot image is obtained after the electronic device 100 performs a scrolling screenshot operation on a currently displayed interface, and the long screenshot image includes content of all long pages of the currently displayed interface).

Figure 4A:
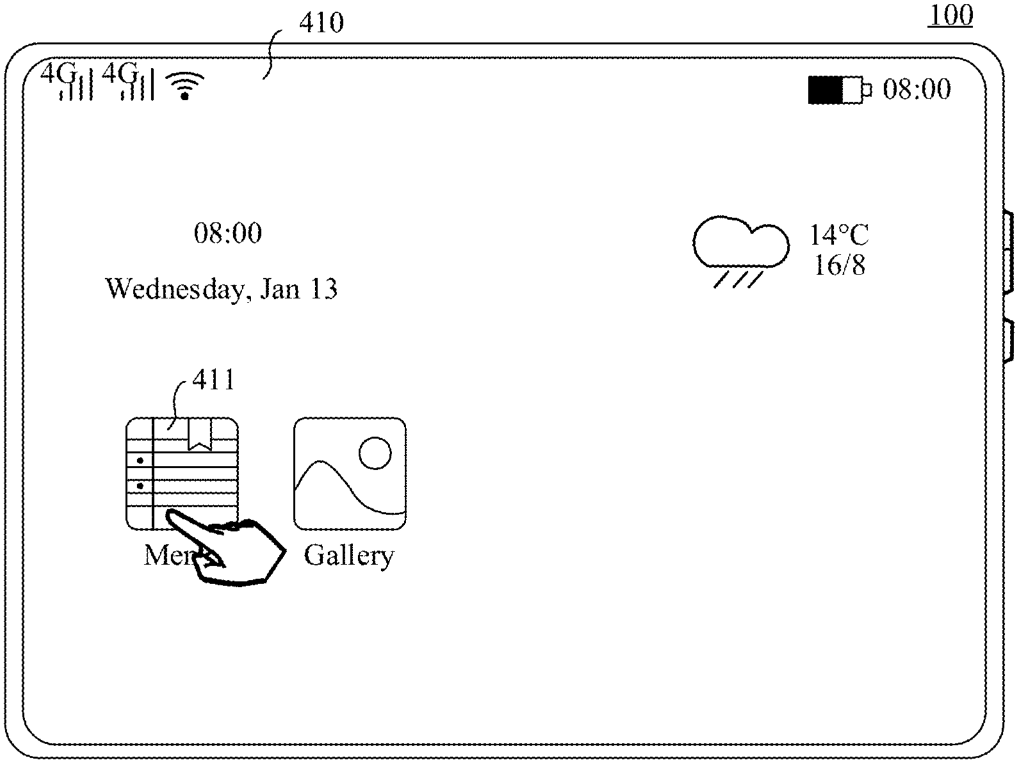
FIG. 4A to FIG. 4L are schematic diagrams of a group of interfaces according to an embodiment of this application.

For example, as shown in FIG. 4A, the electronic device 100 may display an interface 410 of a home screen. The interface 410 includes a page on which application icons are placed, and the page includes a plurality of application icons, for example, a weather application icon, a calendar application icon, a gallery application icon, a memo application icon 411, and the like. In an embodiment, a status bar including an icon such as a power identifier may be further displayed above the plurality of application icons.

Figure 4B:
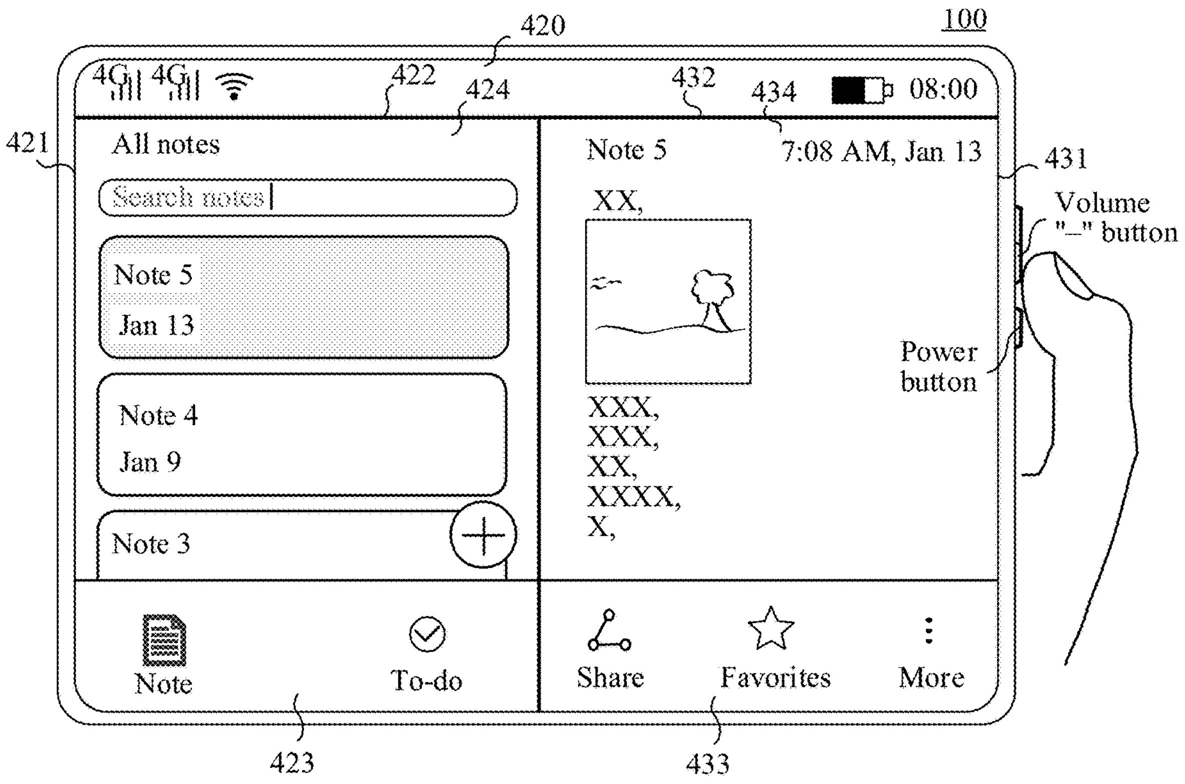

The electronic device 100 may receive an input operation (for example, single-tapping) by the user on the memo application icon 411, and in response to the input operation, the electronic device 100 may display a memo application interface 420 shown in FIG. 4B.

As shown in FIG. 4B, the memo application interface 420 may include a display area 421 and a display area 431. The display area 421 may include a scrolling window 422 and a fixed bar 423. The scrolling window 422 may display a part of content of a long page 424 in a scrolling display. The display area 431 may include a scrolling window 432 and a fixed bar 433. The scrolling window 432 may display a part of content of the long page 424 in a scrolling display. For a detailed description of the memo application interface 420, refer to the foregoing description of the memo application interface 300 in FIG. 3A and FIG. 3B. Details are not described herein again.

The electronic device 100 may receive an input operation (for example, simultaneously pressing a volume "–" button and a power button) by the user, and in response to the input operation, the electronic device 100 may take a screenshot of an image of a current display interface of the electronic device 100. The electronic device 100 may further display a floating window 441 on the memo application interface 420.

Figure 4C:
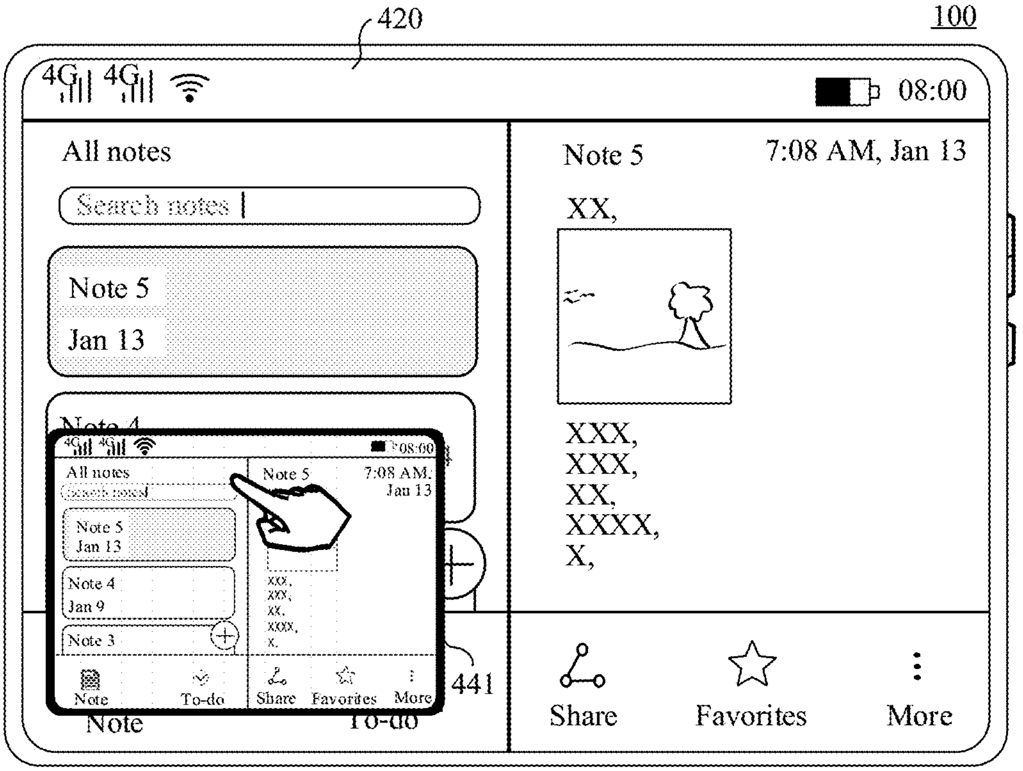

As shown in FIG. 4C, the electronic device 100 displays a floating window 441 on the memo application interface 420. The floating window 441 may include a screenshot image that is of the memo application interface 420 and that is taken by the electronic device 100. When the electronic device 100 receives different input operations by the user on the floating window 441, functions of sharing a picture, editing a picture, and scrolling screenshot may be triggered. For example, when the electronic device 100 receives a single-tap operation performed by the user on the floating window 441, the electronic device 100 may display: in response to the operation, an interface for editing a screenshot.

Figure 4D:
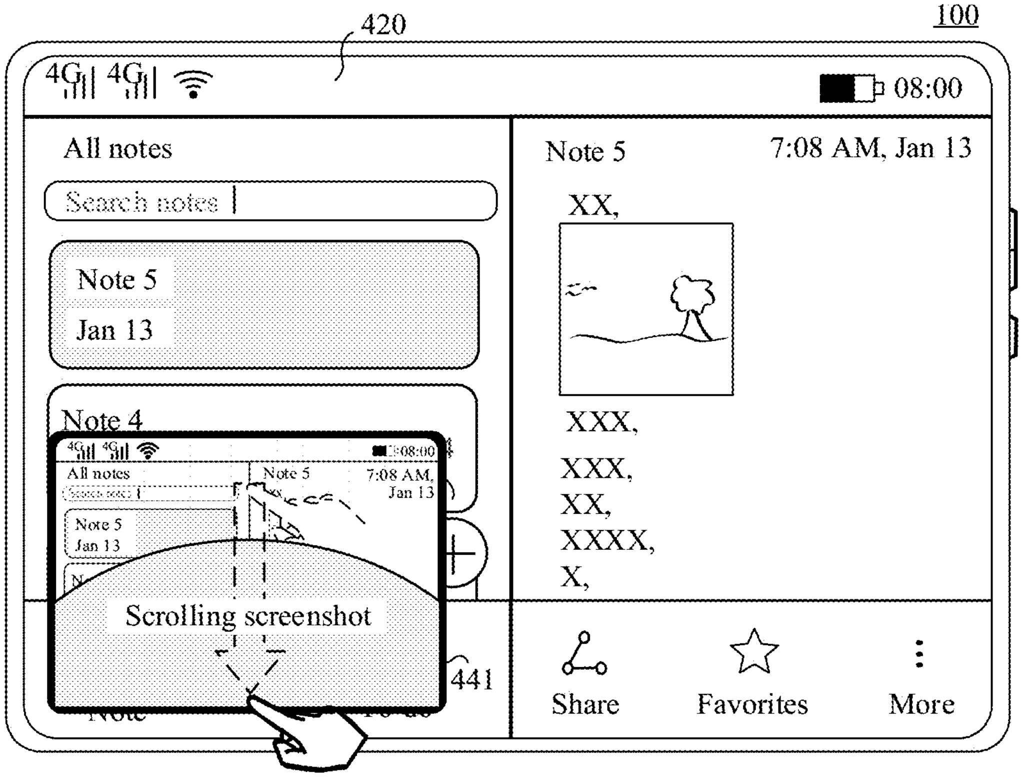
Figure 4E:
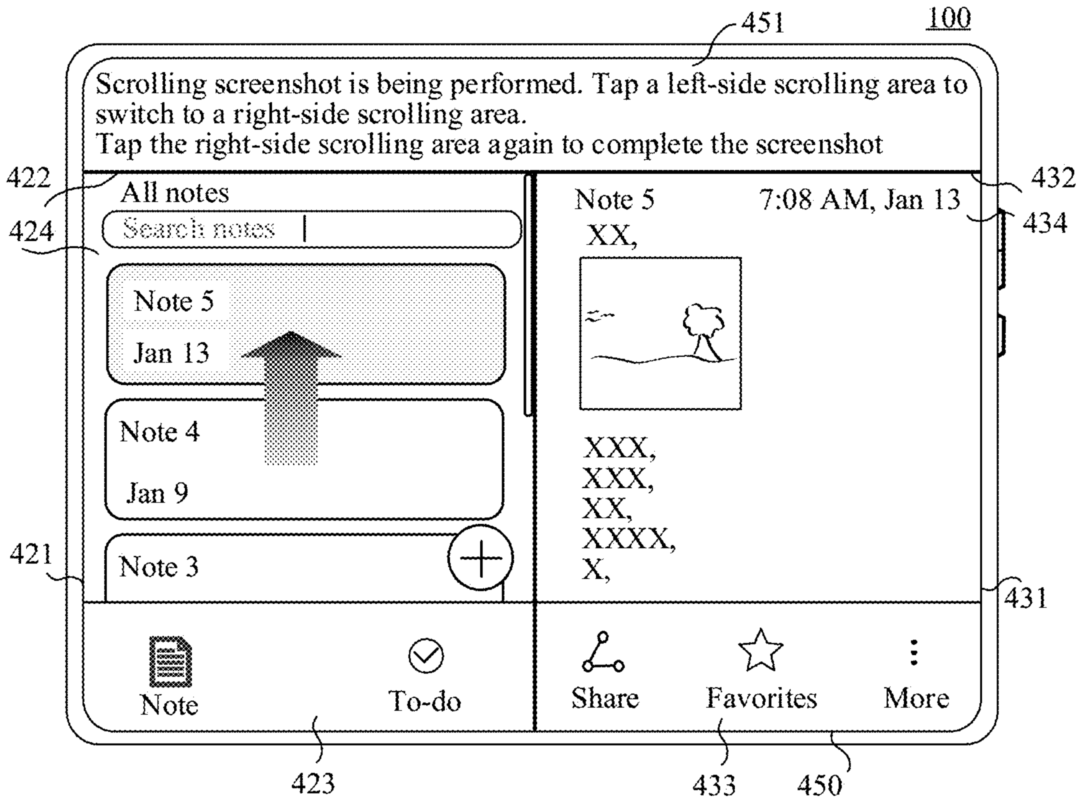

The electronic device 100 may receive an input operation (for example, sliding down) by the user on the floating window 441, and in response to the input operation, the electronic device 100 may display a scrolling screenshot interface 450 shown in FIG. 4E. In an embodiment, when the electronic device 100 receives the input operation, the electronic device 100 may control the floating window 441 to display text information "scrolling screenshot" (as shown in FIG. 4D), and the text information may prompt the user that the electronic device 100 starts to perform a scrolling screenshot operation. The electronic device 100 may obtain an actual column line of the memo application interface 420, and sequentially take a scrolling screenshot of the display area 421 and the display area 431.

For example, as shown in FIG. 4E, the electronic device 100 displays a scrolling screenshot interface 450. The scrolling screenshot interface 450 includes prompt information 451, a display area 421, and a display area 431. The prompt information 451 may prompt the user that the scrolling screenshot is being performed, or may prompt the user that a range of the screenshot may be controlled by performing a tap operation. For example, the prompt information 451 may include prompt text "Scrolling screenshot is being performed. Tap a left-side scrolling area to switch to a right-side scrolling area. Tap the right-side scrolling area again to complete the screenshot".

After receiving the input operation performed by the user on the floating control 441, the electronic device 100 may take a screenshot of an interface displayed by the electronic device 100. Then, the electronic device 100 controls the page 424 to scroll by a preset length each time. After controlling the page 424 to scroll by the preset length each time, the electronic device 100 takes a screenshot of an interface displayed by the electronic device 100.

For example, as shown in FIG. 4E, the electronic device 100 may take a screenshot of the scrolling screenshot interface 450) currently displayed. In the scrolling screenshot interface 450, the scrolling window 422 displays a top part of the page 424. In other words, the scrolling window 422 displays icons of all notes, a search box, a note 5 option, a note 4 option, and a note 3 option of the page 424. Then, the electronic device 100 may control the page 424 to scroll up by the preset length, and the electronic device 100 displays a scrolling screenshot interface 455 shown in FIG. 4F.

Figure 4F:
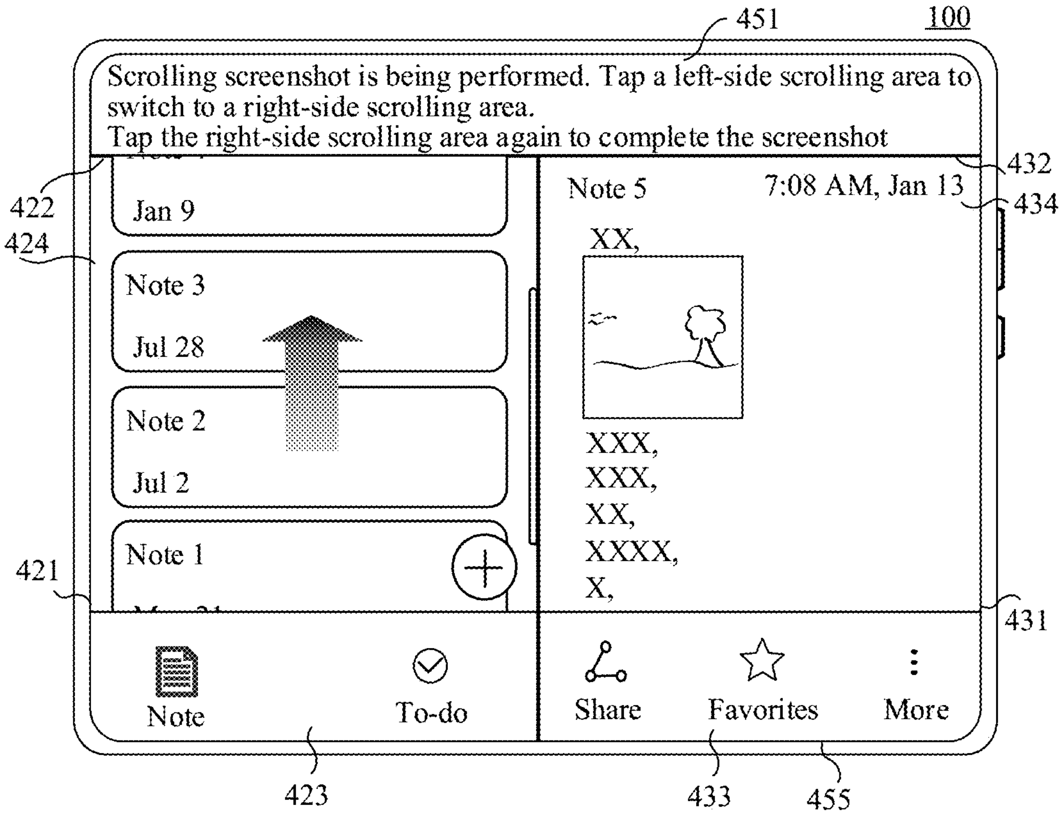

For example, as shown in FIG. 4F, the electronic device 100 may take a screenshot of the scrolling screenshot interface 455 currently displayed. In the scrolling screenshot interface 455, the scrolling window 422 displays a middle part of the page 424. In other words, the scrolling window 422 displays the note 4 option, the note 3 option, a note 2 option, and a note I option of the page 424. Then, the electronic device 100 may control the page 424 to continue to scroll up by the preset length.

Figure 4G:
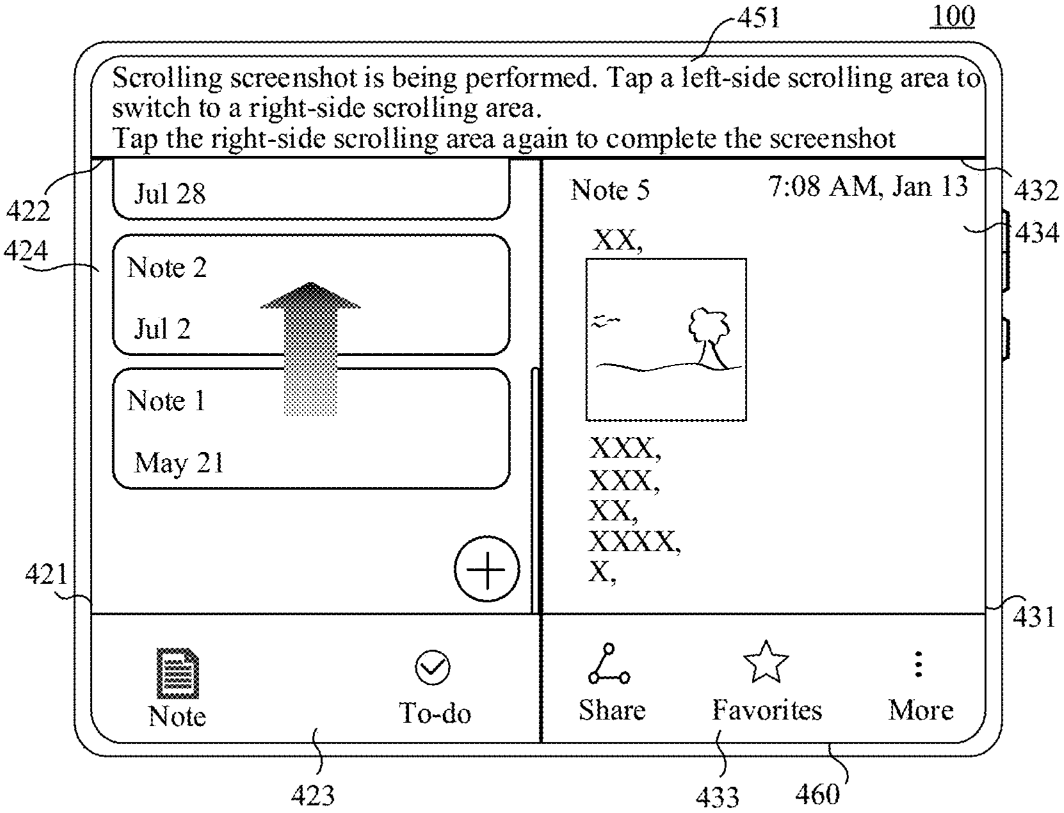
Figure 4H:
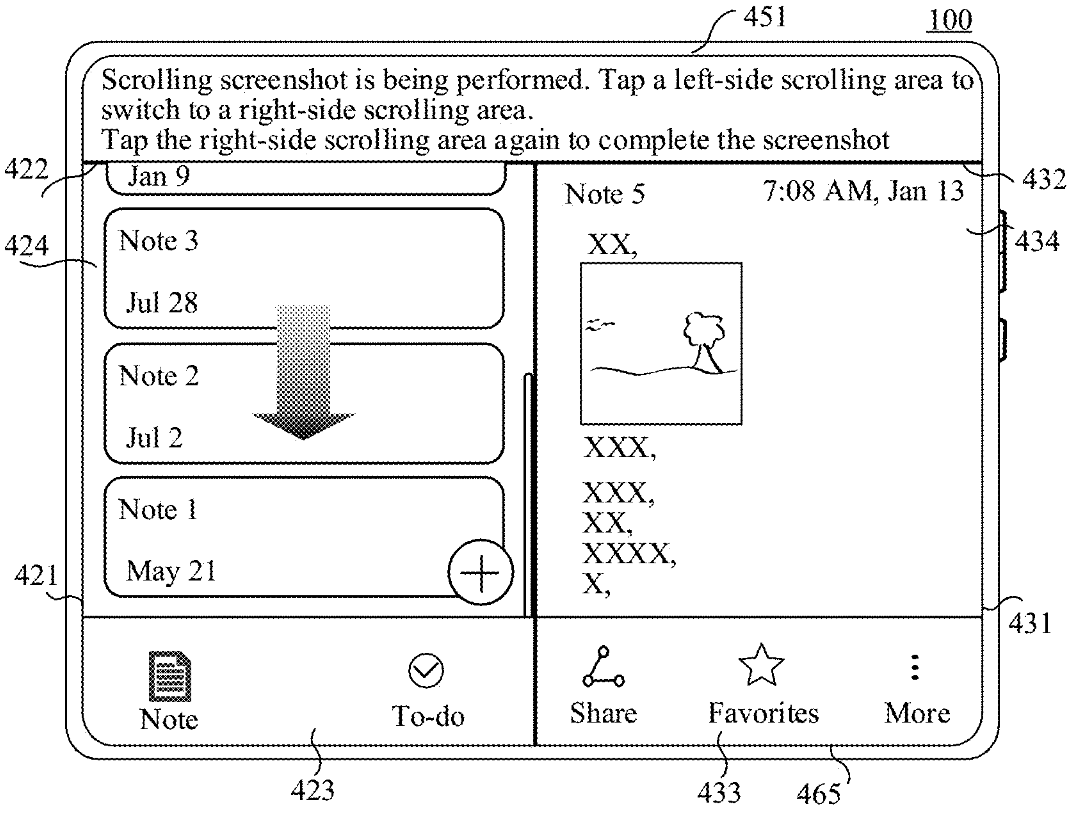

In an embodiment, when the electronic device 100 controls the page 424 to scroll up, the preset length is greater than a length of a remaining page that is not displayed in the scrolling window and that is of the page 424. The electronic device 100 may control a bottom edge of the up until a scrolling distance of the page 424 is equal to the preset length (as shown in FIG. 4G, the scrolling window 422 displays the note 3 option, the note 2 option, the note I option, and a bottom blank area), where the preset length is a distance that the electronic device 100 controls the page 424 to scroll each time. Then, the electronic device 100 controls the page 424 to scroll down until the bottom edge of the page 424 overlaps the bottom border of the scrolling window 422 (as shown in FIG. 4H, the scrolling window 422 displays a bottom part of the page 424, including the note 4 option, the note 3 option, the note 2 option, and the note I option). The electronic device 100 may take a screenshot of a scrolling screenshot interface 465 currently displayed.

When the electronic device 100 detects that the page 424 is scrolled to the bottom, the electronic device 100 stops scrolling screenshot on the display area 421, and starts scrolling screenshot on the display area 431.

Figure 4I:
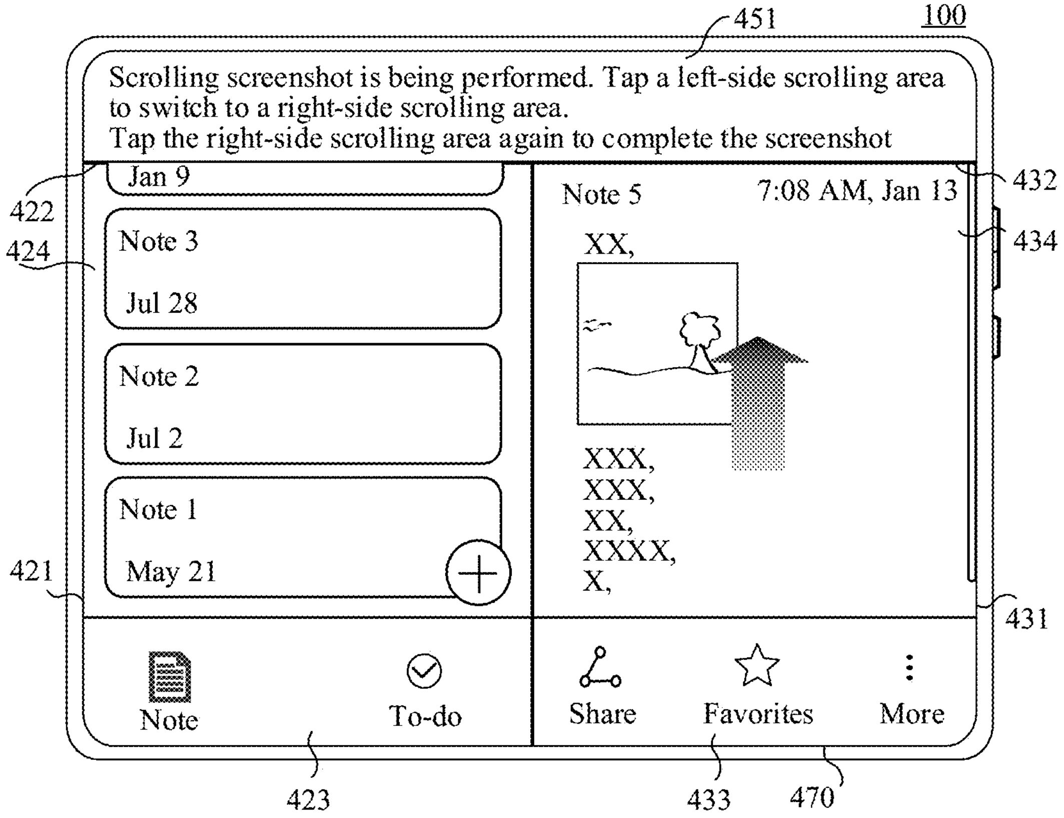

For example, as shown in FIG. 4I, the electronic device 100 may take a screenshot of a scrolling screenshot interface 470 currently displayed by the electronic device 100. In the scrolling screenshot interface 470, the scrolling window 432 displays a top part of a page 434. In other words, the scrolling window 432 displays a note 5 icon, a time stamp, and a part of content of the note 5 on the page 434. Then, the electronic device 100 may control the page 434 to scroll up by a preset length. The electronic device 100 may control the page 434 to scroll by a preset length each time. After controlling the page 434 to scroll by the preset length each time, the electronic device 100 takes a screenshot of an interface displayed by the electronic device 100.

Figure 4J:
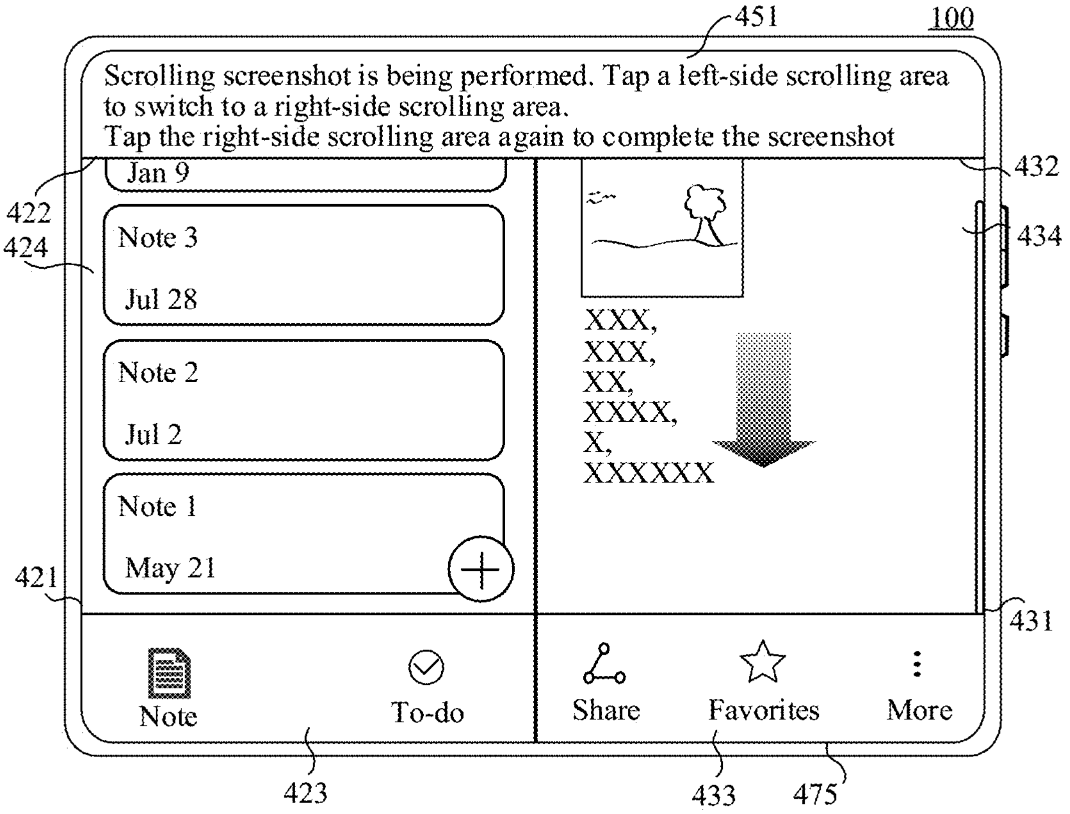

In an embodiment, when the electronic device 100 controls the page 434 to scroll up, the preset length is greater than a length of a remaining page that is not displayed in the scrolling window and that is of the page 434. The electronic device 100 may control a bottom edge of the page 434 to be far away from a bottom border of the scrolling window 432, and continue to scroll up until a scrolling distance of the page 434 is equal to a preset length, where the preset length is a distance at which the electronic device 100 controls the page 434 to scroll each time. Then, the electronic device 100 controls the page 434 to scroll down (as shown in FIG. 4J, the scrolling window 432 displays a bottom part of the page 434 and a bottom blank area) until the bottom edge of the page 434 overlaps the bottom border of the scrolling window 432. The electronic device 100 may take a screenshot of an interface currently displayed.

Figure 4K:
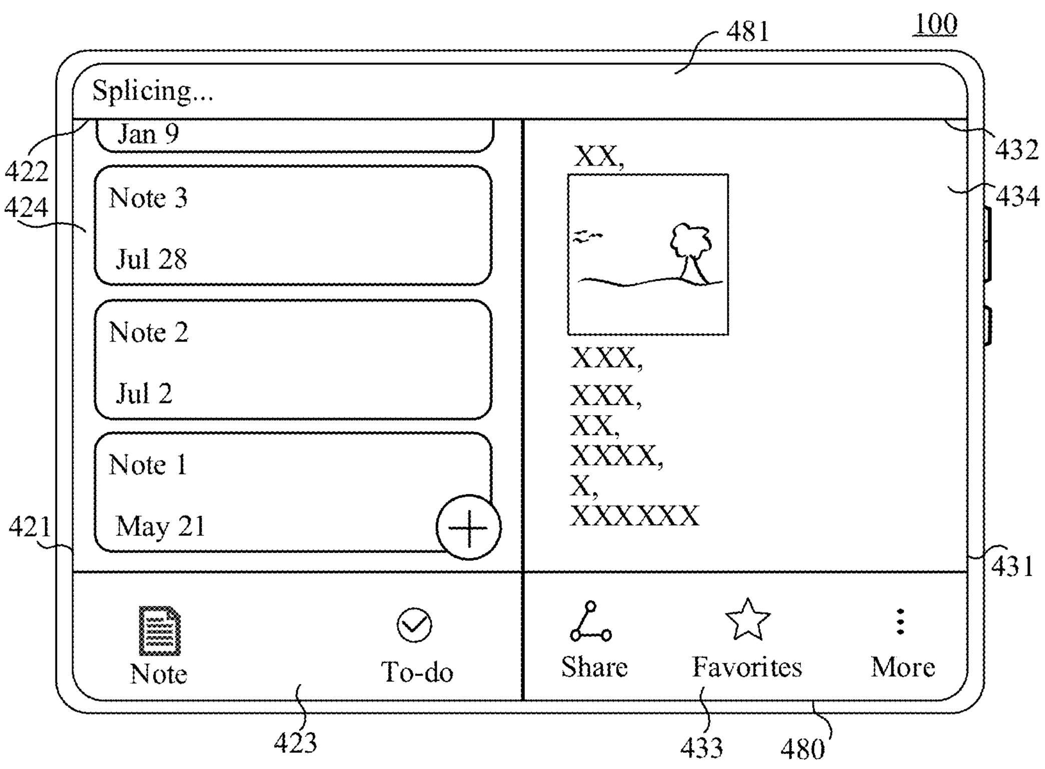

After the electronic device 100 controls the page 434 to complete the scrolling screenshot operation, the electronic device 100 may display a scrolling completion interface 480 shown in FIG. 4K. The scrolling completion interface 480 may include prompt information 481, a display area 421, and a display area 431. The prompt information 481 may prompt the user that the electronic device 100 is processing screenshots. For example, the prompt information may display prompt text of "splicing . . . ". As shown in FIG. 4K, the scrolling window 422 may currently display a part of content at the bottom of the page 424. The scrolling window 432 may display a part of content at the bottom of the page 434.

The operation of displaying, by the electronic device 100, the scrolling completion interface is optional. After the electronic device 100 performs a scrolling screenshot on the display area 431, the electronic device 100 may directly store an obtained long screenshot image to a gallery, or the electronic device 100 may display a screenshot display interface 490 shown in FIG. 4L.

After the electronic device 100 takes a scrolling screenshot of the display area 431, the electronic device 100 may remove repeated parts from the plurality of screenshot images of the display area 421 and splice the plurality of screenshot images (in subsequent descriptions of an embodiment of the application, this process may be briefly described as deduplication and splicing. For implementation operations of deduplication and splicing, refer to detailed descriptions in FIG. 13), to obtain a column-wise screenshot image 1 of the display area 421. The electronic device 100 deduplicates and splices a plurality of screenshots of the display area 431, to obtain a column-wise screenshot image 2 of the display area 431. The electronic device 100 compares lengths of the column-wise screenshot image 1 and the column-wise screenshot image 2, determines an image with a longer length in the two column-wise screenshot images as a long column-wise screenshot image, and determines an image with a shorter length in the two column-wise screenshot images as a short column-wise screenshot image. The electronic device 100 may splice a preset background image at the bottom of the short column-wise screenshot image until the length of the short column-wise screenshot image is the same as that of the long column-wise screenshot image, to obtain a filled screenshot image (for implementation operations of obtaining the filled screenshot image, refer to detailed descriptions in FIG. 15A to FIG. 15D). The electronic device 100 splices (for example, splices left and right) the long column-wise screenshot image and the filled screenshot image to obtain a long screenshot image. The long screenshot image may include all content of the page 424 and the page 434 shown in FIG. 4B. After the electronic device 100 obtains the long screenshot image, the electronic device 100 may display a screenshot display interface 490 shown in FIG. 4L.

Figure 4L:
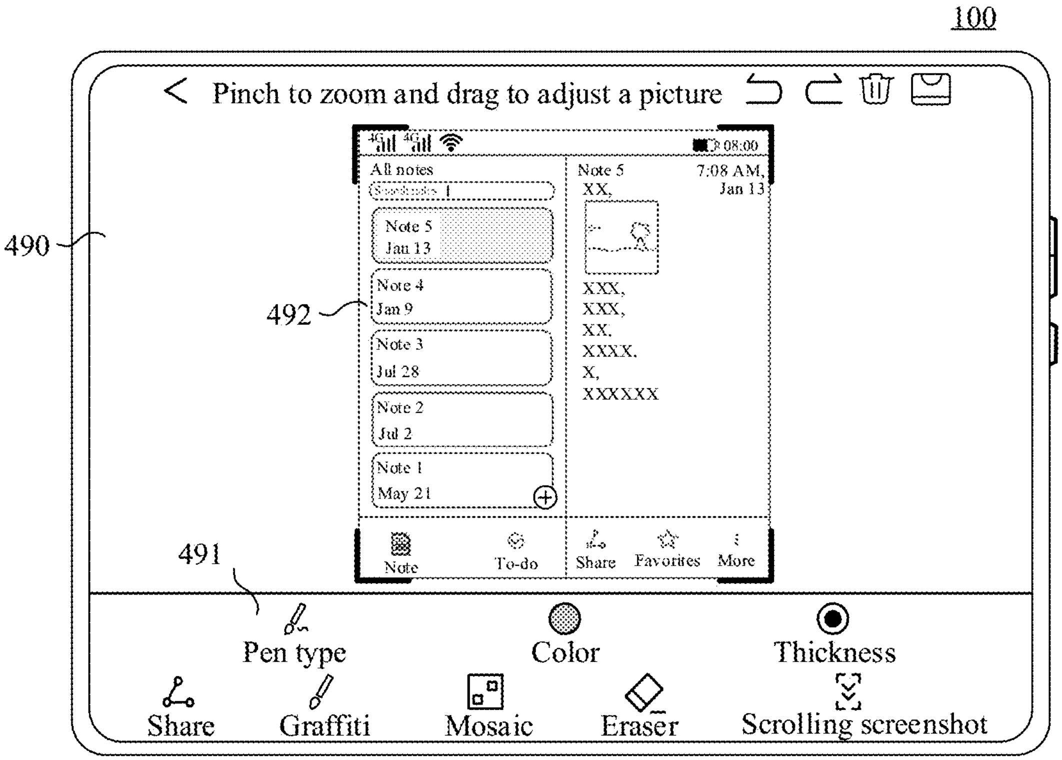

For example, as shown in FIG. 4L, the electronic device 100 displays the screenshot display interface 490. The screenshot display interface 490 includes a return control, a backward control, a forward control, a delete control, a save control, a bottom operation bar 491, a long screenshot image 492, and the like. The bottom operation bar 491 includes a "Pen type" icon, a "Color" icon, a "Thickness" icon, a "Share" icon, a "Graffiti" icon, a "Mosaic" icon, an "Eraser" icon, a "Scrolling screenshot" icon, and the like. The electronic device 100 may perform a corresponding operation on the long screenshot image 492 in response to an operation performed by the user on an icon provided by the bottom operation bar 491. The long screenshot image 492 is a long screenshot image obtained by the electronic device 100 by performing a scrolling screenshot on a memo application interface.

In an embodiment, after the electronic device 100 obtains the long screenshot image, the electronic device 100 may not display the screenshot display interface. The electronic device 100 may directly store the obtained long screenshot image to the gallery:

The scrolling screenshot method provided in embodiments of this application is described below with reference to a scenario.

In an embodiment, when the electronic device 100 takes a scrolling screenshot of a display area on a multi-column interface, the electronic device 100 may stop, in response to an input operation (for example, single-tapping) by the user, taking a scrolling screenshot of a current display area in advance, and switch to a next display area to perform a scrolling screenshot operation.

Figure 5A:
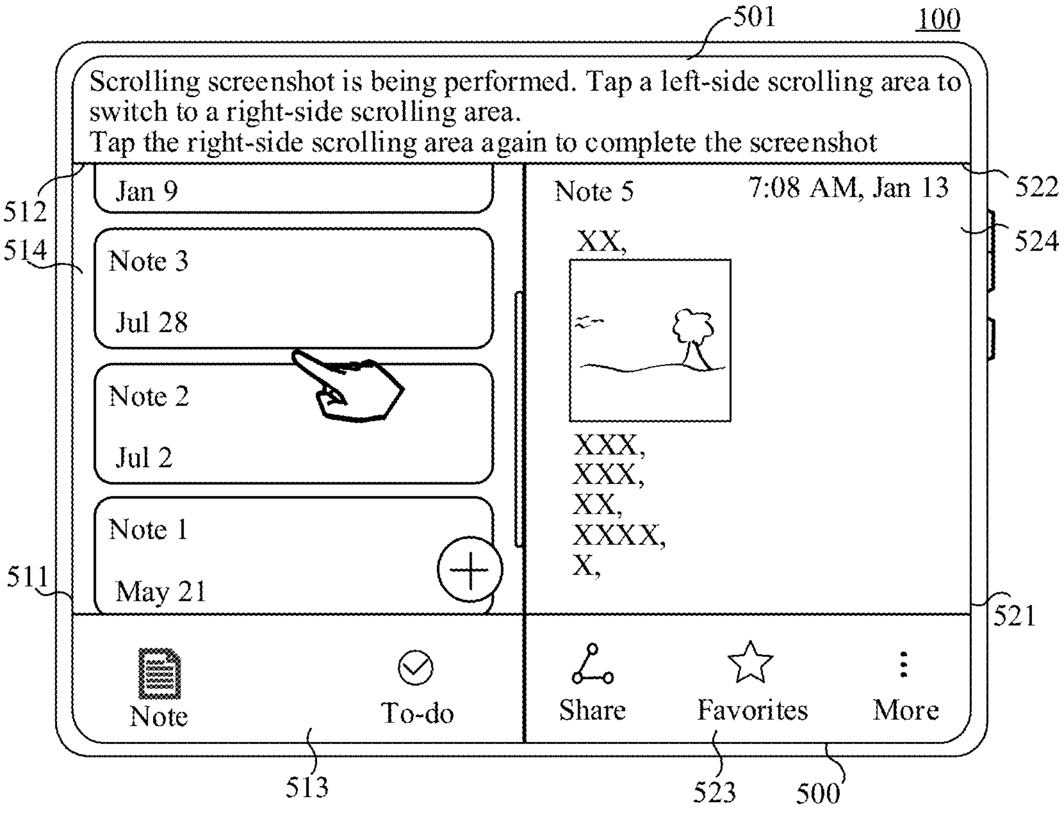
FIG. 5A to FIG. 5G are schematic diagrams of another group of interfaces according to an embodiment of this application.

For example, the electronic device 100 may display a scrolling screenshot interface 500 shown in FIG. 5A when controlling the page 424 of the scrolling screenshot interface 455 shown in the embodiment of FIG. 4F to scroll up by a preset length.

As shown in FIG. 5A, the electronic device 100 may display the scrolling screenshot interface 500. The scrolling screenshot interface 500 may include prompt information 501, a display area 511, a display area 521, and the like. The display area 511 may include but is not limited to a scrolling window 512 and a fixed bar 513. The scrolling window 512 may display a part of content of a page 514 (an area of the scrolling window 512 includes a note 4 option, a note 3 option, a note 2 option, and a note I option of the page 514). The display area 521 may include but is not limited to a scrolling window 522 and a fixed bar 523, and the scrolling window 522 may display a top part of the page 524. For a description of the scrolling screenshot interface 500, refer to the description of the scrolling screenshot interface 455 in FIG. 4F. Details are not described herein again.

The electronic device 100 may detect an input operation (for example, single-tapping) by the user on the display area 511, and in response to the input operation, the electronic device 100 stops performing scrolling screenshot on the display area 511 in advance, and takes a screenshot of the scrolling screenshot interface 500 currently displayed by the electronic device 100. In addition, the electronic device 100 may start to take a scrolling screenshot of the display area 521.

Figure 5B:
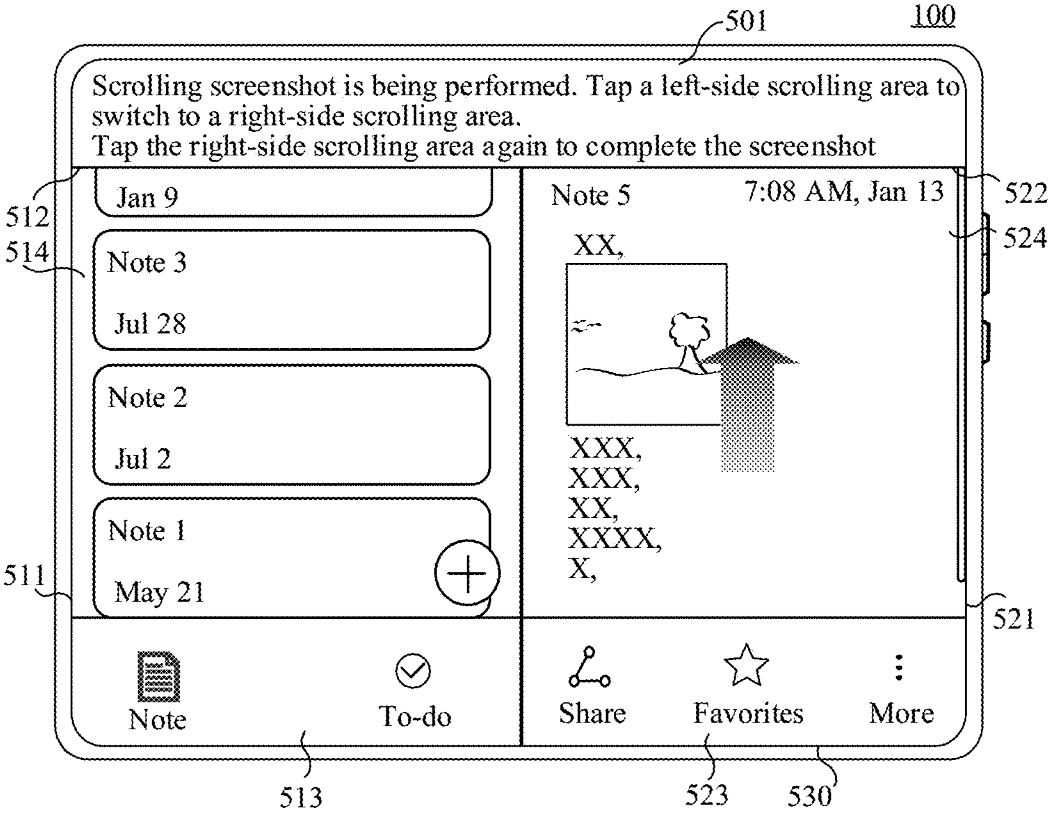

For example, as shown in FIG. 5B, the electronic device 100 may display a scrolling screenshot interface 530 shown in FIG. 5B. The electronic device 100 may take a screenshot of a scrolling screenshot interface 530 currently displayed by the electronic device 100. In the scrolling screenshot interface 530, the scrolling window 522 displays a top part of a page 524. In other words, the scrolling window 522 displays a note 5 icon, a time stamp, and a part of content of the note 5 on the page 524. Then, the electronic device 100 may control the page 524 to scroll up by a preset length. The electronic device 100 controls the page 524 to scroll by a preset length each time. After controlling the page 524 to scroll by the preset length each time, the electronic device 100 takes a screenshot of an interface displayed by the electronic device 100.

In an embodiment, when the electronic device 100 takes a scrolling screenshot of a display area on a multi-column interface, the electronic device 100 may stop, in response to an input operation (for example, single-tapping) by the user on a current display interface (for example, the scrolling screenshot interface 455 shown in FIG. 4F), a scrolling screenshot operation on the currently displayed interface in advance, to obtain a long screenshot image.

In an embodiment, when the electronic device 100 takes a scrolling screenshot of a display area on a multi-column interface, the electronic device 100 may stop, in response to an input operation (for example, single-tapping) by the user on a specified display area of a current display interface, an operation of performing scrolling screenshot on the currently displayed interface in advance, and perform a scrolling screenshot operation on a scrolling window of the specified display area.

In an embodiment, the electronic device 100 has performed a scrolling screenshot operation on another display area other than a current display area. When detecting an input operation (for example, single-tapping) by the user, the electronic device 100 may stop scrolling screenshot, and generate a long screenshot image.

Figure 5C:
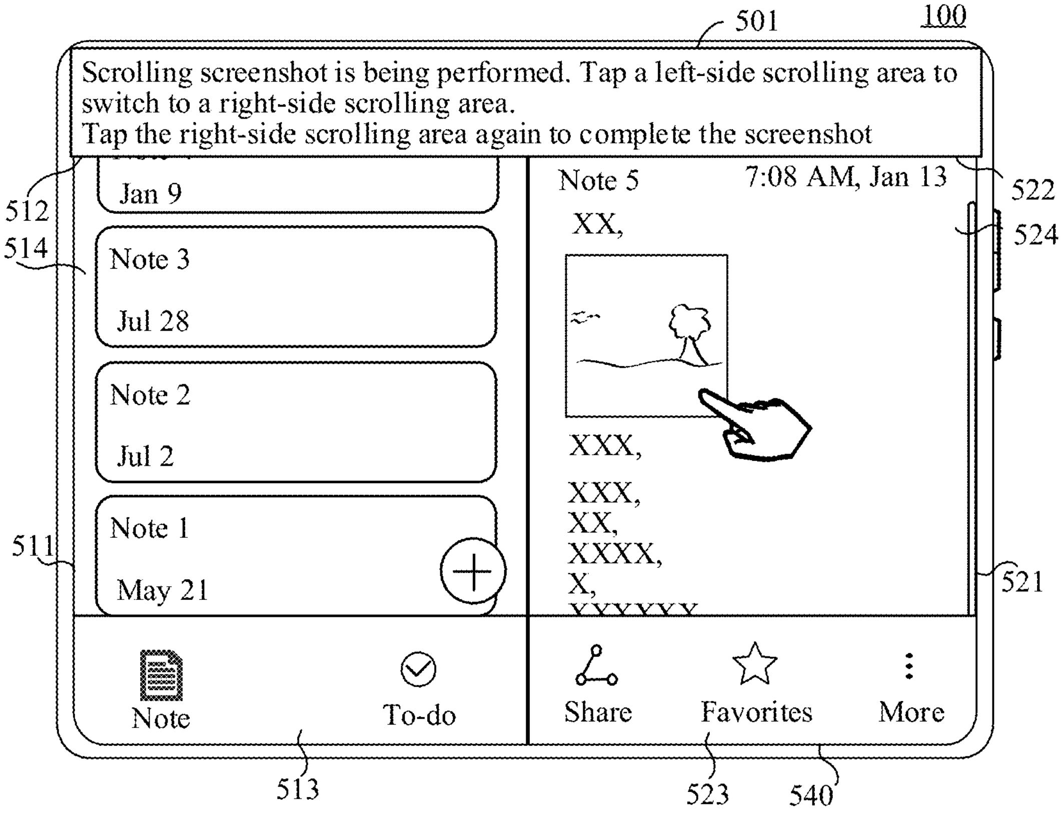

For example, as shown in FIG. 5C, the electronic device 100 is currently controlling scrolling of a last long page. After the electronic device 100 controls the page 524 shown in FIG. 5B to scroll up for a distance, the electronic device 100 may display a scrolling screenshot interface 540.

Figure 5D:
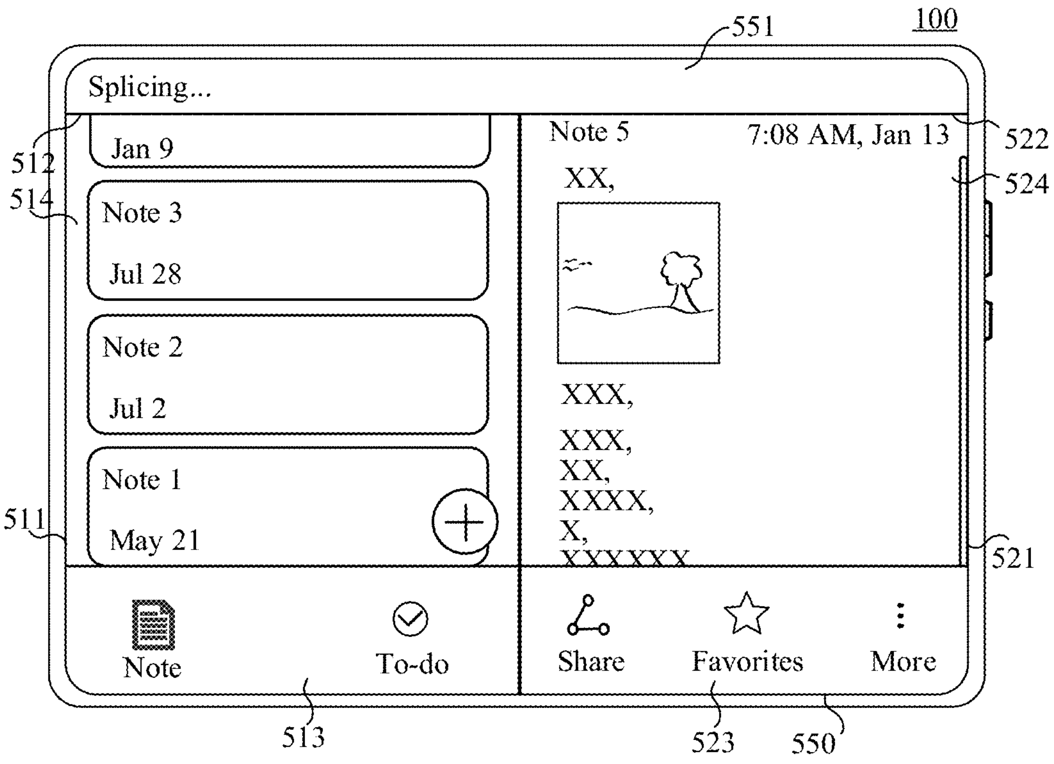

The electronic device 100 may receive an input operation (for example, single-tapping) by the user on the display area 511, and in response to the operation, the electronic device 100 may display a scrolling completion interface 550 shown in FIG. 5D.

As shown in FIG. 5D, the scrolling completion interface 550) includes prompt information 551, a display area 511, a display area 521, and the like. The prompt information 551 may prompt the user that the electronic device 100 is processing screenshots. For example, the prompt information may display prompt text of "splicing . . . ". The scrolling window 512 displays a part of content of the page 514. The part of content is content that is being displayed by the scrolling window 512 when the electronic device 100 receives an input operation by the user on the display area 511. The scrolling window 522 displays a part of content of the page 524. The part of content is content that is being displayed by the scrolling window 522 when the electronic device 100 receives an input operation by the user on the display area 521.

The operation of displaying, by the electronic device 100, the scrolling completion interface 550 is optional. After the electronic device 100 performs a scrolling screenshot on the display area 521, the electronic device 100 may directly store an obtained long screenshot image to a gallery: or the electronic device 100 may display a screenshot display interface 560 shown in FIG. 5E.

After the electronic device 100 receives the input operation performed by the user on the display area 521, the electronic device 100 may deduplicate and splice a plurality of screenshot images of the display area 511, to obtain a column-wise screenshot image 3 of the display area 511. The electronic device 100 deduplicates and splices a plurality of screenshots of the display area 521, to obtain a column-wise screenshot image 4 of the display area 521. The electronic device 100 may compare lengths of the column-wise screenshot image 3 and the column-wise screenshot image 4, and determine an image with a longer length in the two column-wise screenshot images as a long column-wise screenshot image. A preset background image is spliced at the bottom of another screenshot image until the length of the short column-wise screenshot image is the same as that of the long column-wise screenshot image, to obtain a filled screenshot image (for implementation operations of obtaining the filled screenshot image, refer to detailed descriptions in FIG. 15A to FIG. 15D). The electronic device 100 splices (for example, splices left and right) the long column-wise screenshot image and the filled screenshot image to obtain a long screenshot image. The long screenshot image may include a part of content of the page 514 and the page 524 shown in FIG. 5D. After the electronic device 100 obtains the long screenshot image, the electronic device 100 may display a screenshot display interface 560 shown in FIG. 5E.

Figure 5E:
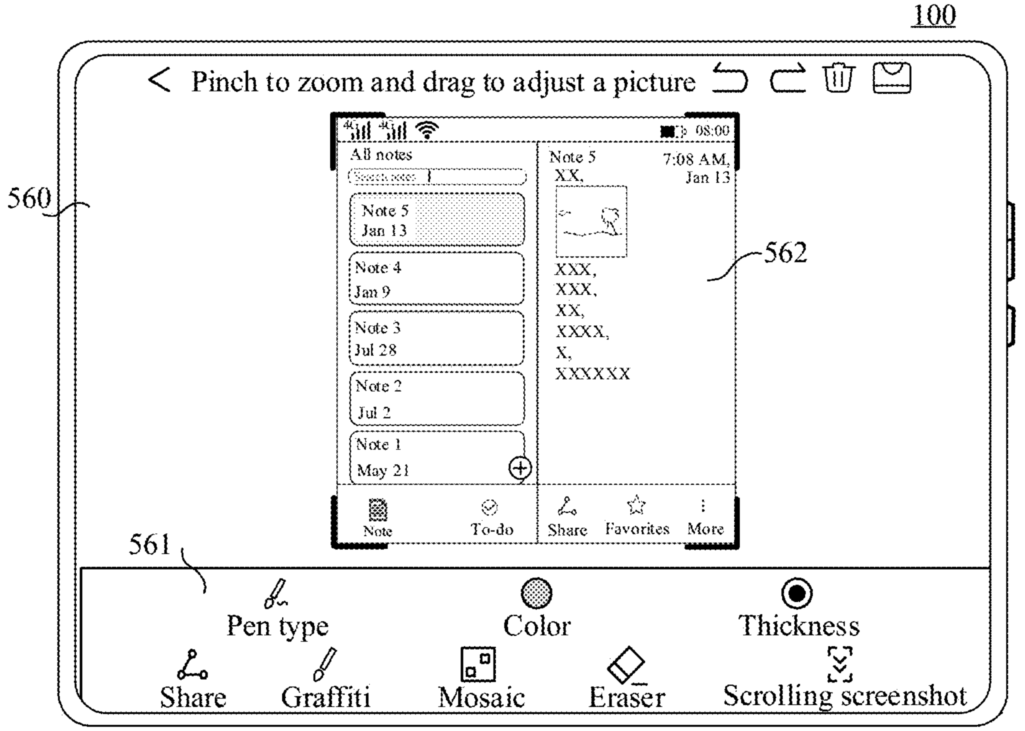

For example, as shown in FIG. 5E, the electronic device 100 displays the screenshot display interface 560. The screenshot display interface 560 includes a bottom operation bar 561, a long screenshot image 562, and the like. The electronic device 100 may perform a corresponding operation on the long screenshot image 562 in response to an operation performed by the user on an icon provided by the bottom operation bar 561. The long screenshot image 562 is a long screenshot image obtained by the electronic device 100 by performing a scrolling screenshot on a memo application interface. In this way: a screenshot including all page content in a user selection range may be obtained.

In an embodiment, after the electronic device 100 obtains the long screenshot image, the electronic device 100 may not display the screenshot display interface. The electronic device 100 may directly store the obtained long screenshot image to the gallery.

In an embodiment, when the electronic device 100 takes a scrolling screenshot of a specified display area on a multi-column interface, in response to an input operation (for example, sliding down or sliding up) by the user, the electronic device 100 may take a screenshot of a current display interface of the electronic device 100 and stop, in advance, scrolling screenshot on the specified display area, and switch to a next display area to perform a scrolling screenshot operation. When detecting that the current specified display area is a last display area on which a scrolling screenshot operation is performed, the electronic device 100 stops the scrolling screenshot operation.

For example, in a scrolling screenshot process performed by the electronic device 100, after the electronic device 100 receives an operation (for example, sliding down) by the user, the electronic device 100 may take a screenshot of an interface currently displayed by the electronic device 100, to obtain a frame of screenshot image 5. The electronic device 100 may compare an obtained screenshot image 5 with a previous screenshot image. The electronic device 100 may obtain a part that is in the previous screenshot image and that is the same as the screenshot image 5. The electronic device 100 may crop the same part of the previous screenshot image and a part of an image below the same part, and splice the top of the screenshot image 5 and the bottom of the previous screenshot image after the cropping.

For example, the electronic device 100 may display a scrolling screenshot interface 500 shown in FIG. 5A when controlling the page 424 of the scrolling screenshot interface 455 shown in the embodiment of FIG. 4F to scroll up by a preset length.

As shown in FIG. 5A, the electronic device 100 may display the scrolling screenshot interface 500. The scrolling screenshot interface 500 may include prompt information 501, a display area 511, a display area 521, and the like. The display area 511 may include but is not limited to a scrolling window 512 and a fixed bar 513. The scrolling window 512 may display a part of content of a page 514 (an area of the scrolling window 512 includes a note 4 option, a note 3 option, a note 2 option, and a note I option of the page 514). The display area 521 may include but is not limited to a scrolling window 522 and a fixed bar 523, and the scrolling window 522 may display a top part of the page 524. For a description of the scrolling screenshot interface 500, refer to the description of the scrolling screenshot interface 455 in FIG. 4F. Details are not described herein again.

The electronic device 100 may detect an input operation (for example, sliding up) by the user on the scrolling screenshot interface 500, and the electronic device 100 displays a scrolling screenshot interface 570 in response to the input operation. The electronic device 100 may stop taking a scrolling screenshot of the display area 511 in advance, and capture a scrolling screenshot interface 570 currently displayed by the electronic device 100. In addition, the electronic device 100 may start to take a scrolling screenshot of the display area 521.

Figure 5F:
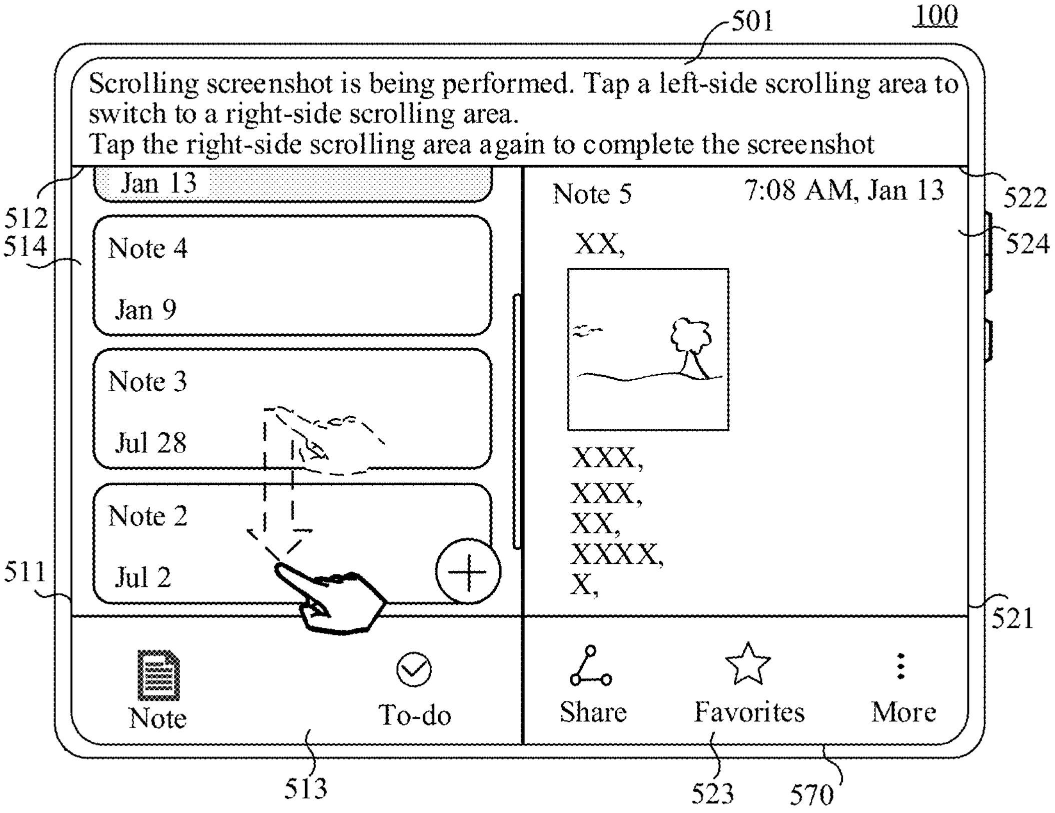

For example, as shown in FIG. 5F, the electronic device 100 may display the scrolling screenshot interface 570) shown in FIG. 5F. The electronic device 100 may take a screenshot of a scrolling screenshot interface 570 currently displayed by the electronic device 100. In the scrolling screenshot interface 570), the scrolling window 512 displays a part of content of the page 514. In other words, the scrolling window 512 displays a note 5 icon, a note 4 icon, a note 3 icon, and a note 2 icon on the page 514.

The electronic device 100 may take a screenshot of a current display interface to obtain a frame of screenshot image. Then, the page 524 is controlled to scroll up by a preset length. The electronic device 100 controls the page 524 to scroll by a preset length each time. After controlling the page 524 to scroll by the preset length each time, the electronic device 100 takes a screenshot of an interface displayed by the electronic device 100.

Figure 5G:
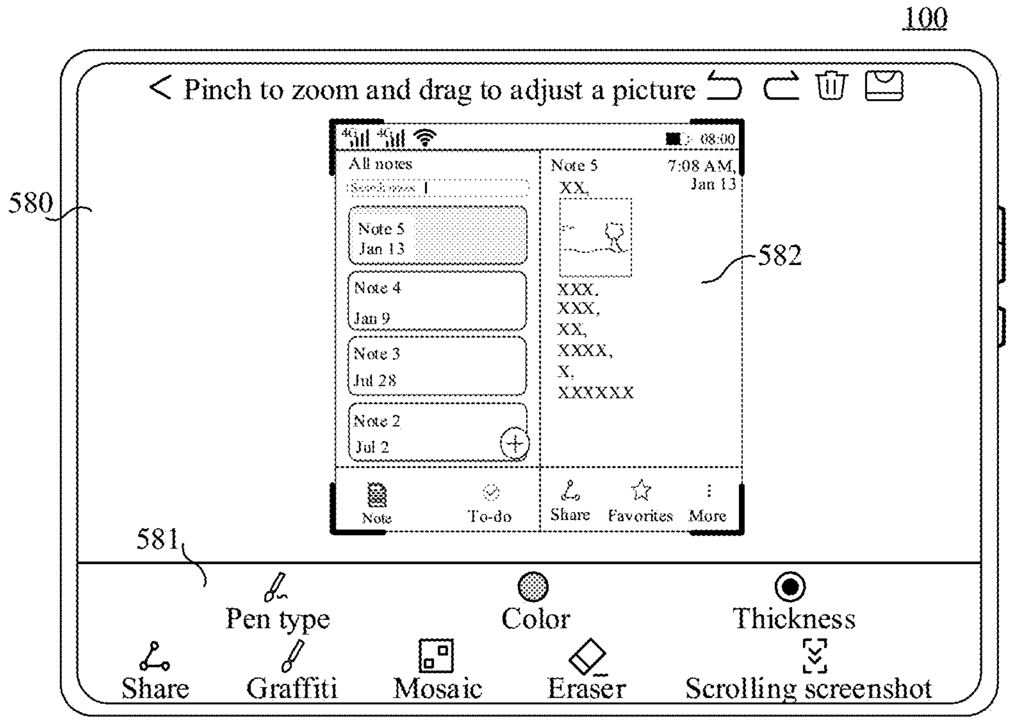

After the electronic device 100 controls the page 524 in the display area 521 to scroll to the bottom, the electronic device 100 may store an obtained long screenshot image to the gallery, or the electronic device 100 may display the screenshot display interface 580 shown in FIG. 5G.

For example, after the electronic device 100 receives the input operation performed by the user on the display area 521, the electronic device 100 may deduplicate and splice a plurality of screenshot images of the display area 511, to obtain a column-wise screenshot image 5 of the display area 511 (because in the foregoing operation, the electronic device 100 receives an operation by the user, the obtained column-wise screenshot image 5 does not include the note 1 icon). The electronic device 100 deduplicates and splices a plurality of screenshots of the display area 521, to obtain a column-wise screenshot image 6 of the display area 521. The electronic device 100 may compare lengths of the column-wise screenshot image 5 and the column-wise screenshot image 6, and determine an image with a longer length in the two column-wise screenshot images as a long column-wise screenshot image. A preset background image is spliced at the bottom of another screenshot image until the length of the short column-wise screenshot image is the same as that of the long column-wise screenshot image, to obtain a filled screenshot image (for implementation operations of obtaining the filled screenshot image, refer to detailed descriptions in FIG. 15A to FIG. 15D). The electronic device 100 splices (for example, splices left and right) the long column-wise screenshot image and the filled screenshot image to obtain a long screenshot image. The long screenshot image may include a part of content of the page 514 and the page 524 shown in FIG. 5D. After the electronic device 100 obtains the long screenshot image, the electronic device 100 may display a screenshot display interface 580 shown in FIG. 5G.

For example, as shown in FIG. 5G, the electronic device 100 displays the screenshot display interface 580. The screenshot display interface 580 includes a bottom operation bar 581, a long screenshot image 582, and the like. The electronic device 100 may perform a corresponding operation on the long screenshot image 582 in response to an operation performed by the user on an icon provided by the bottom operation bar 481. The long screenshot image 582 is a long screenshot image obtained by the electronic device 100 by performing a scrolling screenshot on a memo application interface. The long screenshot image 582 does not include the note 1 icon.

In an embodiment, when the electronic device 100 takes a scrolling screenshot of a specified display area on a multi-column interface, the electronic device 100 may display a part of content of a page of the specified display area in response to an input operation (for example, sliding up or sliding down) by the user on a current display interface (not limited to a display area, for example, the scrolling screenshot interface 455 shown in FIG. 4F). The electronic device 100 may continue to perform a scrolling screenshot operation on the specified display area until the electronic device 100 controls the page of the specified display area to scroll to the bottom.

In an embodiment, in a process in which the electronic device 100 controls scrolling of the page of the specified display area, when the electronic device 100 receives an operation (for example, single-tapping) by the user, the electronic device 100 stops a scrolling screenshot operation on the specified display area in response to the operation, and switches to a next display area in which no scrolling screenshot is performed to perform the scrolling screenshot operation. Alternatively, when the electronic device 100 receives an operation (for example, single-tapping) by the user, the electronic device 100 stops a scrolling screenshot operation on a currently displayed interface of the electronic device 100 in response to the operation, to obtain a long screenshot image.

In an embodiment, after duration of displaying a part of content of a dragged page is greater than a preset time threshold, the electronic device 100 may return to display a part of content of the page before the dragging, and continue to scroll to display the page of the specified display area.

In some application scenarios, the electronic device 100 may control pages of a plurality of scrolling windows to simultaneously scroll and take a screenshot (for example, an interface currently displayed by the electronic device 100 is captured after a left long page and a right long page are simultaneously scrolled by a preset length), and when the pages of the plurality of scrolling windows are all scrolled to the bottom, the scrolling screenshot is completed. A preset length of each scrolling of the pages of the plurality of scrolling windows is less than a length of a border in a scrolling direction of any scrolling window.

Figure 6A:
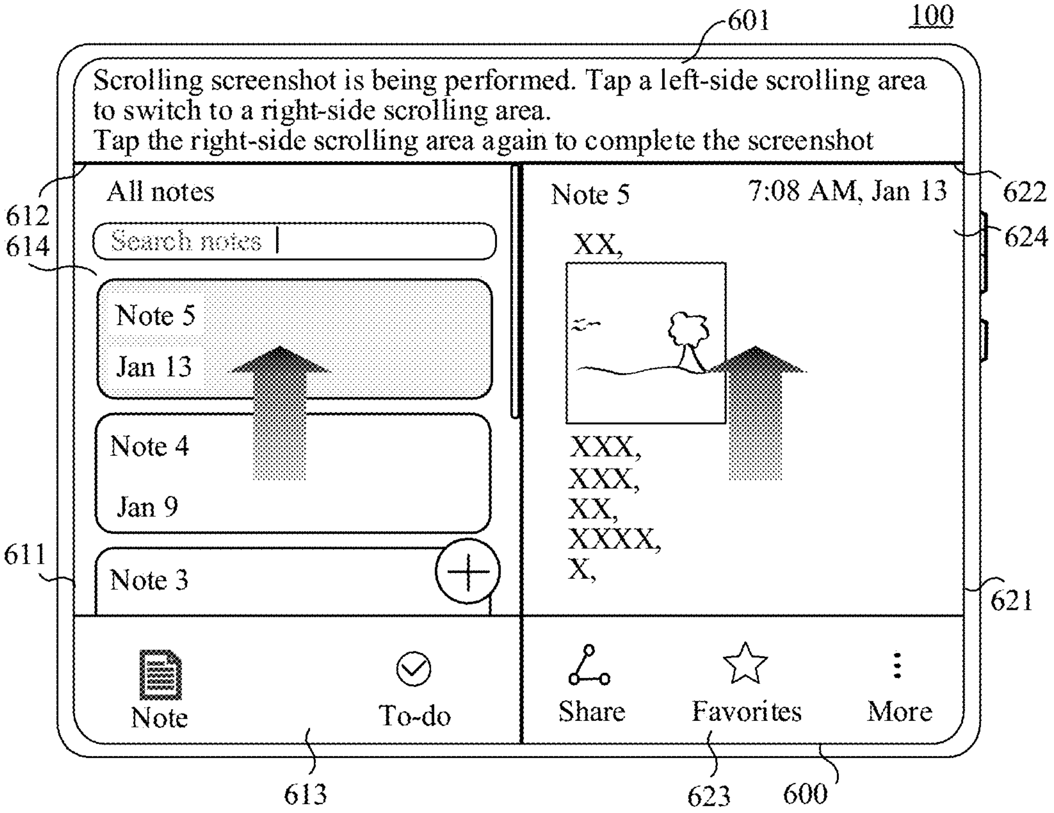
FIG. 6A to FIG. 6E are schematic diagrams of another group of interfaces according to an embodiment of this application.

For example, the electronic device 100 may display a scrolling screenshot interface 600 shown in FIG. 6A after the electronic device 100 receives the operation performed by the user on the floating window 411 in the embodiment shown in FIG. 4D.

As shown in FIG. 6A, the electronic device 100 displays the scrolling screenshot interface 600, and the scrolling screenshot interface 600 includes prompt information 601, a display area 611, a display area 621, and the like. The display area 611 may include but is not limited to a scrolling window 612 and a fixed bar 613, and the scrolling window 612 may display a part of content of a page 614. The display area 621 may include but is not limited to a scrolling window 622 and a fixed bar 623, and the scrolling window 622 may display a part of content of a page 624. The prompt information 451 may prompt the user that the scrolling screenshot is being performed, or may prompt the user that a range of the screenshot may be controlled by performing a tap operation. For example, the prompt information 451 may include prompt text "Scrolling screenshot is being performed. Tap a left-side scrolling area to switch to a right-side scrolling area. Tap the right-side scrolling area again to complete the screenshot". For a detailed description of the display area 611, refer to the description of the display area 311 in FIG. 3A. For a detailed description of the display area 621, refer to the description of the display area 321 in FIG. 3A. Details are not described herein again.

After the electronic device 100 receives the operation performed by the user on the floating window 411 in the embodiment shown in FIG. 4D, the electronic device 100 may further take a screenshot of the scrolling screenshot interface 600 displayed on the electronic device 100. Then, the electronic device 100 controls the page 614 and the page 624 to scroll by a preset length each time. After controlling the page 614 and the page 624 to scroll by the preset length each time, the electronic device 100 takes a screenshot of an interface displayed by the electronic device 100. After the electronic device 100 controls the page 614 and the page 624 to scroll up by the preset length, the electronic device 100 displays a scrolling screenshot interface 630 shown in FIG. 6B.

Figure 6B:
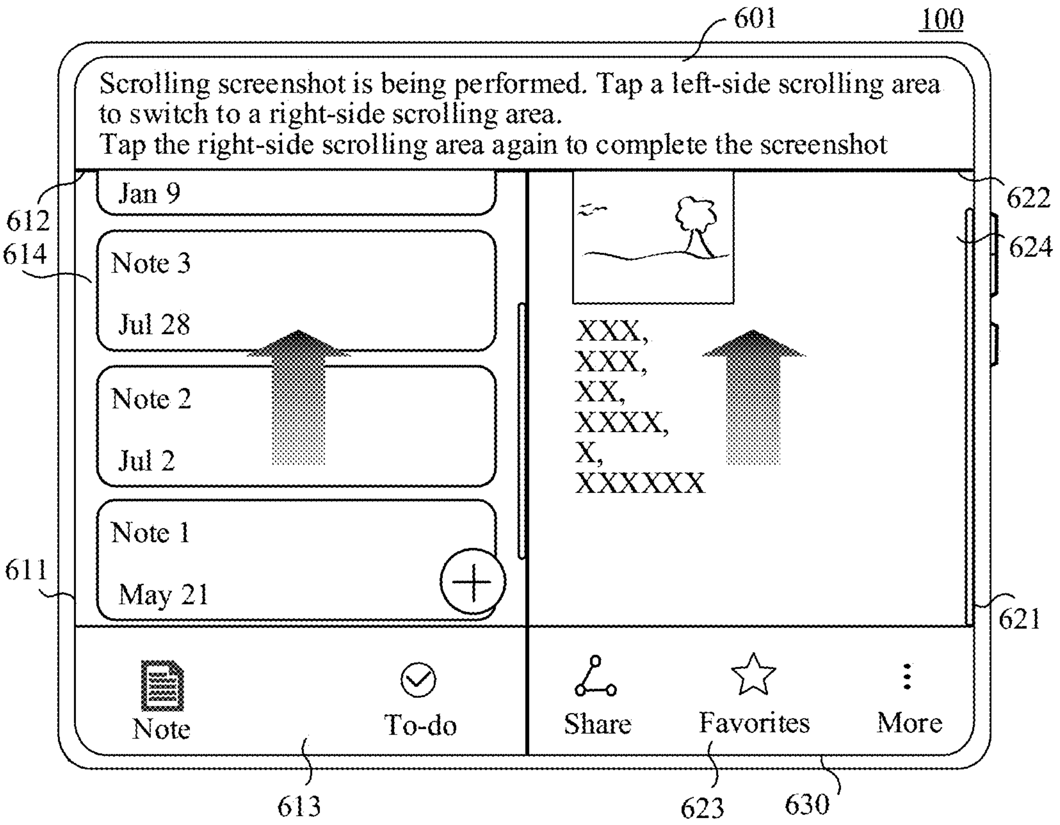

For example, as shown in FIG. 6B, the electronic device 100 displays a scrolling screenshot interface 630 shown in FIG. 6B. In the scrolling screenshot interface 630, the scrolling window 612 displays a middle part of the page 614. In other words, the scrolling window 612 displays the note 4 option, the note 3 option, a note 2 option, and a note I option of the page 614. The scrolling window 622 displays a part at the bottom of the page 624. In other words, the scrolling window 612 displays a part of content of a note 5 on the page 614 and a bottom blank area. The electronic device 100 may take a screenshot of a scrolling screenshot interface 630) currently displayed. Then, the electronic device 100 may control the page 614 to continue to scroll up by the preset length.

In an embodiment, when the electronic device 100 controls the page 624 to scroll up, the preset length is greater than a length of a remaining page that is not displayed in the scrolling window and that is of the page 624. The electronic device 100 may control a bottom edge of the up until a scrolling distance of the page 624 is equal to the preset length, where the preset length is a distance that the electronic device 100 controls the page 624 to scroll each time. Then, the electronic device 100 controls the page 624 to scroll down (as shown in FIG. 6B, the scrolling window 622 displays a bottom part of the page 624) until the bottom edge of the page 624 overlaps the bottom border of the scrolling window 622. The electronic device 100 may take a screenshot of an interface currently displayed.

When the electronic device 100 detects that the page 624 is scrolled to the bottom, the page 614 does not scroll to the bottom. The electronic device 100 stops controlling the page 624 to scroll, and the electronic device 100 may control the page 614 to continue scrolling and take a screenshot of an interface currently displayed by the electronic device 100 after the page 614 is scrolled. When detecting that the page 614 is scrolled to the bottom, the electronic device 100 takes a screenshot of an interface currently displayed by the electronic device 100, and generates a long screenshot image.

Figure 6C:
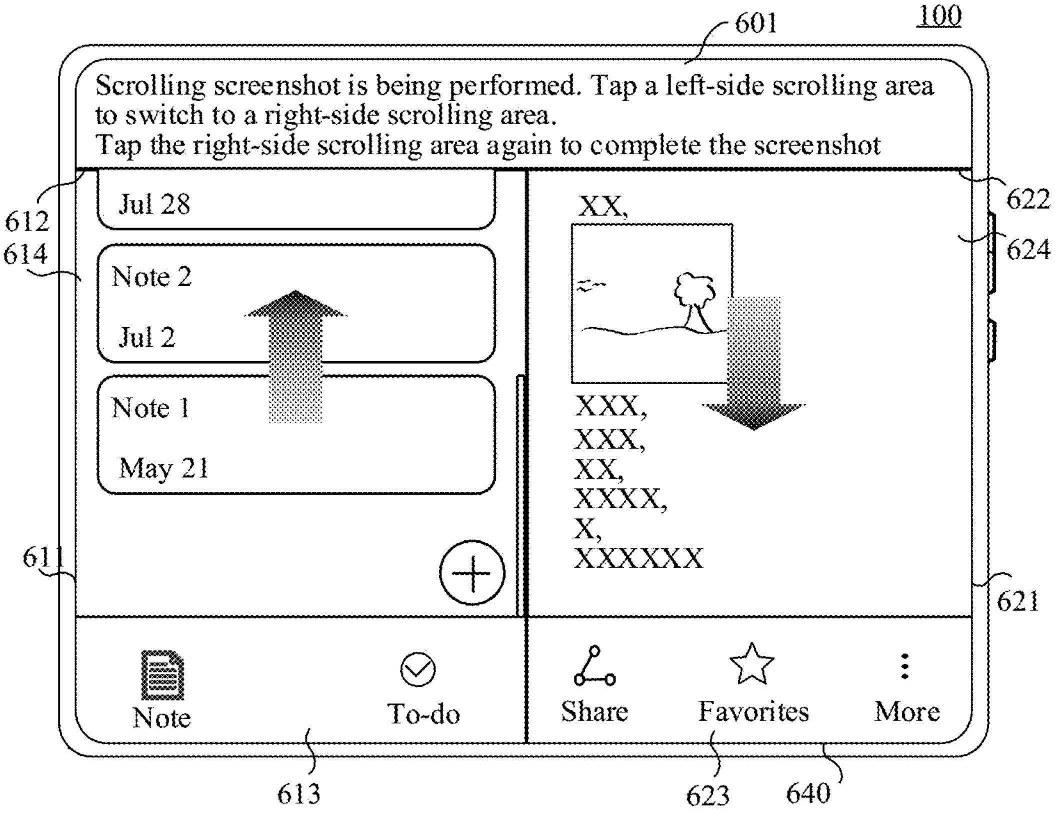
Figure 6D:
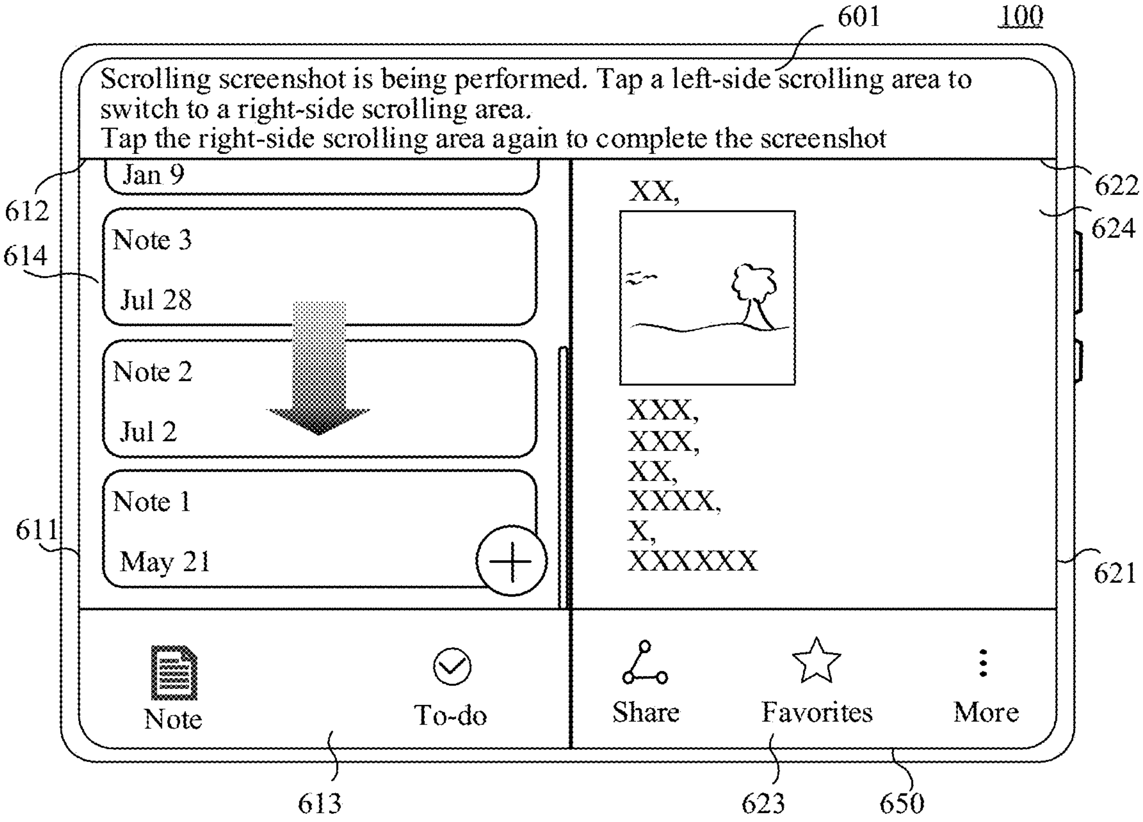

In an embodiment, when the electronic device 100 controls the page 614 to scroll up, the preset length is greater than a length of a remaining page that is not displayed in the scrolling window and that is of the page 614. The electronic device 100 may control a bottom edge of the page 614 to be far away from a bottom border of the scrolling window 612, and continue to scroll up (as shown in FIG. 6C, the scrolling window 612 displays a bottom part of the page 614 and a bottom blank area) until a scrolling distance of the page 614 is equal to the preset length, where the preset length is a distance that the electronic device 100 controls the page 614 to scroll each time. Then, the electronic device 100 controls the page 614 to scroll down until the bottom edge of the page 614 overlaps the bottom border of the scrolling window 612 (as shown in FIG. 6D, the scrolling window 622 displays the bottom part of the page 624). The electronic device 100 may take a screenshot of an interface currently displayed.

Figure 6E:
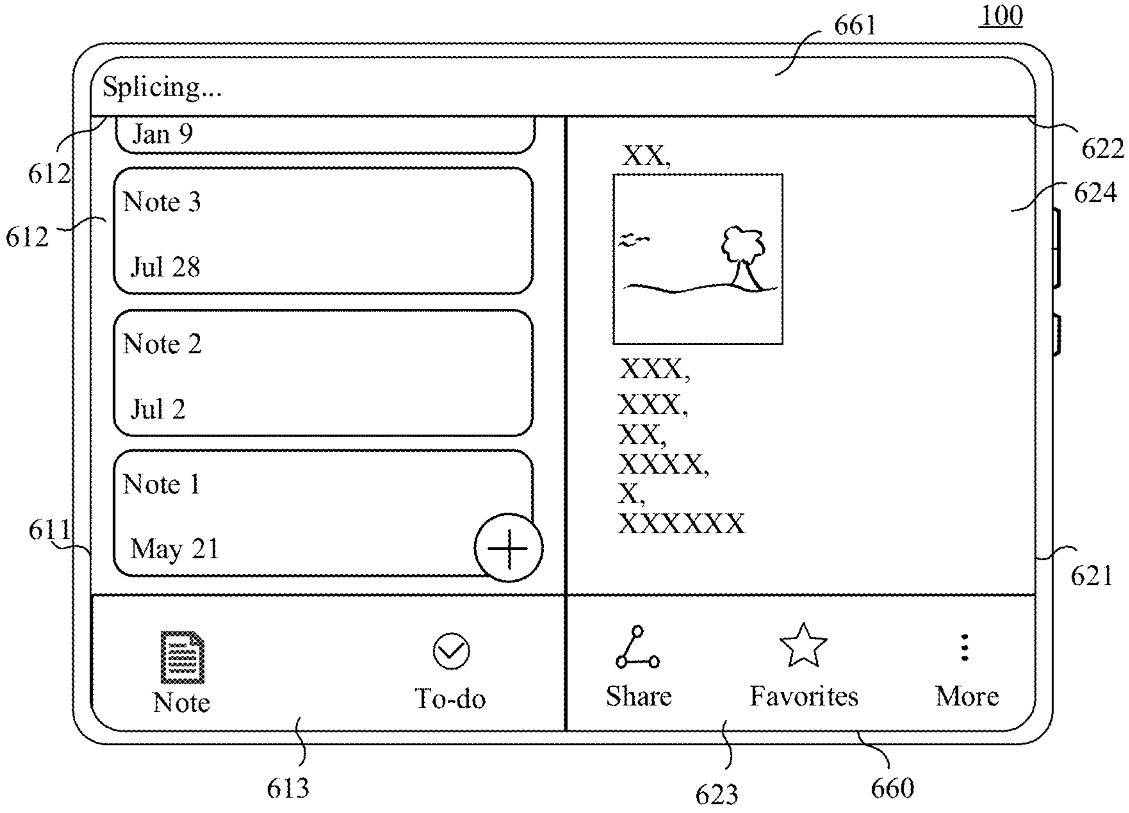

After the electronic device 100 completes the scrolling screenshot operation on the display area 611 and the display area 621, the electronic device 100 may display a scrolling completion interface 660 shown in FIG. 6E. The scrolling completion interface 660 may include prompt information 661, a display area 611, and a display area 621. The prompt information 661 may prompt the user that the electronic device 100 is processing screenshots. For example, the prompt information may display prompt text of "splicing . . . ". As shown in FIG. 6E, the scrolling window 612 may currently display a part of content at the bottom of the page 614. The scrolling window 622 may display a part of content at the bottom of the page 624.

The operation of displaying, by the electronic device 100, the scrolling completion interface is optional. After the electronic device 100 performs a scrolling screenshot on the display area 611, the electronic device 100 may directly store an obtained long screenshot image to a gallery, or the electronic device 100 may display a screenshot display interface 490 shown in FIG. 4L. For a description of the screenshot display interface 490, refer to the foregoing related text. Details are not described herein again.

In an embodiment, in a process in which the electronic device 100 controls a long page to scroll and takes a screenshot of an interface currently displayed by the electronic device 100 (that is, when a long page in a display area has not been scrolled to the bottom), after the electronic device 100 receives an input operation (for example, single-tapping) by the user, the electronic device 100 may end scrolling screenshot in advance in response to the operation, to obtain a long screenshot image. The long screenshot image does not include a part of content that is of the long page and that is not displayed in the scrolling window:

In an embodiment, the electronic device 100 may simultaneously perform a scrolling screenshot operation on a plurality of display areas. When long pages of the plurality of scrolling windows are not scrolled to the bottom, the electronic device 100 may receive an input operation (for example, single-tapping) by the user on a display area, and stop a scrolling screenshot operation on the display area. Other display areas are not affected. The electronic device 100 continues to control long pages of the display areas to scroll and takes a screenshot of an interface displayed by the electronic device 100 after the scrolling, until all the display areas are scrolled to the bottom, to obtain a long screenshot image.

For example, after the electronic device 100 receives the operation performed by the user on the floating window 411 in the embodiment shown in FIG. 4D, the electronic device 100 may control all long pages to scroll simultaneously and take a screenshot of an interface currently displayed by the electronic device 100. After the electronic device 100 controls scrolling of all the long pages, the electronic device 100 may display a scrolling screenshot interface 700 shown in FIG. 7A.

Figure 7A:
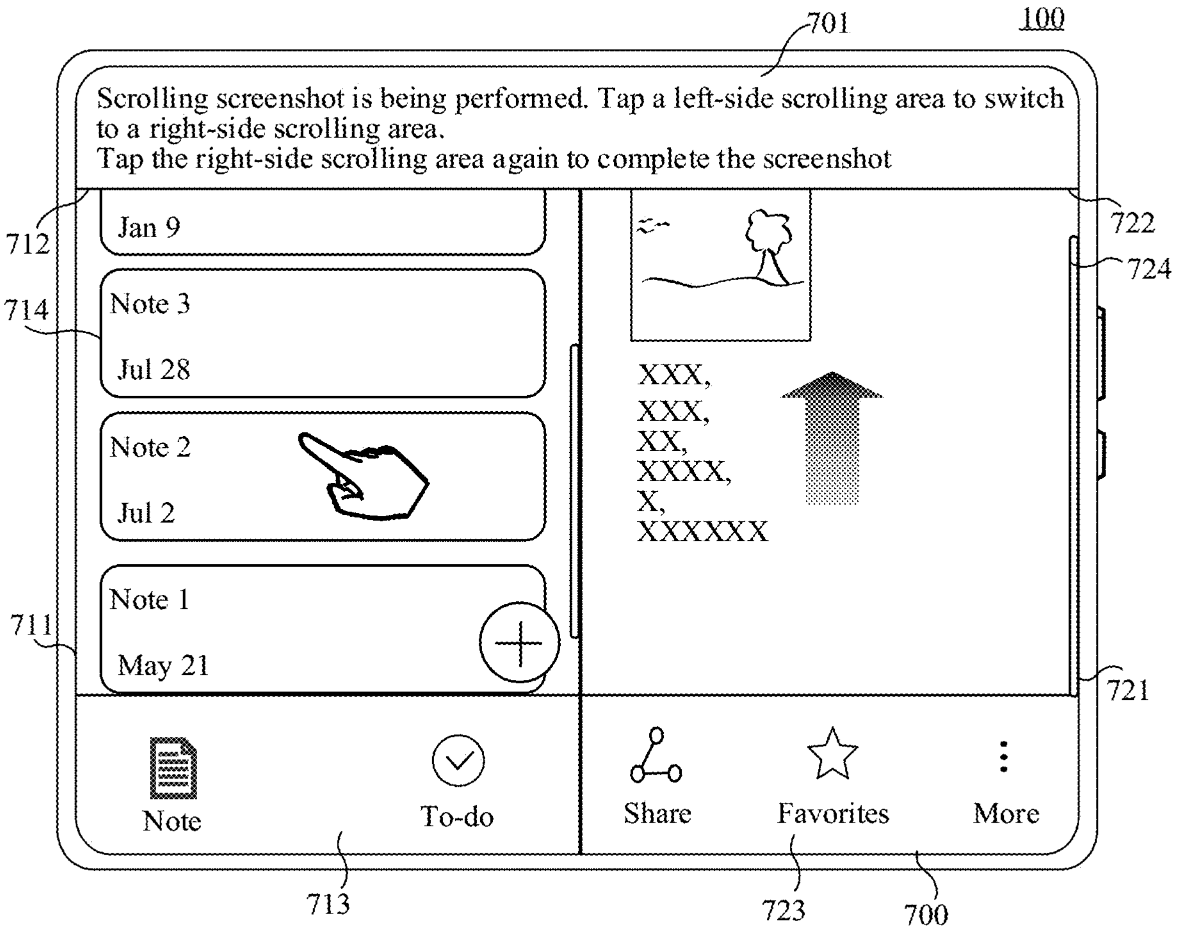
FIG. 7A to FIG. 7D are schematic diagrams of a group of interfaces according to an embodiment of this application.

As shown in FIG. 7A, the electronic device 100 may display the scrolling screenshot interface 700, and the scrolling screenshot interface 700 may include prompt information 701, a display area 711, a display area 721, and the like. The display area 711 may include a scrolling window 712 and a fixed bar 713, and the scrolling window 712 may display a part of content of a page 714. The display area 721 may include a scrolling window 722 and a fixed bar 723, and the scrolling window 722 may display a part of content of a page 724. For a description of the scrolling screenshot interface 700, refer to the description of the scrolling screenshot interface 630 in FIG. 6B. Details are not described herein again.

The electronic device 100 may receive an input operation (for example, single-tapping) by the user on the display area 711, and in response to the operation, the electronic device 100 stops performing scrolling screenshot on the display area 711 in advance, and takes a screenshot of the scrolling screenshot interface 730 currently displayed by the electronic device 100. In addition, the electronic device 100 may continue to take a scrolling screenshot of the display area 621.

Figure 7B:
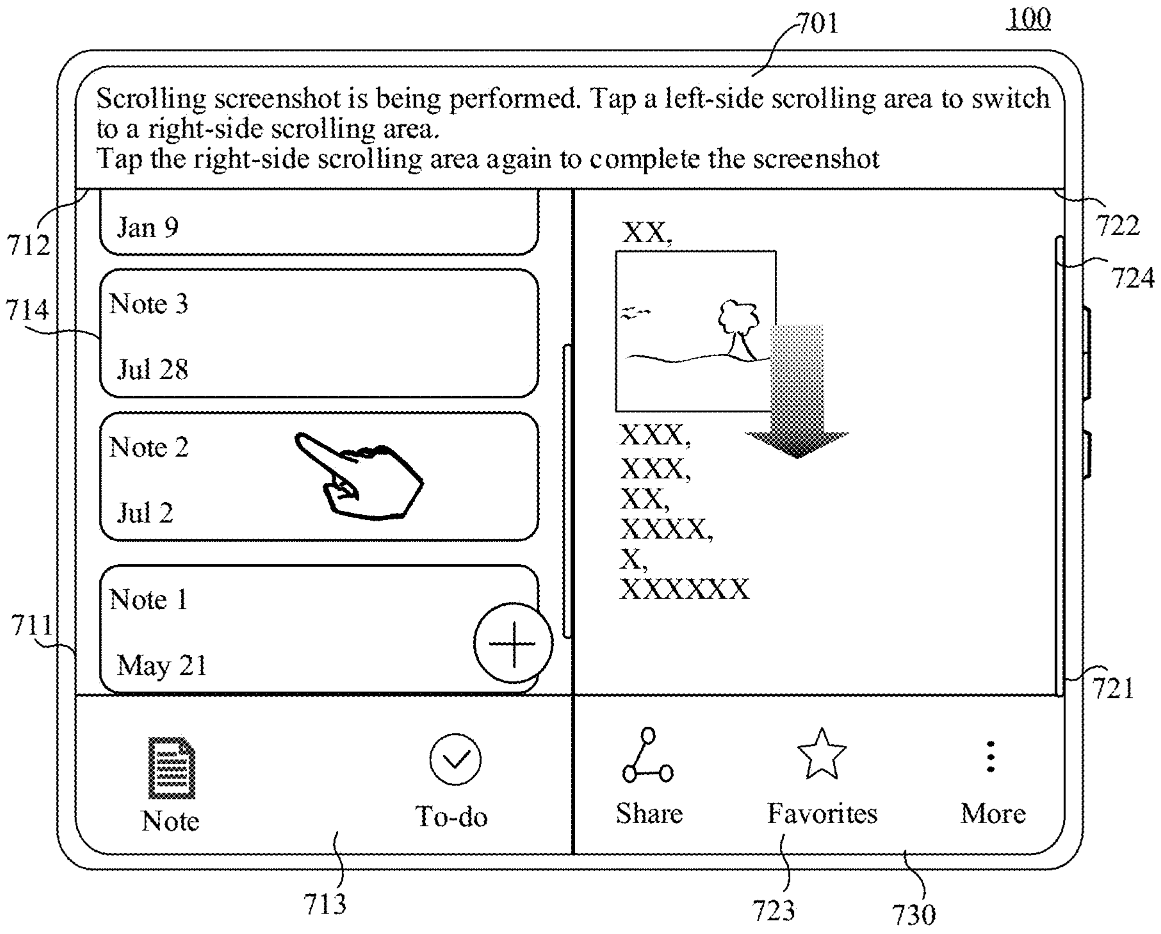

In an embodiment, when the electronic device 100 controls the page 724 to scroll up, the preset length is greater than a length of a remaining page that is not displayed in the scrolling window and that is of the page 724. The electronic device 100 may control a bottom edge of the page 724 to be far away from a bottom border of the scrolling window 722, and continue to scroll up until a scrolling distance of the page 724 is equal to the preset length (as shown in FIG. 7A, the scrolling window 722 displays a bottom part of the page 724 and a bottom blank area), where the preset length is a distance at which the electronic device 100 controls the page 724 to scroll each time. Then, the electronic device 100 controls the page 724 to scroll down (as shown in FIG. 7B, the scrolling window 722 displays a bottom part of the page 724) until the bottom edge of the page 724 overlaps the bottom border of the scrolling window 722. The electronic device 100 may take a screenshot of an interface currently displayed.

After the electronic device 100 receives an input operation (for example, single-tapping) by the user on the display area 711, and in response to the operation, after the electronic device 100 stops scrolling screenshot on the display area 711 in advance, the electronic device 100 detects that the page 624 is scrolled to the bottom, and the electronic device 100 stops a scrolling screenshot operation, to obtain a long screenshot image.

Figure 7C:
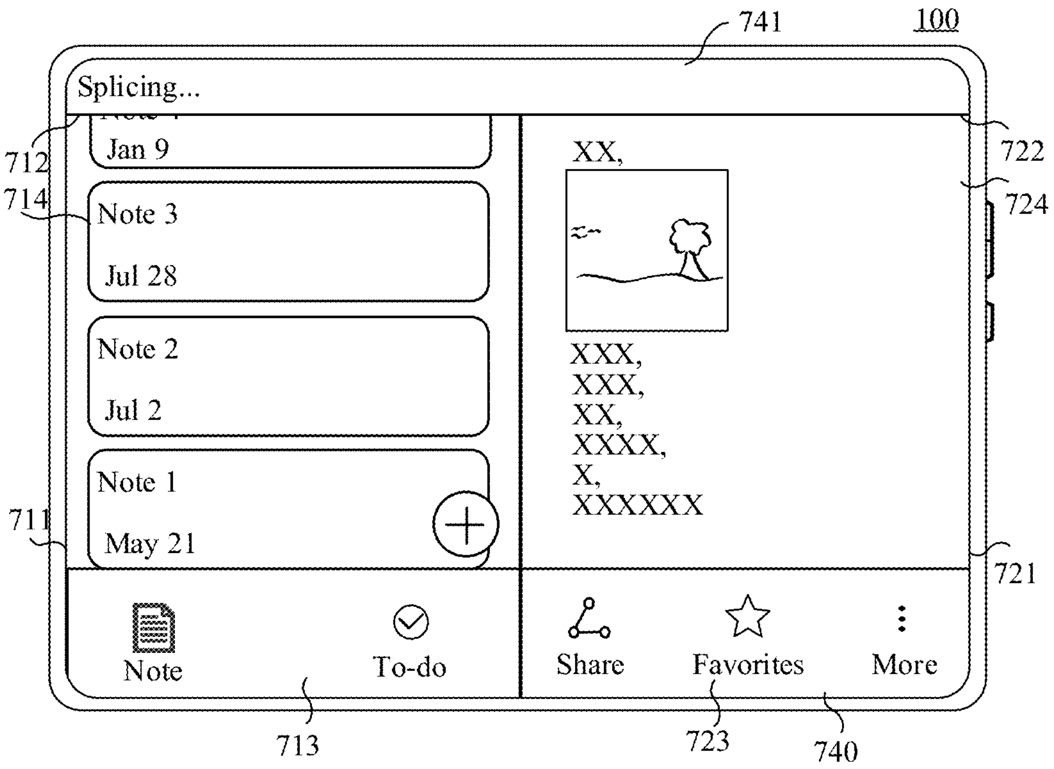

In an embodiment, the electronic device 100 may display a scrolling completion interface 740 shown in FIG. 7C. The scrolling completion interface 740 may include prompt information 741, a display area 711, and a display area 721. The prompt information 741 may prompt the user that the electronic device 100 is processing screenshots. For example, the prompt information may display prompt text of "splicing . . . ". As shown in FIG. 7C, the current scrolling window 712 may display a part of content of the page 714 in the scrolling window 712 when the electronic device 100 receives an operation performed by the user. The scrolling window 722 may display the bottom part of the page 724.

Figure 7D:
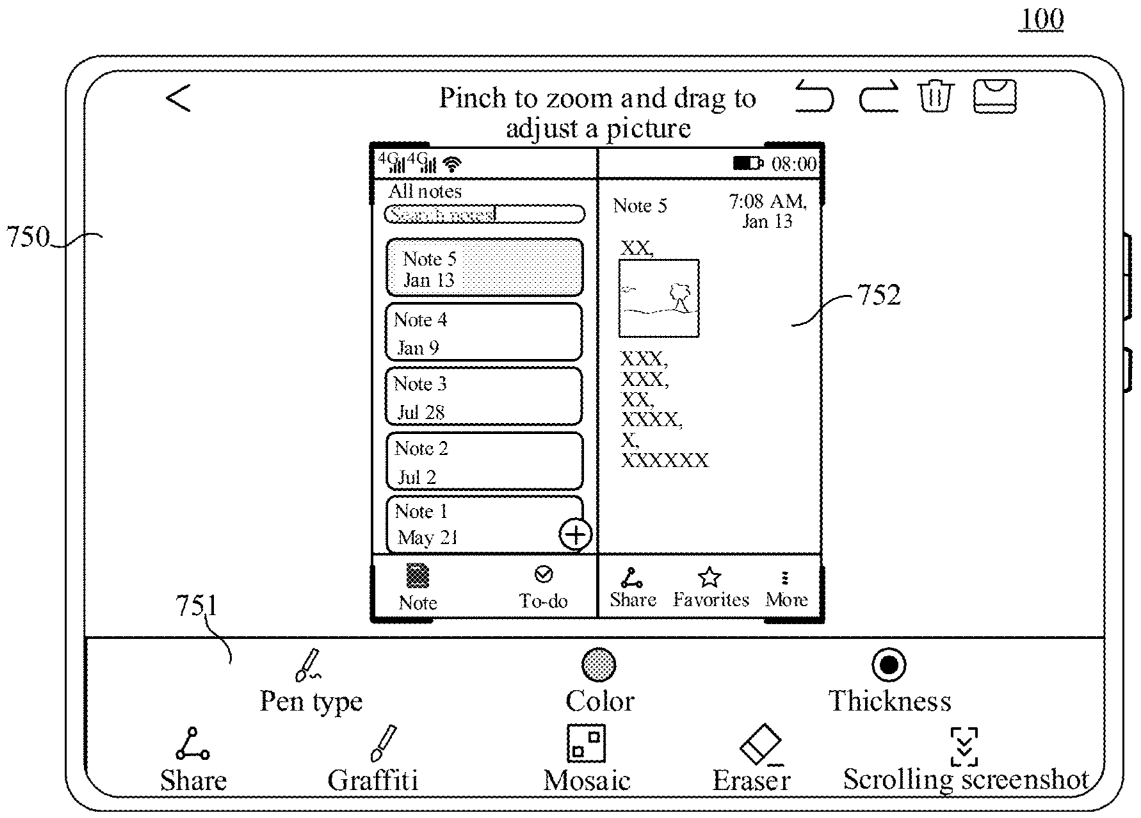

The operation of displaying, by the electronic device 100, the scrolling completion interface is optional. After the electronic device 100 performs a scrolling screenshot on the display area 721, the electronic device 100 may directly store an obtained long screenshot image to a gallery, or the electronic device 100 may display a screenshot display interface 750 shown in FIG. 7D. For a description of the screenshot display interface 750, refer to the description of the screenshot display interface 560 shown in FIG. 5E. Details are not described herein again. In an embodiment, the electronic device 100 simultaneously performs scrolling screenshot on a plurality of display areas. When the electronic device 100 detects that a long page in only one display area has not been scrolled to the bottom, after the electronic device 100 receives an input operation (for example, single-tapping) by the user on the display area, the electronic device 100 stops a scrolling screenshot operation in advance in response to the operation, to obtain a long screenshot image.

In an embodiment, the electronic device 100 simultaneously performs scrolling screenshot on a plurality of display areas. When a scrolling screenshot operation is not completed on a page of a scrolling area, and a page of any other scrolling window is scrolled to the bottom, the electronic device 100 may fill a preset background image at the bottom of the page, so that the page continues to scroll up until the scrolling screenshot operation is completed on all display areas.

For example, after the electronic device 100 receives the operation performed by the user on the floating window 411 in the embodiment shown in FIG. 4D, the electronic device 100 may control all long pages to scroll simultaneously and take a screenshot of an interface currently displayed by the electronic device 100. After the electronic device 100 controls scrolling of all the long pages, the electronic device 100 may display a scrolling screenshot interface 800 shown in FIG. 8A.

Figure 8A:
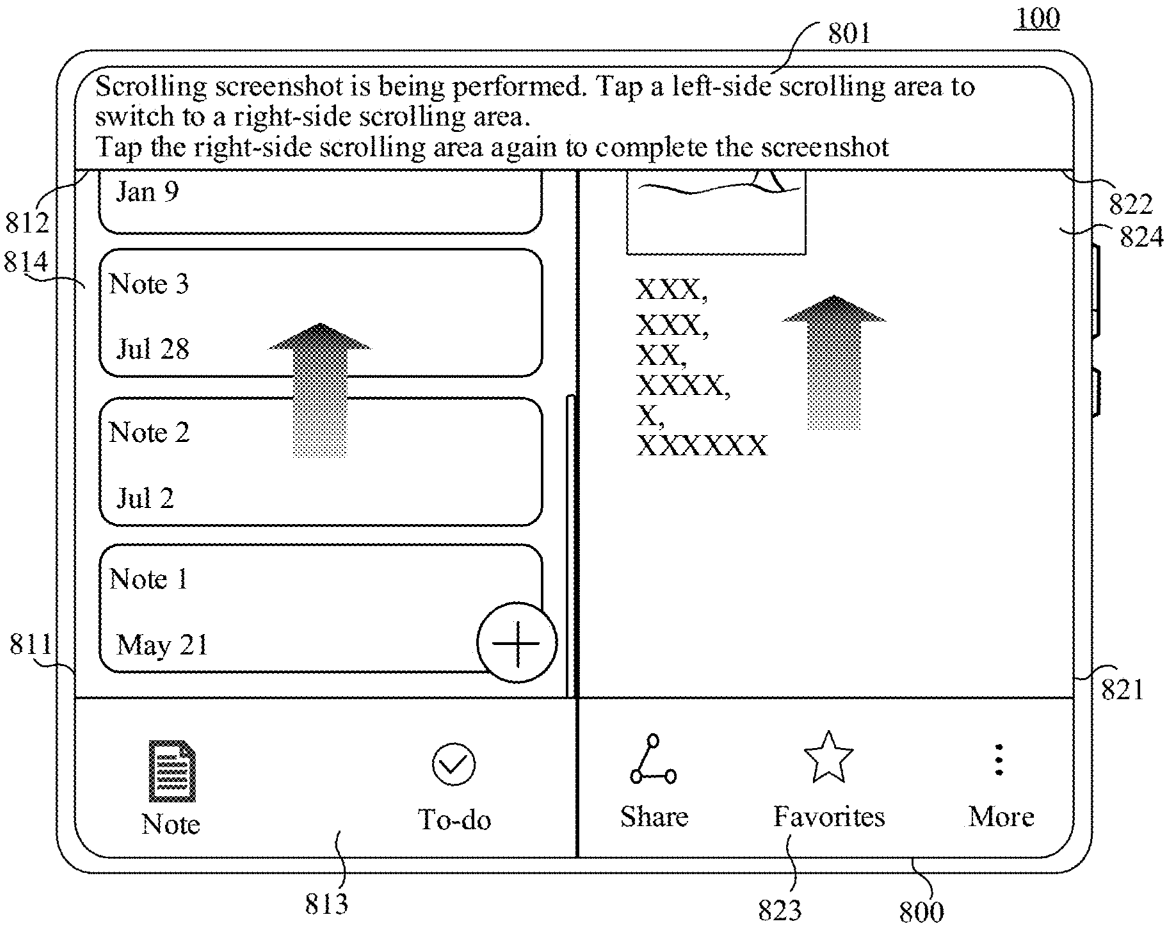
FIG. 8A to FIG. 8C are schematic diagrams of another group of interfaces according to an embodiment of this application.

As shown in FIG. 8A, the electronic device 100 displays the scrolling screenshot interface 800. The scrolling screenshot interface 800 includes prompt information 801, a display area 811, a display area 821, and the like. The display area 811 may include a scrolling window 812 and a fixed bar 813, and the scrolling window 812 may display a part of content of a page 814. The display area 821 may include a scrolling window 822 and a fixed bar 823, and the scrolling window 822 may display a part of content of a page 824. For a description of the scrolling screenshot interface 800, refer to the description of the scrolling screenshot interface 630 in FIG. 6B. Details are not described herein again.

Before the electronic device 100 displays the scrolling screenshot interface 800, the electronic device 100 has controlled a bottom edge of the page 824 to be far away from a bottom border of the scrolling window 822. In this case, the electronic device 100 may synchronously splice a preset background image at the bottom of the page 824, to extend the page 824. In this way, before the scrolling screenshot operation is completed on the page 824 in the display area 811, the electronic device 100 may continue to control the page 824 to scroll up.

Figure 8B:
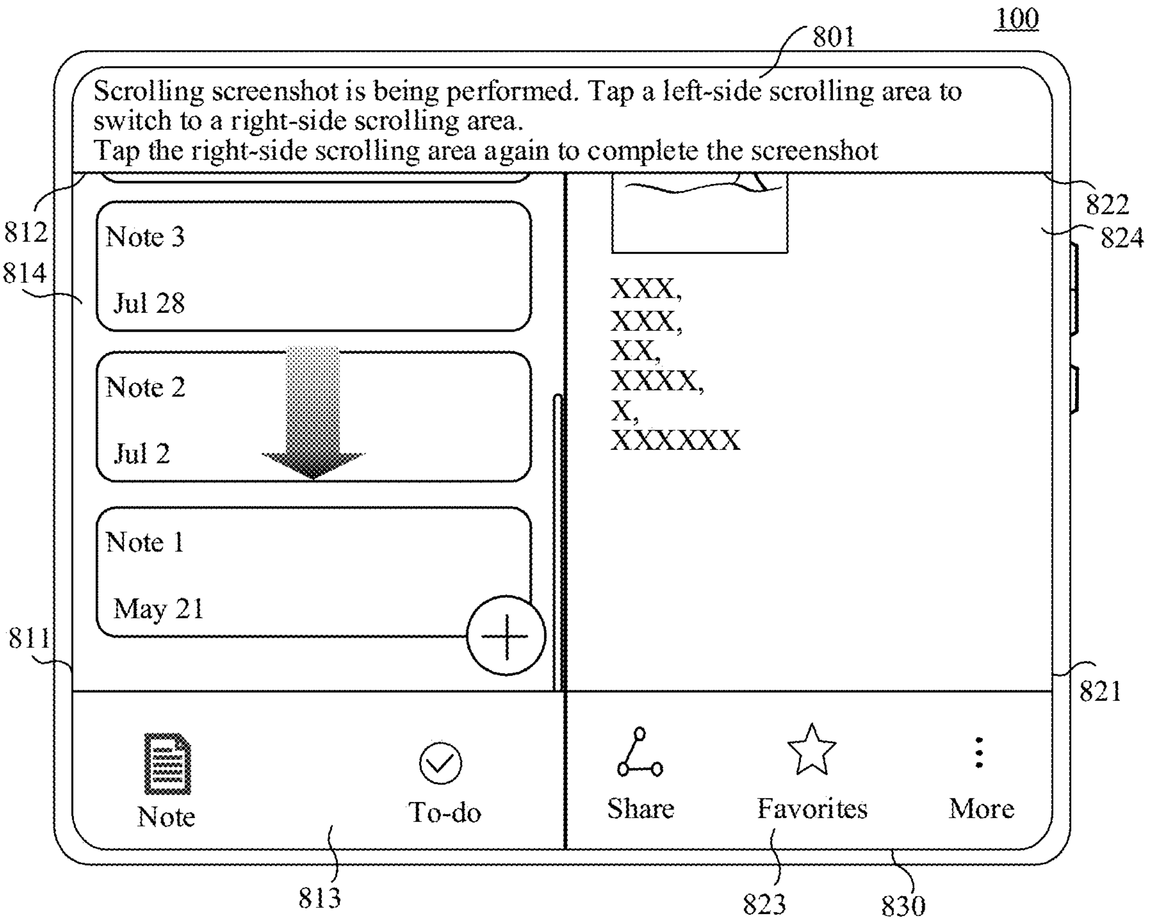

In an embodiment, when the electronic device 100 controls the page 814 to scroll up, the preset length is greater than a length of a remaining page that is not displayed in the scrolling window and that is of the page 814. The electronic device 100 may control a bottom edge of the up (as shown in FIG. 8A, the scrolling window 812 displays a bottom part of the page 814) until a scrolling distance of the page 814 is equal to the preset length, where the preset length is a distance that the electronic device 100 controls the page 814 to scroll each time. Then, the electronic device 100 controls the page 814 to scroll down (as shown in FIG. 8B, the scrolling window 812 displays a bottom part of the page 814 and a bottom blank area) until the bottom edge of the page 724 overlaps the bottom border of the scrolling window 722. The electronic device 100 may take a screenshot of an interface currently displayed.

Figure 8C:
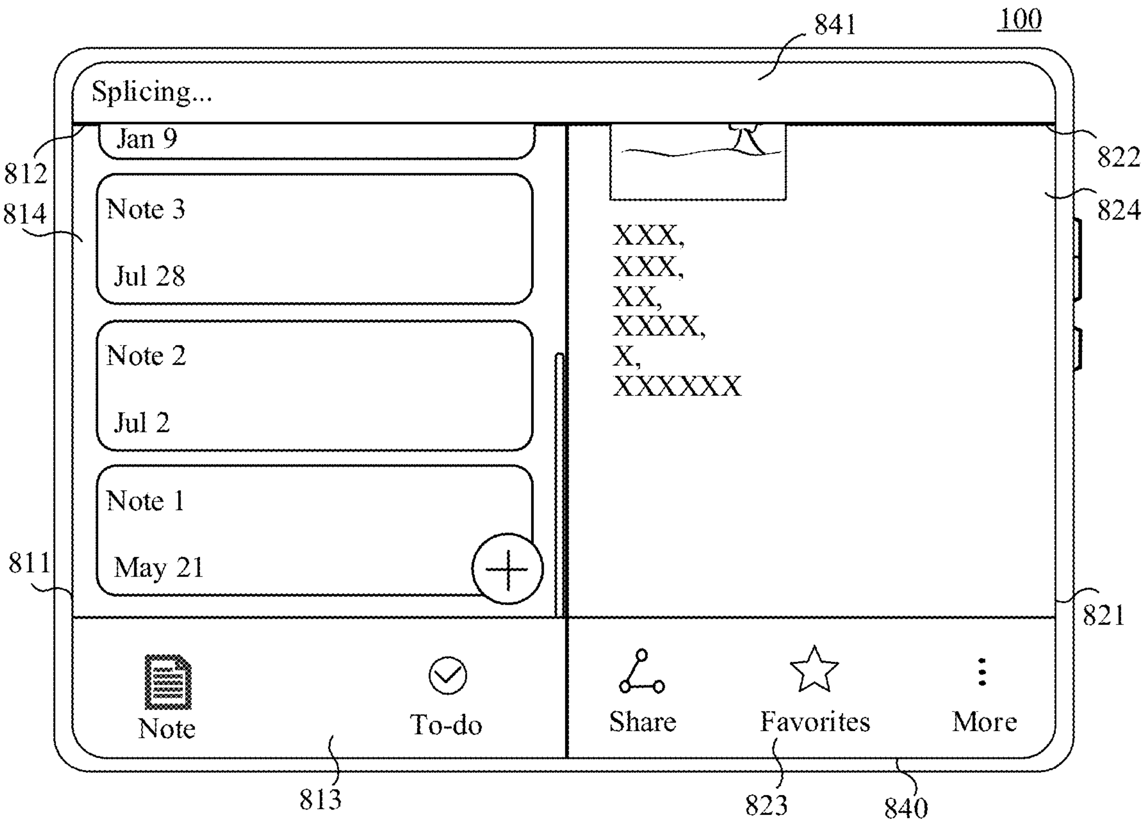

When detecting that the page 814 is scrolled to the bottom, the electronic device 100 stops filling the preset background image at the bottom of the page 824. The electronic device 100 stops the scrolling screenshot operation to obtain a long screenshot image. The electronic device 100 may display a scrolling completion interface 840 shown in FIG. 8C. The scrolling completion interface 840 may include prompt information 841, a display area 811, and a display area 821. The prompt information 841 may prompt the user that the electronic device 100 is processing screenshots. For example, the prompt information may display prompt text of "splicing . . . ". As shown in FIG. 8C, the current scrolling window 812 may display a part of content of the page 814 in the scrolling window 812 when the electronic device 100 receives an operation performed by the user. The scrolling window 822 may display a bottom part of the page 824 and a preset background image for filling.

The operation of displaying, by the electronic device 100, the scrolling completion interface is optional. After the electronic device 100 performs a scrolling screenshot on the display area 811, the electronic device 100 may directly store an obtained long screenshot image to a gallery: or the electronic device 100 may display a screenshot display interface 490 shown in FIG. 4L. For a description of the screenshot display interface 490, refer to the foregoing description. Details are not described herein again.

In an embodiment, when the electronic device 100 takes a scrolling screenshot of a display area on a multi-column interface, the electronic device 100 may accelerate a scrolling speed of a long page of a current display area in response to an input operation (for example, sliding up, touching and holding, or touching and holding to display a lower half of the display area) by the user on the current display interface (not limited to a display area, for example, the scrolling screenshot interface 455 shown in FIG. 4F).

In an embodiment, when the electronic device 100 takes a scrolling screenshot of a display area on a multi-column interface, the electronic device 100 may reduce a scrolling speed of a long page of a current display area in response to an input operation (for example, sliding down, touching and holding, or touching and holding to display an upper half of the display area) by the user on the current display interface (not limited to a display area, for example, the scrolling screenshot interface 455 shown in FIG. 4F).

In an embodiment, the electronic device 100 may separately perform scrolling screenshot on a plurality of display areas, to obtain respective column-wise screenshot images of the plurality of display areas. The electronic device 100 may compare lengths of a plurality of column-wise screenshot images to obtain a long column-wise screenshot image and a short column-wise screenshot image. The electronic device 100 may splice the preset background image at the bottom of the short column-wise screenshot image, to obtain a filled image. The long column-wise screenshot image and the filled screenshot image may be collectively referred to as result images. The electronic device 100 may display the result images, and provide a selection button. The user can select a desired result image by performing an input operation (for example, selecting). When the electronic device 100 detects that the user selects a result image, the electronic device 100 may store the result image. When the electronic device 100 detects that the user selects a plurality of result images, the electronic device 100 may splice the plurality of result images into one long screenshot image, and then store the long screenshot image.

Figure 9A:
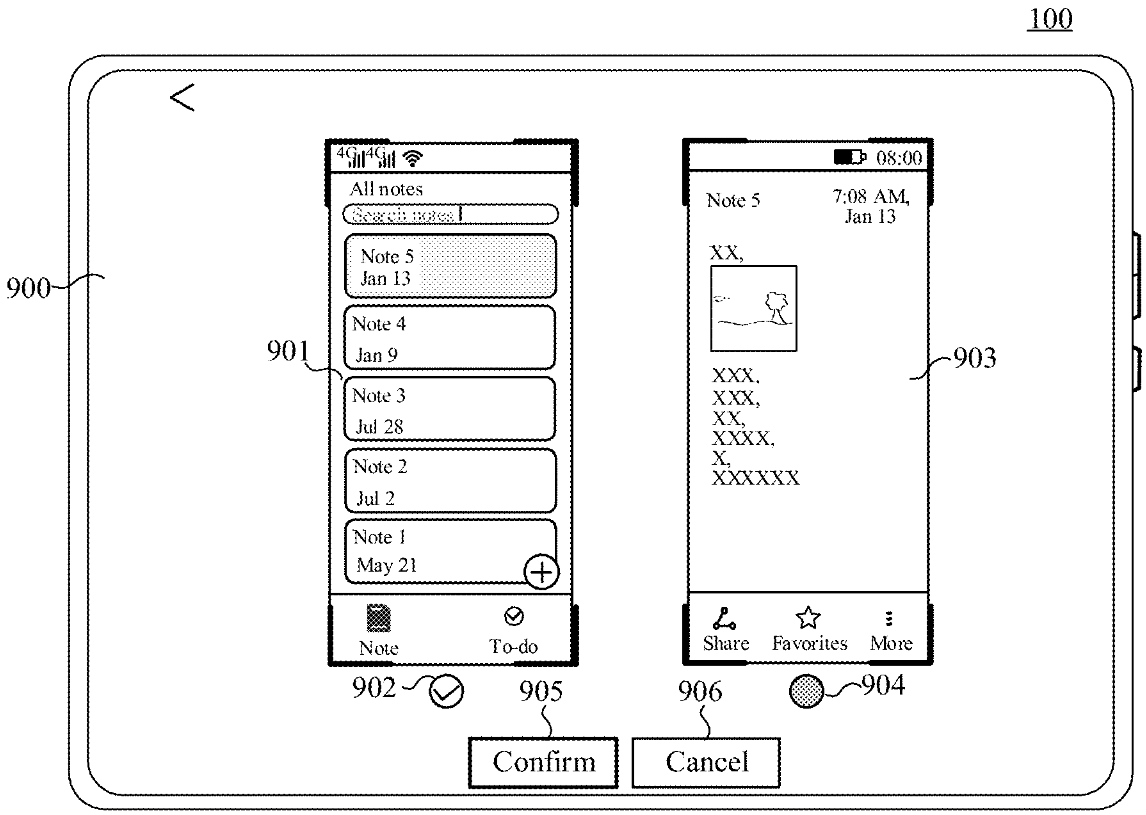
FIG. 9A and FIG. 9B are schematic diagrams of another group of interfaces according to an embodiment of this application.

For example, as shown in FIG. 9A, after the electronic device 100 performs a scrolling screenshot operation on a memo application interface, the electronic device 100 may display an interface 900. The interface 900 may include but is not limited to a result image 901, a result image 903, a selection control 902, a selection control 904, a "Confirm" control 905, and a "Cancel" control 906. The result image 901 is a result image of a display area on a left side of the memo application interface. The selection control 902 may include an enabled state and a disabled state, and the selection control 902 is in the disabled state by default. When the electronic device 100 detects that the user selects the result image 901, the selection control 902 may be switched from the disabled state to the enabled state. When the electronic device 100 detects again that the user selects the result image 901, the selection control 902 may be switched from the enabled state to the disabled state. The result image 903 is a result image of a display area on a right side of the memo application interface. The selection control 904 may include an enabled state and a disabled state, and the selection control 904 is in the disabled state by default. When the electronic device 100 detects that the user selects the result image 903, the selection control 904 may be switched from the disabled state to the enabled state. When the electronic device 100 detects again that the user selects the result image 903, the selection control 904 may be switched from the enabled state to the disabled state. The "Confirm" control 905 may be configured to determine a selected result image. The "Cancel" control 906 may be configured to delete a result of the screenshot, and return to the memo application interface 420 shown in FIG. 4B.

After the electronic device 100 receives the result image 901 selected by the user, the selection control 902 is in the enabled state. Then, when the electronic device 100 receives an input operation (for example, single-tapping) by the user on the "Confirm" control 905, in response to the operation, the electronic device 100 may store the result image 901 to the gallery, or the electronic device 100 may display a screenshot display interface 910 shown in FIG. 9B.

Figure 9B:
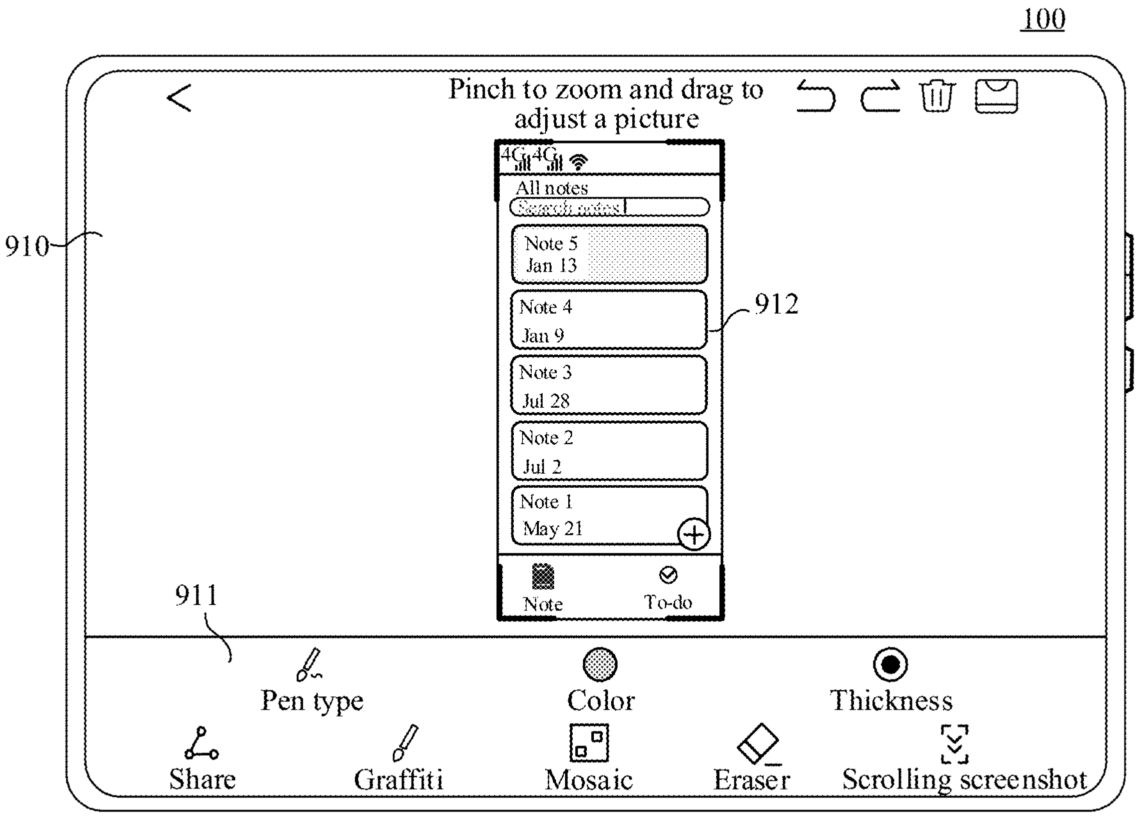

For example, as shown in FIG. 9B, the screenshot display interface 910 may include a long screenshot image 912 and a bottom operation bar 911. The long screenshot image 912 is the result image 901 shown in FIG. 9A.

In an embodiment, after the electronic device 100 receives the result image 901 and the result image 903 selected by the user, both the selection control 902 and the selection control 904 are in the enabled state. When the electronic device 100 receives an input operation (for example, single-tapping) by the user on the "Confirm" control 905, in response to the operation, the electronic device 100 may splice the two result images left and right into a long screenshot image. The electronic device 100 may store the long screenshot image to the gallery, or the electronic device 100 may display the screenshot display interface 490 shown in FIG. 4L.

In an embodiment, the electronic device 100 may further detect a page sliding operation by the user, and perform scrolling screenshot. In an embodiment, when taking a scrolling screenshot of a display area on a multi-column interface, the electronic device 100 may receive an input operation (for example, sliding up/sliding down) by the user on a specified long page, and in response to the operation, the electronic device 100 may scroll the long page. When the electronic device 100 detects that a scrolling distance of the long page reaches a preset distance (where the preset distance is a border length of a scrolling window in a scrolling direction), or the electronic device 100 detects that the user stops sliding, the electronic device 100 may stop a screenshot operation, to obtain a long screenshot image. In an embodiment, the electronic device 100 may display prompt information (for example, a downward arrow), and the prompt information may be used to prompt the user to drag a long page of a display area.

With reference to some modules in the diagram of the software structure shown in FIG. 2B, the following describes the scrolling screenshot method provided in embodiments of this application.

Figure 10:
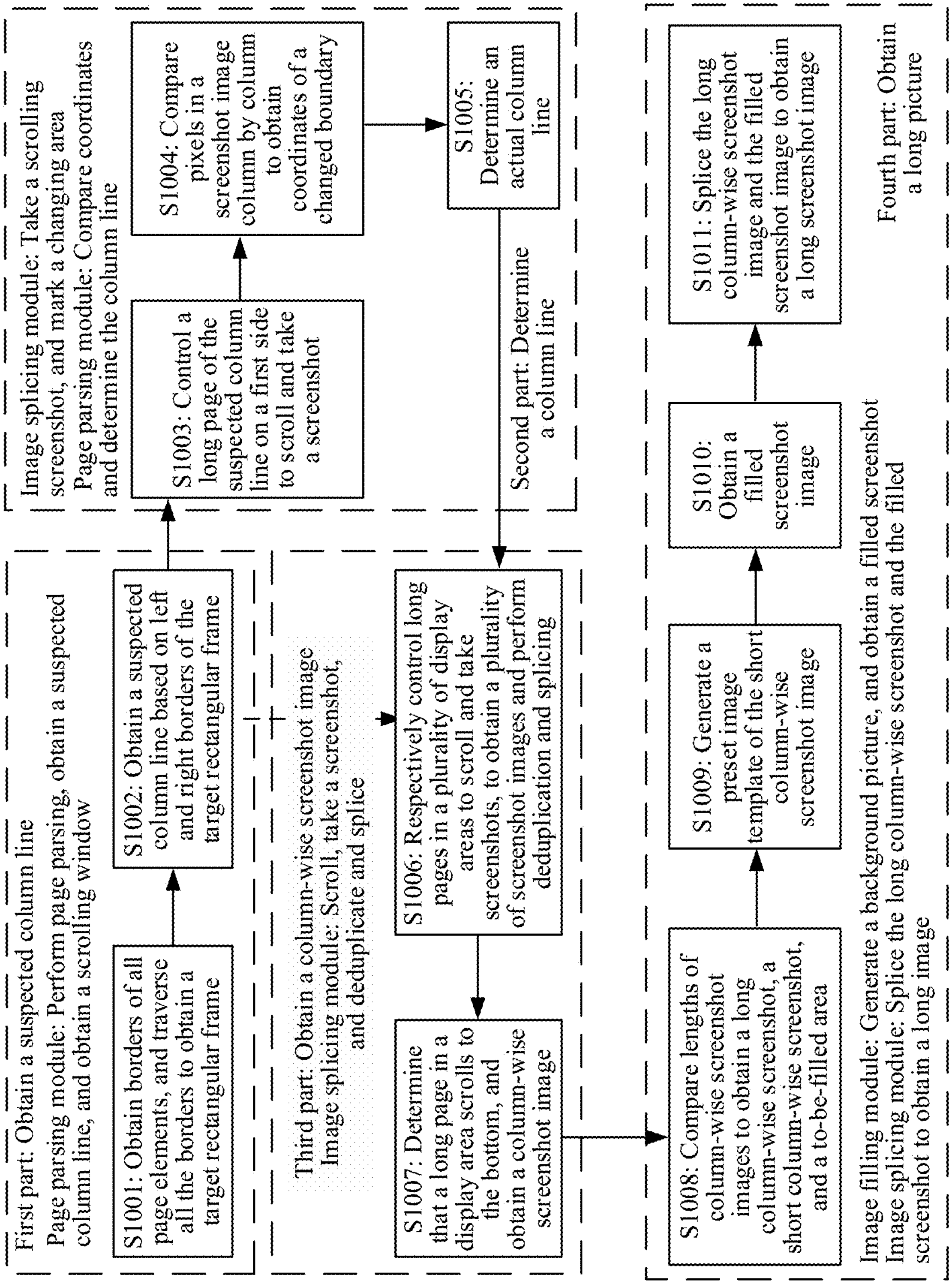
FIG. 10 is a flowchart of a scrolling screenshot method according to an embodiment of this application.

For example. FIG. 10 is a schematic flowchart of a scrolling screenshot method according to an embodiment of this application. The electronic device 100 may complete a scrolling screenshot operation by using a plurality of software modules in cooperation. The plurality of modules may include but are not limited to a page parsing module, an image splicing module, and an image filling module.

For example, as shown in FIG. 10, internal execution operations of the scrolling screenshot may be described by using the following four parts. The four parts are respectively as follows: First part: Obtain a suspected column line. Second part: Determine an actual column line. Third part: Obtain a column-wise screenshot image. Fourth part: Obtain a long image. Each part includes some operations, and execution of each part requires cooperation of one or more software modules.

First Part: Obtain a Suspected Column Line.

The first part includes operation S1001 and operation S1002. The operations of the first part may be performed by the page parsing module on the electronic device 100. A page analysis module is mainly configured to obtain a page element, obtain a suspected column line, obtain a scrollable page element, and the like.

S1001. The electronic device 100 obtains all page elements of a currently displayed interface, and traverses outer borders of all the page elements to obtain a target rectangular frame. In addition, the electronic device 100 may obtain a scrollable page element.

The electronic device 100 may obtain all page elements of a current interface, and obtain outer borders of the page elements. The outer borders of all the page elements are traversed. When an outer border of a page element is inside an outer border of another page element, the outer border of the page element is removed. The outer borders of all the page elements are traversed, and outer borders that have no other outer borders inside are retained. The retained outer borders are referred to as target rectangular frames.

Figure 11A:
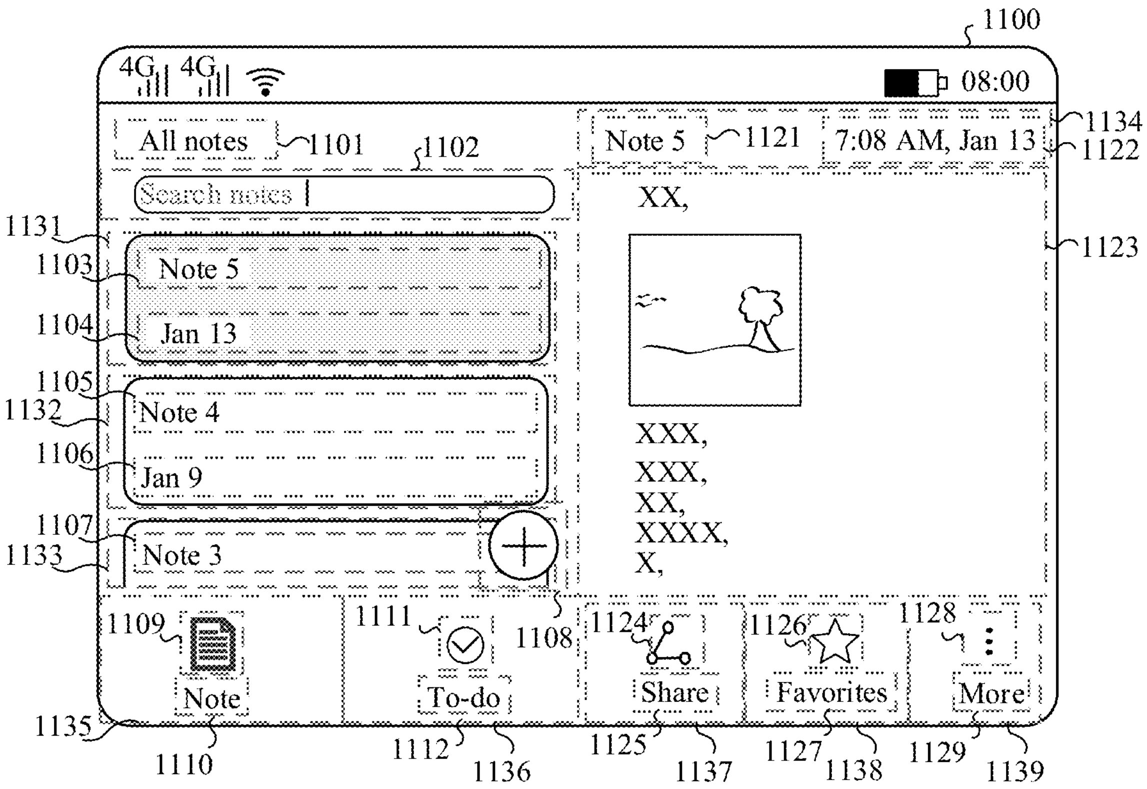
FIG. 11A to FIG. 11C are schematic diagrams of identification operations of a scrolling screenshot method according to an embodiment of this application.
Figure 11B:
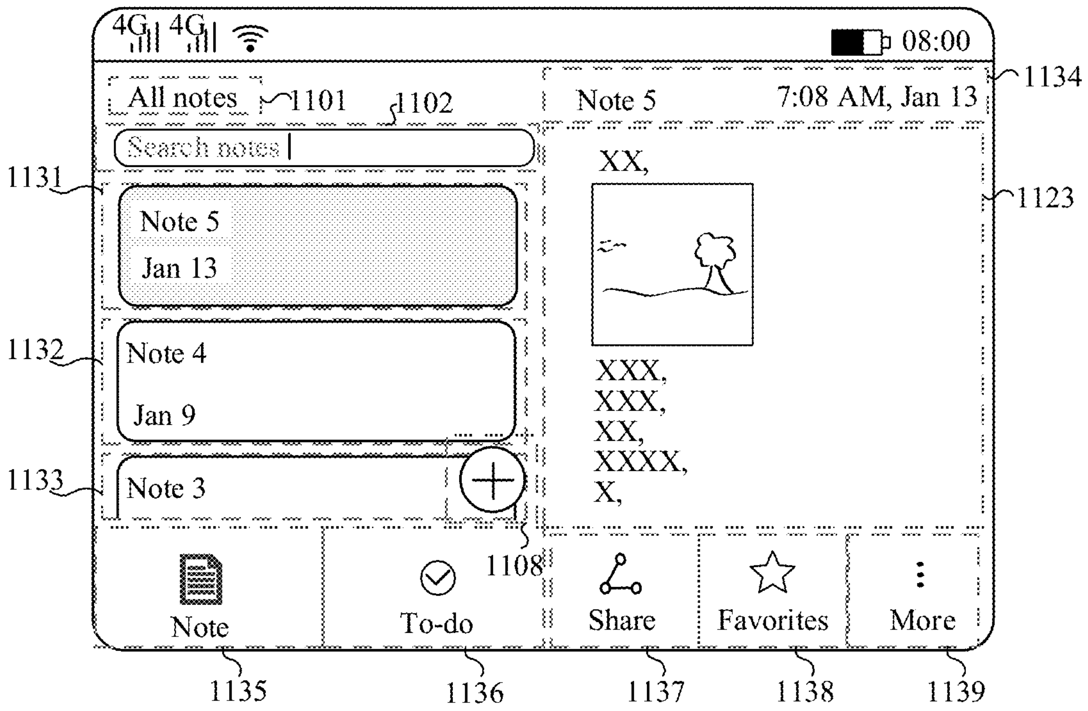

For example, for a process of obtaining the target rectangular frame in operation S1001, refer to FIG. 11A to FIG. 11B.

As shown in FIG. 11A, the electronic device 100 may obtain all page elements and outer borders of a memo application interface 1100. The electronic device 100 may mark outer borders of the following page elements in the memo application interface 1100. The outer borders may include a text border 1101, a control border 1102, a text border 1103, a text border 1104, a text border 1105, a text border 1106, a text border 1107, a control border 1108, an icon border 1109, a text border 1110, a text border 1121, a text border 1122, a text border 1123, an icon border 1124, a text border 1125, an icon border 1126, a text border 1127, an icon border 1128, a text border 1129, a control border 1131, a control border 1132, a control border 1133, a title border 1134, a control border 1135, a control border 1136, a control border 1137, a control border 1138, and a control border 1139.

The electronic device 100 may traverse the outer borders of the page elements, remove outer borders in a range of other outer borders, and retain target rectangular frames that do not overlap each other. For example, if the text border 1103 and the text border 1104 are in a range of the control border 1131, the electronic device 100 retains the control border 1131, and removes the text border 1103 and the text border 1104.

For example, as shown in FIG. 11B, the electronic device 100 retains the text border 1101, the control border 1102, the text border 1123, the control border 1131, the control border 1132, the control border 1133, the title border 1134, the control border 1135, the control border 1136, the control border 1137, the control border 1138, and the control border 1139.

When obtaining all page elements of a current interface, the electronic device 100 may determine whether a page element can be scrolled. The electronic device 100 may determine, by performing the following several methods, whether the page element can be scrolled.

(1) The electronic device 100 may determine whether a name of a page element includes a field, where the field may be a field generally included in a name of a scrollable page element such as "webview", "scrollview", "listview", "recycleview", or "contentview", to determine whether the page element can be scrolled. If a name of a page element includes a field, it is considered that the page element can be scrolled. If a name of a page element does not include a field, it is considered that the page element cannot be scrolled. For example, if a name of the page 424 of the interface 420 shown in FIG. 4B is "scrollview_page", the electronic device 100 may determine that the page 424 is a scrollable page element.

(2) The electronic device 100 may create a scrolling element list, and the electronic device 100 may maintain and update the list. When parsing the interface, the electronic device 100 queries the scrolling element list of the interface, to obtain a scrollable page element.

For example, as shown in Table 1, Table 1 is a scrolling element list of the memo application interface 420 shown in FIG. 4B.

TABLE 1

Scrolling element list of a memo application interface

| Name of page element name | Scrollable or not |
|---|---|
| scrollview_page | Yes |
| display_area | No |
| . . . | . . . |

Table 1 may be a two-column list. The first column lists a name of a page element, and the second column lists whether the page element is scrollable or not. When a value of the second column of a page element is "Yes", the page element can be scrolled. When a value of the second column of a page element is "No", the page element cannot be scrolled. For example, the first row in Table 1 shows whether the page 424 of the memo application interface 420 shown in FIG. 4B can be scrolled. A name of the page 424 is "scrollview_page", and a value of whether the page 424 can be scrolled is "Yes". When the electronic device 100 queries Table 1, whether the page 424 can be scrolled may be learned.

(3) The electronic device 100 may add a scrollable attribute to a parent class of a page element and a method for obtaining the scrollable attribute. The electronic device 100 may determine whether page content displayed by the parent class element exceeds a border size of the parent class element. When the electronic device 100 determines that the page exceeds the border, the electronic device 100 assigns a value true to the scrollable attribute. When the electronic device 100 determines that the page does not exceed the border, the electronic device 100 assigns a value false to the scrollable attribute. When parsing a current page, the electronic device 100 may invoke the method for obtaining the scrollable attribute, and the method may return a result indicating whether the current parent element is a scrollable area. Certainly, the electronic device 100 may obtain a scrolled page element by using methods including but not limited to the foregoing listed methods.

S1002. The electronic device 100 obtains a suspected column line based on left and right borders of the target rectangular frame.

The electronic device 100 may record horizontal coordinates of left and right border lines of the target rectangular frame, traverse the horizontal coordinates, and connect borders with a same horizontal coordinate by using vertical lines. The electronic device 100 may measure lengths of the lines, and determine lines whose lengths reach a standard (that is, a percentage of a length of a vertical border line of an interface, for example, 40%) or lines whose lengths rank top N (N is any positive integer, for example, lines whose lengths rank top 2).

The electronic device 100 may detect positions of the lines whose lengths reach a standard or positions of the lines whose lengths rank top N, and determine that a line that is located in a middle area (an area in which a middle axis of the interface extends a length of a horizontal border by a proportion (for example, 40%) to the left and right) or that is not located in an edge area (an area in which left and right borders of the interface extend a length of a horizontal border by a proportion (for example, 5%) to the middle axis) is a suspected column line.

Figure 11C:
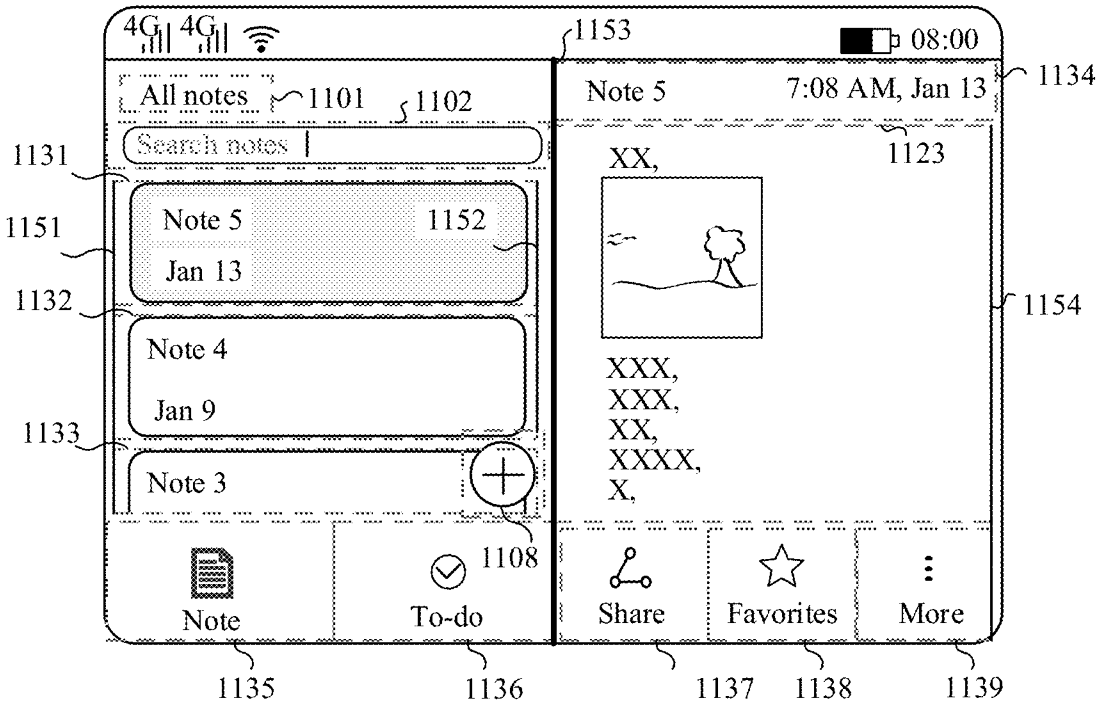

For example, as shown in FIG. 11C, the electronic device 100 obtains a line 1151 based on left frames of the control border 1131, the control border 1132, and the control border 1133. The electronic device 100 obtains a line 1152 based on right frames of the control border 1131, the control border 1132, and the control border 1133. The electronic device 100 obtains a line 1153 based on a left border of the title border 1134, a left border of the text border 1123, and a right border of the control border 1136. The electronic device 100 obtains a line 1154 based on right frames of the text border 1123 and the control border 1139. The electronic device 100 may measure lengths of the line 1151, the line 1152, the line 1153, and the line 1154. For example, the electronic device 100 needs a line whose length exceeds 25% of a vertical border of the interface, all the four lines may be retained. The electronic device 100 needs a line in a middle area (an area in which a central axis extends a length of 30% to both sides). The electronic device 100 detects that the line 1151 and the line 1154 are not in the middle area, and the electronic device 100 detects that the line 1152 and the line 1153 are in the middle area. The electronic device 100 marks the line 1152 and the line 1153 as suspected column lines.

In an embodiment, when generating a multi-column interface (for example, an interface of a same screen shared by a plurality of applications), the electronic device 100 marks an actual column line of a current interface. When the electronic device 100 performs a scrolling screenshot operation on the interface, the electronic device 100 may directly obtain an actual column line without parsing the interface.

In an embodiment, when the electronic device 100 generates a multi-column interface, the electronic device 100 may mark a border of a scrolling window: Alternatively, the electronic device 100 may obtain the border of the scrolling window by performing page parsing on the multi-column interface. The electronic device 100 may detect a border line located in the middle area (referring to the foregoing description) and determine that the border line is an actual column line, or detect a border line not located in the edge area (referring to the foregoing description) and determine that the border line is an actual column line. In this way, the electronic device 100 may skip the operations in the second part, and directly perform operations in the third part, that is, perform operation S1006 from operation S1002.

Second Part: Determine an Actual Column Line.

The second part includes operation S1003 to operation S1005. Operation S1003 and operation S1004 may be performed by the image splicing module on the electronic device 100. Operation S1005 may be performed by the page parsing module on the electronic device.

S1003. The electronic device 100 controls a scrolling window on a first side of the suspected column line to scroll and takes a screenshot of an interface currently displayed by the electronic device 100.

The electronic device 100 may take a screenshot of the interface currently displayed by the electronic device 100, to obtain a screenshot image 1. After controlling a long page on the first side of the suspected column line to scroll by a distance, the electronic device 100 takes a screenshot of the interface currently displayed by the electronic device 100 again, to obtain a screenshot image 2.

Figure 12A:
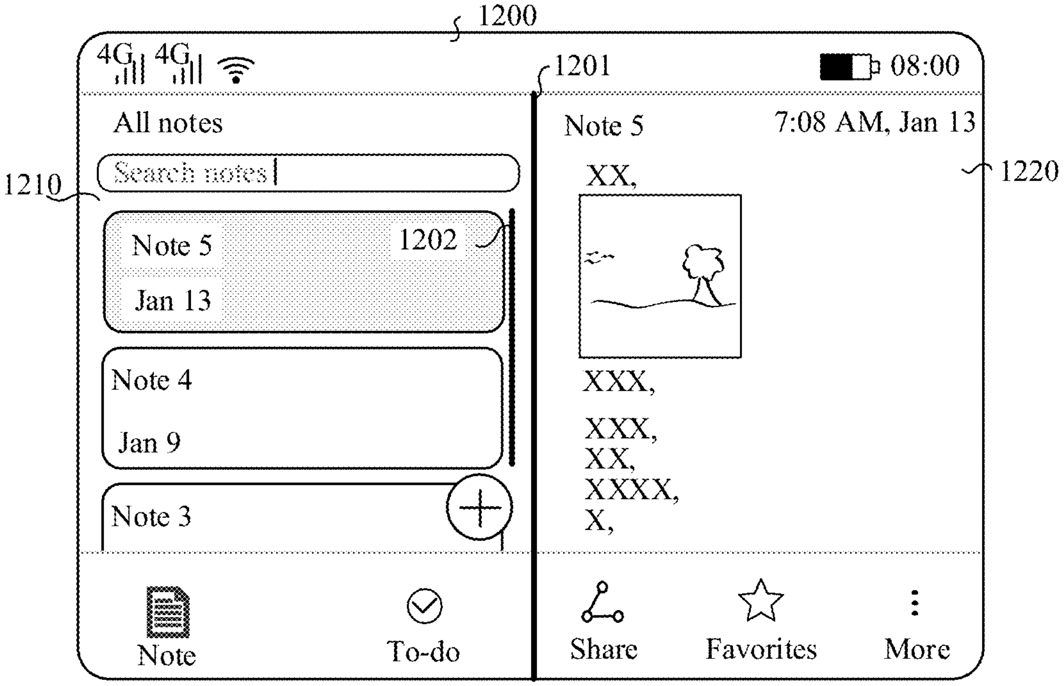
FIG. 12A and FIG. 12B are schematic diagrams of identification operations of a scrolling screenshot method according to an embodiment of this application.

For example, the electronic device 100 may display the memo application interface 420 shown in FIG. 4B. The electronic device 100 may take a screenshot of the memo application interface 420, to obtain a screenshot image shown in FIG. 12A. The screenshot image is the screenshot image 1 obtained by the electronic device 100. After controlling the page 424 to scroll up by a distance, the electronic device 100 takes a screenshot of the interface currently displayed by the electronic device 100 again, to obtain a screenshot image shown in FIG. 12B. The screenshot image is the screenshot image 2 obtained by the electronic device 100.

S1004. The electronic device 100 compares pixels in a plurality of screenshot images column by column, to obtain change boundary coordinates.

The electronic device 100 may compare a screenshot image before scrolling with a screenshot image after scrolling, to obtain a picture change range. When performing an image comparison operation, the electronic device 100 may perform pixel comparison column by column from the first side to the other side. When detecting that a pixel in a column (which may also be referred to as a pixel column) changes, the electronic device 100 records a horizontal coordinate of the column. After image comparison is completed, the electronic device 100 may obtain horizontal coordinates of columns in which all pixels change.

The electronic device 100 may determine a leftmost horizontal coordinate in horizontal coordinates of columns in which all pixels change as a left boundary coordinate. The electronic device 100 may determine a rightmost horizontal coordinate in horizontal coordinates of columns in which all pixels change as a right boundary coordinate. The change boundary coordinates include a left boundary coordinate and a right boundary coordinate.

Figure 12B:
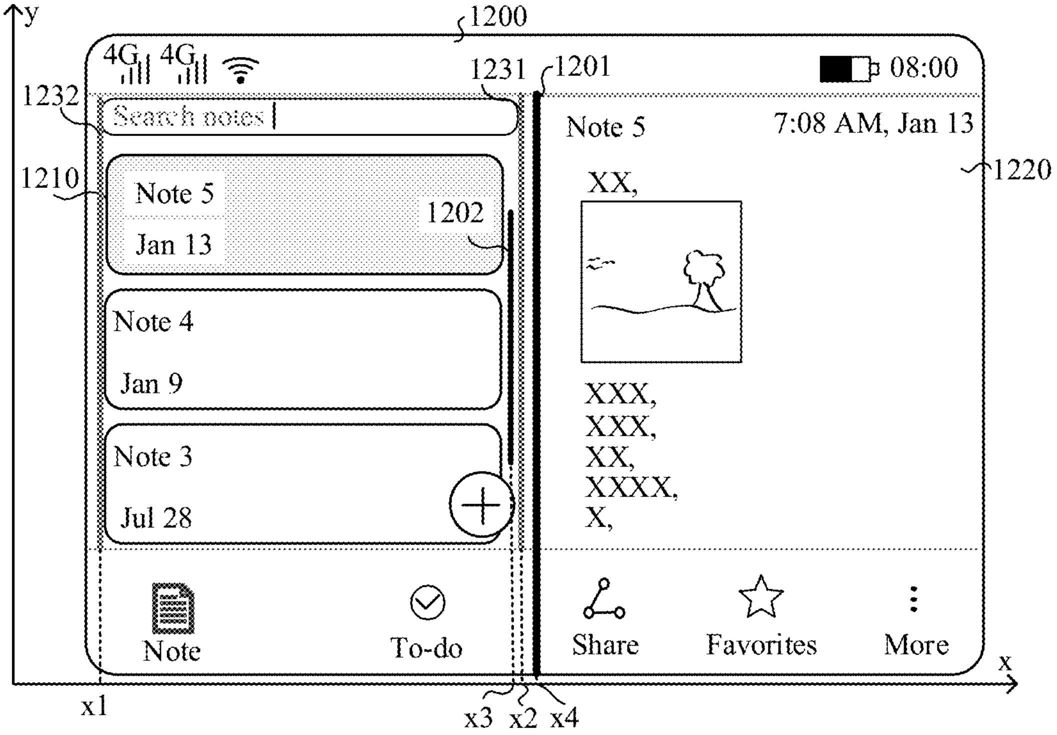

For example, in the example of operation S1003, the electronic device 100 may obtain a screenshot image 1 (shown in FIG. 12A) and a screenshot image 2 (shown in FIG. 12B). The electronic device 100 may perform pixel comparison on the two screenshot images row by row from left to right. The electronic device 100 may record horizontal coordinates of columns whose pixels change in the screenshot image 2. Finally, leftmost and rightmost horizontal coordinates in the horizontal coordinates are retained. For example, in FIG. 12B, a line 1232 marks a column in which a leftmost pixel changes, and a line 1231 marks a column in which a rightmost pixel changes. A horizontal coordinate (for example, x1) of the line 1231 and a horizontal coordinate (for example, x2) of the line 1232 are collectively referred to as change boundary coordinates.

S1005. The electronic device 100 obtains an actual column line.

The electronic device 100 may detect whether all change boundary coordinates fall on a first side of a suspected column line. When the electronic device 100 detects that all the change boundary coordinates are on the first side of the suspected column line, the suspected column line may be determined as an actual column line. When the electronic device 100 detects that some of the change boundary coordinates are on the first side of the suspected column line, and some are on a second side, the electronic device 100 may determine that the suspected column line is not an actual column line.

When the electronic device 100 determines that none of the obtained suspected column lines is an actual column line, it is determined that the interface is not a multi-column interface but a single-column interface. The electronic device 100 may directly take a scrolling screenshot of the single-column interface.

For example, as shown in FIG. 12B, in the example of operation S1004, the electronic device 100 may obtain a horizontal coordinate of the line 1231 and a horizontal coordinate of the line 1232. The two horizontal coordinates are collectively referred to as change boundary coordinates. Both a line 1201 and a line 1202 are suspected column lines obtained by the electronic device 100 by performing the operations of the first part (where the line 1202 in FIG. 12B is the line 1152 in FIG. 11C, the line 1201 in FIG. 12B is the line 1153 in FIG. 11C, and both the line 1152 and the line 1153 in FIG. 11C are suspected column lines). The electronic device 100 detects that a horizontal coordinate (for example, x3) of the line 1202 is between a change boundary coordinate (for example, x1) and a change boundary coordinate (for example, x2), and the electronic device 100 determines that the line 1202 is not an actual column line. The electronic device 100 detects that a horizontal coordinate (for example, x4) of the line 1201 is on a right side of the change boundary coordinate (for example, x1) and the change boundary coordinate (for example, x2), and the electronic device 100 determines that the line 1201 is an actual column line.

After determining the actual column line, the electronic device 100 may restore the displayed interface to a display state before the column line is determined. In an embodiment, when performing operation S1001 to operation S1005, the electronic device 100 may cover a mask on the current display interface (where the mask may be used to block the current interface, that is, may make the foregoing operation invisible to the user), and display prompt information (for example. "scrolling screenshot is being enabled").

In an embodiment, for some interfaces, the electronic device 100 may directly obtain actual column lines of the interfaces. For example, some interfaces may be split-screen interfaces (where the electronic device 100 displays interfaces of a plurality of applications on a display screen of the electronic device 100 on split screens in response to some operations by the user).

Third Part: Obtain a Column-Wise Screenshot Image.

The third part includes operation S1006 to operation S1007. Operation S1006 and operation S1007 may be performed by the image splicing module on the electronic device 100.

S1006. The electronic device 100 separately controls long pages in a plurality of display areas to scroll and takes a screenshot of an interface currently displayed by the electronic device 100 (which is briefly referred to as screenshot), and the electronic device 100 may remove a repeated area from the obtained plurality of screenshot images and splice the screenshot images into one image (which is briefly referred to as de-duplication and splicing).

The electronic device 100 may sequentially control a plurality of display areas to scroll and take a screenshot of an interface that is currently displayed by the electronic device 100 (taking a screenshot of an interface that is currently displayed by the electronic device 100 may be referred to as screenshot for short). The electronic device 100 may control a distance of each scrolling of the long page to not exceed a ratio (for example, 60%) of a length of a vertical border of the scrolling window. When the electronic device 100 scrolls a long page of the specified display area, the electronic device 100 may first take a screenshot to obtain a first screenshot image, then control the long page to scroll by a distance, and take a screenshot again to obtain a second screenshot image.

The electronic device 100 crops image content that is in the first screenshot image and that does not belong to the specified display area to obtain an area screenshot image A. The electronic device 100 may crop image content that is in the second screenshot image and that does not belong to the specified display area, to obtain an area screenshot image B. A size of the area screenshot image A is the same as a size of the area screenshot image B.

The electronic device 100 may determine, from the area screenshot image A, a repeated area of image content in the area screenshot image B. The electronic device 100 may determine whether a ratio of a repeated area in the area screenshot image A to a size of the area screenshot image A exceeds a preset threshold (for example, 90%).

When the electronic device 100 determines that the size ratio of the repeated area in the area screenshot image A to the size of the area screenshot image A is less than the preset threshold, the electronic device 100 may crop the repeated area in the area screenshot image A to obtain a cropped screenshot image 1. The electronic device 100 may splice the bottom of the cropped screenshot image 1 and the top of the area screenshot image B, to obtain an area spliced image 1. The electronic device 100 may record a position of the area screenshot image B in the area spliced image 1.

After obtaining the second screenshot image, the electronic device 100 may control the long page in the specified display area to continue to scroll by a distance, and takes a screenshot of an interface image currently displayed on a screen of the electronic device 100, to obtain a third screenshot image. The electronic device 100 may crop image content that is in the third screenshot image and that does not belong to the specified display area, to obtain an area screenshot image C. The area screenshot image A, the area screenshot image B, and the area screenshot image C have a same size. The electronic device 100 may determine, from the area spliced image 1, a repeated area of image content in the area screenshot image C. The electronic device 100 may crop and remove a repeated area from the area spliced image 1, to obtain a cropped screenshot image 2. The electronic device 100 may splice the bottom of the area spliced image 1 and the top of the cropped screenshot image 2, to obtain an area spliced image 2. By analogy, until the screen is scrolled to the bottom of the long page of the specified display area, a column-wise screenshot image of the specified display area is obtained.

When the electronic device 100 determines that the size ratio of the repeated area in the area screenshot image A to the size of the area screenshot image A is greater than the preset threshold (for example, 90%), the electronic device 100 may stop scrolling of the long page of the specified display area, and crop the repeated area in the area screenshot image A to obtain the cropped screenshot image 1. The electronic device 100 may splice the bottom of the cropped screenshot image and the top of the area screenshot image B, to obtain a column-wise screenshot image of the specified display area.

In an embodiment, when the electronic device 100 performs pixel comparison on the area screenshot image A and the area screenshot image B to obtain a repeated area, the electronic device 100 may compare pixels of a first row of the area screenshot image B with pixels of the area screenshot image A row by row from bottom to top, until pixels of the first row of the area screenshot image B are consistent with pixels of a row of the area screenshot image A, and a row of the area screenshot image A may be referred to as a suspected alignment row: Then, pixel comparison is performed between a second row of the area screenshot image B and a next row of the suspected alignment row of the area screenshot image A. When the electronic device 100 detects that pixels of the two rows are consistent, pixel comparison is performed again between a third row of the area screenshot image B and next two rows of the suspected alignment row of the area screenshot image A, and so on.

After detecting the suspected alignment row and detecting that lengths of a plurality of repeated rows of the area screenshot image A and the area screenshot image B do not reach a ratio (for example, 10%) of the length of the area screenshot image A, the electronic device 100 determines that the suspected alignment row is not an actual alignment row; and the actual alignment row is a first row of the repeated area in the area screenshot image A (where the repeated area is a continuous area included in both the area screenshot image A and the area screenshot image B). The electronic device 100 continues to perform pixel comparison between the first row of pixels of the area screenshot image B and a part above a suspected alignment row of a non-actual alignment row of the area screenshot image A row by row; until an actual alignment row is determined. That is, after a suspected alignment row is newly found, if the lengths of a plurality of repeated rows of the area screenshot image A and the area screenshot image B reaches a ratio (for example, 10%) of a screenshot length, it is determined that the suspected alignment row is an actual alignment row:

After finding the actual alignment row, the electronic device 100 continues to compare the area screenshot image A with the area screenshot image B until a complete repeated area is obtained.

In an embodiment, the electronic device 100 may also perform pixel comparison between the area screenshot image A and the area screenshot image B row by row from top to bottom.

Figure 13:
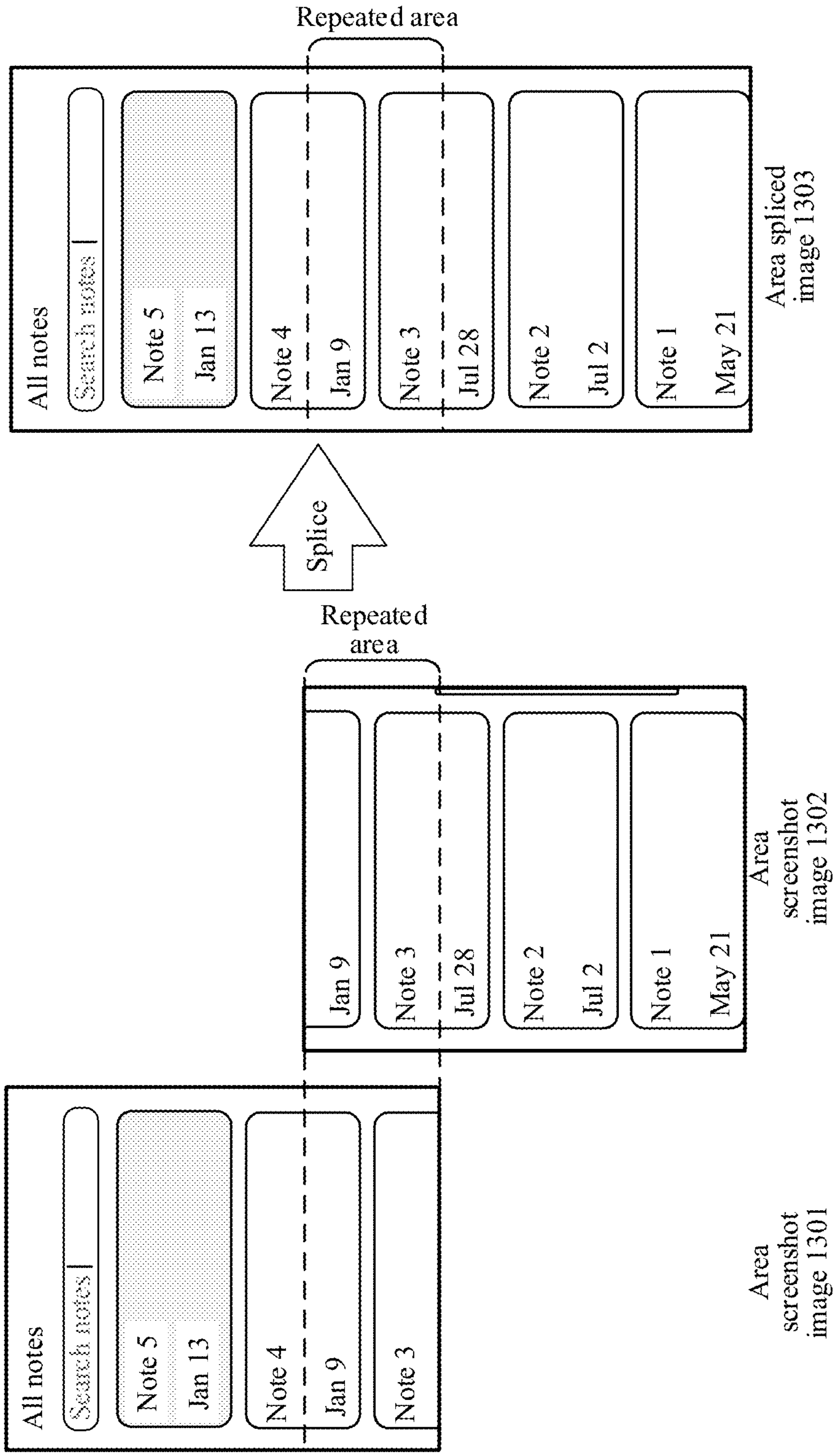
FIG. 13 is a schematic diagram of splicing operations of a scrolling screenshot method according to an embodiment of this application.

For example, a process in which the electronic device 100 performs a deduplication and splicing operation may be described with reference to FIG. 4B and FIG. 13. The electronic device 100 may display the memo application interface 420 shown in FIG. 4B. The electronic device 100 may take a screenshot of the memo application interface 420, to obtain a first screenshot image. After controlling the page 424 to scroll up by a distance, the electronic device 100 takes a screenshot of the interface currently displayed by the electronic device 100 again, to obtain a second screenshot image. The electronic device 100 crops image content that is in the first screenshot image and that does not belong to the specified display area, to obtain an area screenshot image A. The electronic device 100 may crop image content that is in the second screenshot image and that does not belong to the specified display area, to obtain an area screenshot image B. As shown in FIG. 13, an area screenshot image 1301 of the electronic device 100 is the area screenshot image A, and an area screenshot image 1302 is the area screenshot image B. The electronic device 100 may compare the area screenshot image 1301 with the area screenshot image 1302, to obtain a repeated area of the two images. The repeated area may be shown by an area marked by a dashed-line box in FIG. 13. The electronic device 100 may crop an image of a repeated area of the area screenshot image 1301, and then splice the top of the area screenshot image 1302 to the bottom of a cropped area screenshot image 1301, to obtain an area spliced image 1303.

S1007. The electronic device 100 may determine that a long page in a display area scrolls to the bottom, and obtain a column-wise screenshot image of the display area.

When the electronic device 100 detects that scrolling of a repeated area of two successive area screenshot images of a long page in a specified display area reaches a preset ratio (for example, 90%), the electronic device 100 may determine that a page in the scrolling area is scrolled to the bottom. The electronic device 100 may stop scrolling the long page in the specified display area.

In an embodiment, the electronic device 100 may mark a specified page element of the long page in the specified display area. The electronic device 100 may obtain display positions of the specified page element before and after scrolling the long page. When the electronic device 100 detects that the display positions of the specified page element obtained before and after scrolling the long page are the same, the electronic device 100 may determine that the long page is scrolled to the bottom. When the electronic device 100 detects that the display positions of the specified page element obtained before and after scrolling the long page are different, the electronic device 100 may determine that the long page is not scrolled to the bottom.

In an embodiment, the electronic device 100 may obtain a scrolling control, and when no new scrolling control appears in the scrolling area, it is determined that the long page is scrolled to the bottom.

In an embodiment, when the electronic device 100 detects that the interface includes a status bar (for example, the status bar 302 in the embodiment shown in FIG. 3A and FIG. 3B), the electronic device 100 may identify the status bar in a scrolling screenshot process. The electronic device 100 may crop some pictures of status bars in all screenshots, and after a scrolling screenshot operation ends, the electronic device 100 splices the pictures of the status bars on the top of a spliced long screenshot image, to obtain a long screenshot image including the status bar. Alternatively: when performing scrolling screenshot on the specified display area, the electronic device 100 may retain a status bar of a first screenshot image and crop a status bar of a screenshot image subsequently obtained. After the electronic device 100 deduplicates and splices a plurality of screenshot images in the specified display area, a column-wise screenshot image including the status bar may be obtained.

In an embodiment, when detecting that there is no scrolling window in the specified display area, the electronic device 100 directly takes a screenshot of a current display interface of the electronic device 100, to obtain a screenshot image. The electronic device 100 may retain a part of an image in a specified display area in the screenshot image, that is, the column-wise screenshot image in the specified display area.

In an embodiment, the electronic device 100 may first take a scrolling screenshot of all display areas to obtain screenshot images of all the display areas, and then the electronic device 100 deduplicates and splices screenshot images of different display areas to obtain a column-wise screenshot image of each display area.

In an embodiment, when the electronic device 100 takes a scrolling screenshot of the specified display area, the electronic device 100 may take a screenshot of a current display interface of the electronic device 100 to obtain a screenshot image, and then crop image content that is in the screenshot image and that does not belong to the specified display area, to obtain an area screenshot image 3. After controlling a long page of the specified display area to scroll by a fixed length (for example, the fixed length is 20 pixel values), the electronic device 100 takes a screenshot of a current display interface of the electronic device 100 to obtain a screenshot image, and then crops image content that does not belong to the specified display area from the screenshot image to obtain an area screenshot image 4. The electronic device 100 may crop a picture of a remaining length (for example, a 10 pixel values) of the area screenshot image 3 from bottom to top. The remaining length is a difference between a length of the area screenshot image and the fixed length. For example, the length of the area screenshot image is 30 pixel values, the fixed length is 20 pixel values, and the remaining length is 10 pixel values. The area screenshot image 4 and the area spliced image 3 are spliced together. When a length that the electronic device 100 controls the long page of the specified display area to scroll cannot reach the fixed length, the electronic device 100 may splice a last screenshot image by using an image comparison method.

In an embodiment, when the electronic device 100 detects that the specified display area includes a fixed bar, the electronic device 100 may identify the fixed bar in a process of performing a scrolling screenshot on the specified display area. The electronic device 100 may crop some pictures of fixed bars in all obtained screenshot images, and after the electronic device 100 removes a repeated area from all the screenshot images in the designated display area and splices the images into one image, the electronic device 100 splices a picture of the fixed bar at the bottom of the image to obtain a column-wise screenshot image including the fixed bar. Alternatively, the electronic device 100 may retain only a fixed bar of a last screenshot image obtained by the electronic device 100 after the long page of the specified display area is scrolled to the bottom, and the electronic device 100 may obtain a column-wise screenshot image including the fixed bar after splicing all the screenshot images of the specified display area. In addition, the electronic device 100 may record position information of the fixed bar in the column-wise screenshot image.

An embodiment of the application may provide the following several manners of obtaining a fixed bar of a current display interface of the electronic device 100.

In an embodiment, the electronic device 100 may obtain an upper border of the fixed bar through page parsing. In an embodiment, the electronic device 100 may obtain outer borders of all page elements of a current interface. All non-overlapping target rectangular frames are obtained. Vertical coordinates of upper and lower borders of all target rectangular frames are obtained, and borders with a same vertical coordinate are connected with a horizontal line. Horizontal lines within a distance (for example, a distance of 5 pixels) from a bottom border are discarded. The electronic device 100 may determine a horizontal line closest to the bottom in remaining lines as an upper border of the fixed bar.

Figure 14A:
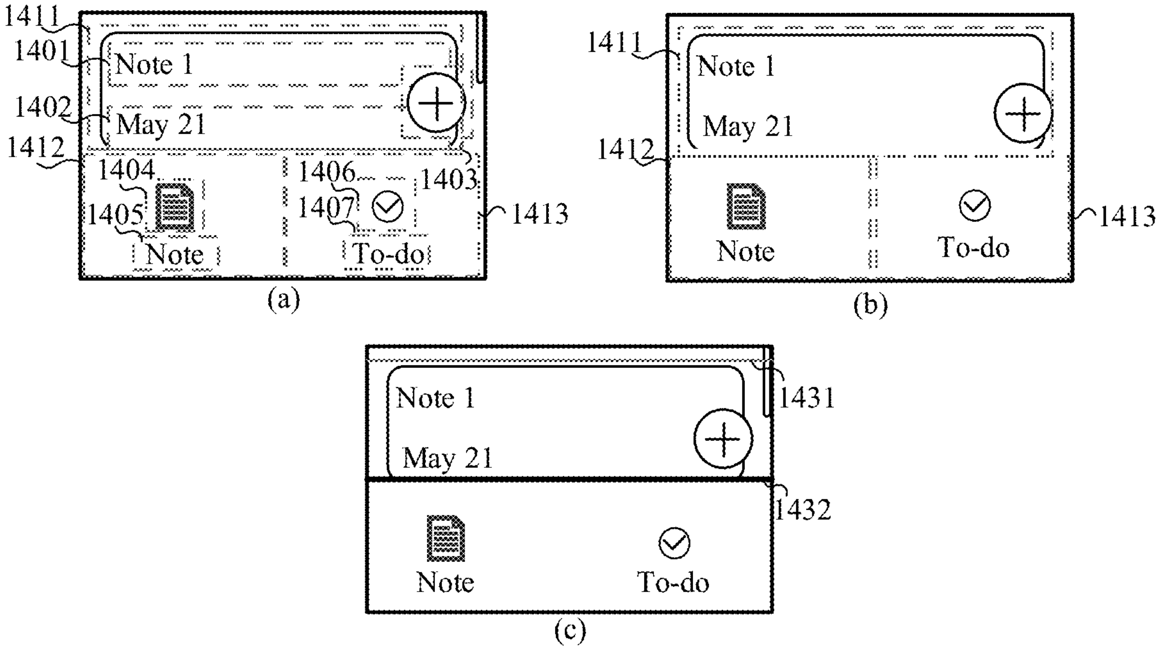
FIG. 14A to FIG. 14C are schematic diagrams of operations of identifying a fixed bar in a scrolling screenshot method according to an embodiment of this application.

For example, as shown in FIG. 14A. In (a), the electronic device 100 obtains an element border 1401 to an element border 1407 and an element border 1411 to an element border 1413 of a current interface. In (b), the electronic device 100 traverses the borders, and retains non-overlapping target rectangular frames, that is, the element border 1411, the element border 1412, and the element border 1413. In (c), the electronic device 100 connects a lower border of the element border 1411, an upper border of the element border 1412, and an upper border of the element border 1413 to obtain a line 1432, and the electronic device 100 connects an upper border of the element border 1411 to obtain a line 1431. The electronic device 100 determines that the line 1432 is closer to the bottom of the interface than the line 1431, and determines that the line 1432 is an upper border of the fixed bar. In other words, an area below the line 1432 is the fixed bar.

In an embodiment, the electronic device 100 may obtain the fixed bar through image comparison. In an embodiment, when the electronic device 100 performs scrolling screenshot on the specified display area, the electronic device 100 may obtain two area screenshot images before and after scrolling of the long page of the specified display area at a time. The electronic device 100 may perform pixel comparison on the two area screenshot images row by row from bottom to top. The electronic device 100 may determine a repeated area at the bottom of the two area screenshot images as the fixed bar.

Figure 14B:
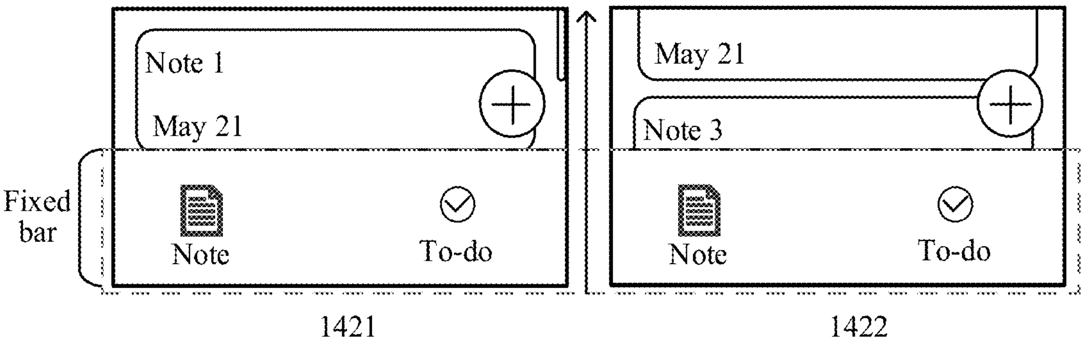

For example, as shown in FIG. 14B, the electronic device 100 obtains two area screenshot images, namely, an area screenshot image 1421 before a long page is scrolled once and an area screenshot image 1422 after the long page is scrolled once. The electronic device 100 may perform pixel comparison on the two area screenshot images row by row from bottom to top, as shown by arrows in the figure. A repeated area in a dashed-line box shown in the figure is obtained. The repeated area is the fixed bar.

In an embodiment, after obtaining the upper border of the fixed bar through page parsing, the electronic device 100 may use the image comparison method to verify the upper border of the fixed bar obtained through the page parsing, thereby increasing accuracy of identifying the fixed bar.

In an embodiment, the electronic device 100 may record position information of each control in the specified display area, and the electronic device 100 controls the long page in the specified display area to scroll by a distance. The electronic device 100 may mark a control whose position information does not change. The electronic device 100 may include, by using a rectangular frame, a control whose position information does not change. An upper border of the rectangular frame is an upper border of a topmost control in the controls whose position information does not change, and a left border, a right border, and a lower border of the rectangular frame are a left border, a right border, and a lower border of the specified display area. The rectangular frame is the border of the fixed bar.

Figure 14C:
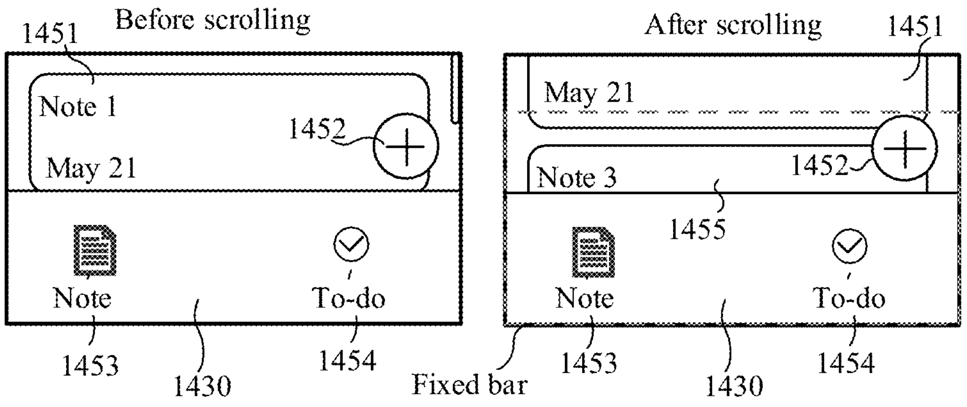

For example, as shown in FIG. 14C, the electronic device 100 displays an interface 1430. The interface 1430 may include but is not limited to a form 1451, a new icon 1452, a "Note" icon 1453, and a "To-do" icon 1454. The electronic device 100 may control the form 1451 to scroll up by a distance. The electronic device 100 detects that a position of the form 1451 changes, and positions of the new icon 1452, the "Note" icon 1453, and the "To-do" icon 1454 do not change. The electronic device 100 may use an upper border of the new icon 1452 as the upper border of the rectangular frame. A dashed-line box in the figure is the rectangular frame obtained by the electronic device 100, that is, the border of the fixed bar.

Fourth Part: Obtain a Long Screenshot Image.

The fourth part includes operation S1008 to operation S1011. Operation S1008 and operation S1010 may be performed by the image filling module on the electronic device 100. Operation S1011 may be performed by the image splicing module on the electronic device 100.

S1008. The electronic device 100 may compare lengths of column-wise screenshot images to obtain sizes of the long column-wise screenshot image, the short column-wise screenshot image, and the to-be-filled area.

After the electronic device 100 obtains column-wise screenshot images of all display areas, the electronic device 100 may compare lengths of all the column-wise screenshot images, and mark one or more column-wise screenshot images with a longest length as long column-wise screenshot images, and mark other column-wise screenshot images as short column-wise screenshot images.

When the electronic device 100 detects that there is no short column-wise screenshot image, the electronic device 100 may skip operation S1009 and operation S1010, and directly perform operation S1011. The electronic device 100 splices the plurality of long column-wise screenshot images to obtain a long screenshot image.

Figure 15A:
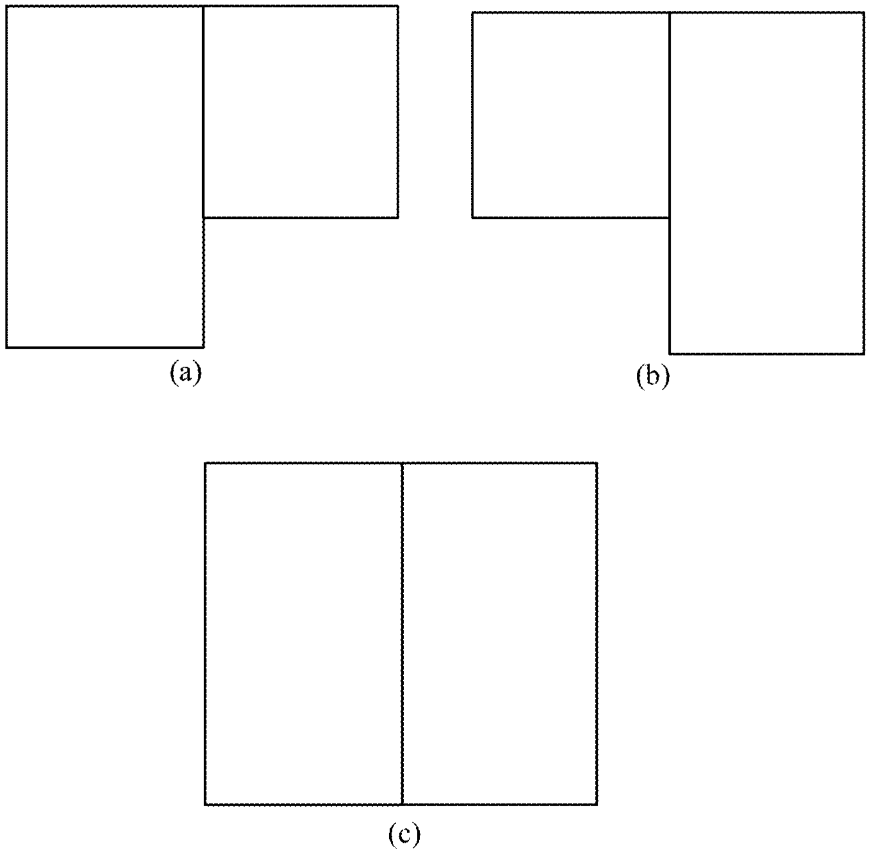
FIG. 15A to FIG. 15E are schematic diagrams of splicing operations of a scrolling screenshot method according to an embodiment of this application.

For example, as shown in FIG. 15A, FIG. 15A shows three cases of obtaining a column-wise screenshot image in a two-column interface. (a) A column-wise screenshot image of a display area on a left side is longer than a column-wise screenshot image of a display area on a right side. (b) A column-wise screenshot image of a display area on a left side is shorter than a column-wise screenshot image of a display area on a right side. (c) A column-wise screenshot image of a display area on a left side is the same as a column-wise screenshot image of a display area on a right side.

For the case (a) in FIG. 15A, the electronic device 100 may mark the column-wise screenshot image on the left side as a long column-wise screenshot image, and mark the column-wise screenshot image on the right side as a short column-wise screenshot image. The electronic device 100 may align tops of the two pictures, to obtain a to-be-filled area of the short column-wise screenshot image.

For the case (c) in FIG. 15A, the electronic device 100 may mark the column-wise screenshot image on the left side as a long column-wise screenshot image, and mark the column-wise screenshot image on the right side as a long column-wise screenshot image. When detecting that there is no short column-wise screenshot image, the electronic device 100 may skip operation S1009 and operation S1010, and directly perform operation S1011. The electronic device 100 may splice the two long column-wise screenshot images left and right to obtain a long screenshot image.

After the electronic device 100 obtains the long column-wise screenshot image and the short column-wise screenshot image, the electronic device 100 may calculate a difference between a length of the long column-wise screenshot image and a length of a specified short column-wise screenshot image. The electronic device 100 may obtain a size of the to-be-filled area of the specified short column-wise screenshot image by using the difference as a length and then using a width of the specified short column-wise screenshot image as a width.

Figure 15B:
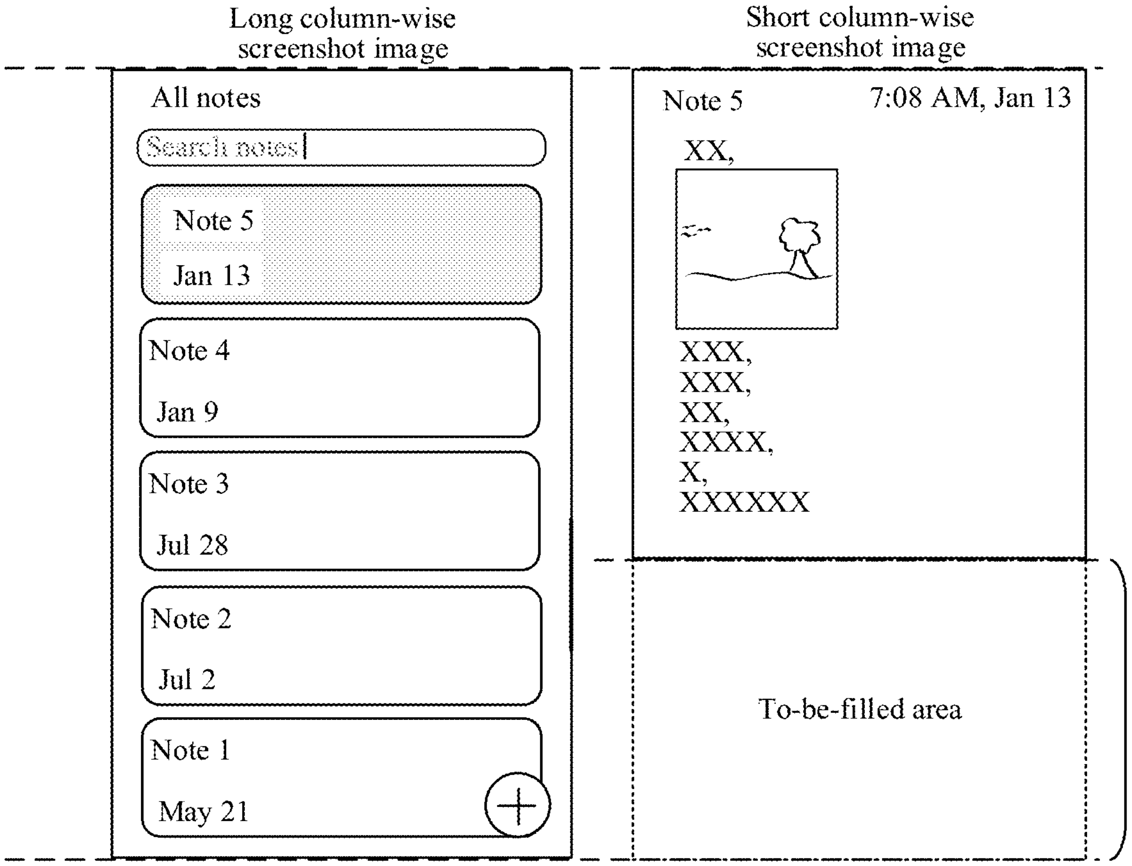

For example, as shown in FIG. 15B, the electronic device 100 obtains a long column-wise screenshot image and a short column-wise screenshot image. The electronic device 100 may measure a length (for example, 80 pixel values) of the long column-wise screenshot image and a length (for example, 50 pixel values) of the short column-wise screenshot image. The electronic device 100 may calculate a difference between lengths of the two screenshot images, and use the difference as a length of the to-be-filled area. Then, the electronic device 100 uses the width of the short column-wise screenshot image as a width of the to-be-filled area, to obtain the size of the to-be-filled area of the short column-wise screenshot image, as shown in a dashed-line box in the figure.

S1009. The electronic device 100 generates a preset background image of the short column-wise screenshot image.

The electronic device 100 may obtain the preset background image by using the following methods.

(1) The electronic device 100 may classify all pixels in the short column-wise screenshot image, classify pixels with a same color value into one type, and collect statistics on a quantity of pixels of each type. The electronic device 100 may generate the preset background image by using color values of a largest quantity of pixels.

(2) The electronic device 100 may calculate an average value of color values of all pixels of the short column-wise screenshot image, and generate the preset background image by using the average value.

(3) The electronic device 100 may randomly obtain some pixels of the short column-wise screenshot image. Then, an average value of color values of the pixels is calculated, and the preset background image is generated by using the average value.

(4) The electronic device 100 may detect a font in the short column-wise screenshot image, remove a font area, and generate the preset background image by using any one of the foregoing three methods.

(5) The electronic device 100 may generate the preset background image by using a fixed color (for example, white or a transparent color).

(6) The electronic device 100 may generate the preset background image by using a random color (for example, black).

(7) The electronic device 100 may generate a background color table (which may include white, gray, and the like), and the electronic device 100 generates the preset background image by using a color in the background color table randomly, or the electronic device 100 may display the background color table, and a user selects a color for generating the preset background image.

(8) The electronic device 100 may detect a font area of the short column-wise screenshot image, the electronic device 100 may fill the font area based on texture around the font area, to obtain a background image of the short column-wise screenshot image, and the electronic device 100 may crop or splice the background image to obtain a picture whose size is the same as that of the to-be-filled area, and use the picture as the preset background image.

A size of the preset background image generated by using the method (1) to the method (8) is the same as the size of the to-be-filled area.

S1010. The electronic device 100 may splice the preset background image at the bottom of the short column-wise screenshot image, to obtain a filled screenshot image.

The electronic device 100 may obtain the preset background images of all the short column-wise screenshot images by performing operations S1008 and S1009. The electronic device 100 may splice a preset background image corresponding to the short column-wise screenshot image at the bottom of the short column-wise screenshot image, to obtain a filled screenshot image whose length is consistent with the length of the long column-wise screenshot image.

In an embodiment, after the electronic device 100 detects that the specified display area has a fixed bar, the electronic device 100 may remove a fixed bar part from all screenshot images in a deduplication and splicing process. After the electronic device 100 obtains the filled screenshot image, the electronic device 100 splices a picture of a fixed bar part corresponding to the long column-wise screenshot image at the bottom of the long column-wise screenshot image, to obtain a long column-wise screenshot image including the fixed bar. A picture of a fixed bar part corresponding to the short column-wise screenshot image is spliced at the bottom of a filled screenshot image obtained after the preset background image and the short column-wise screenshot image are spliced, to obtain a filled screenshot image including the fixed bar.

Figure 15C:
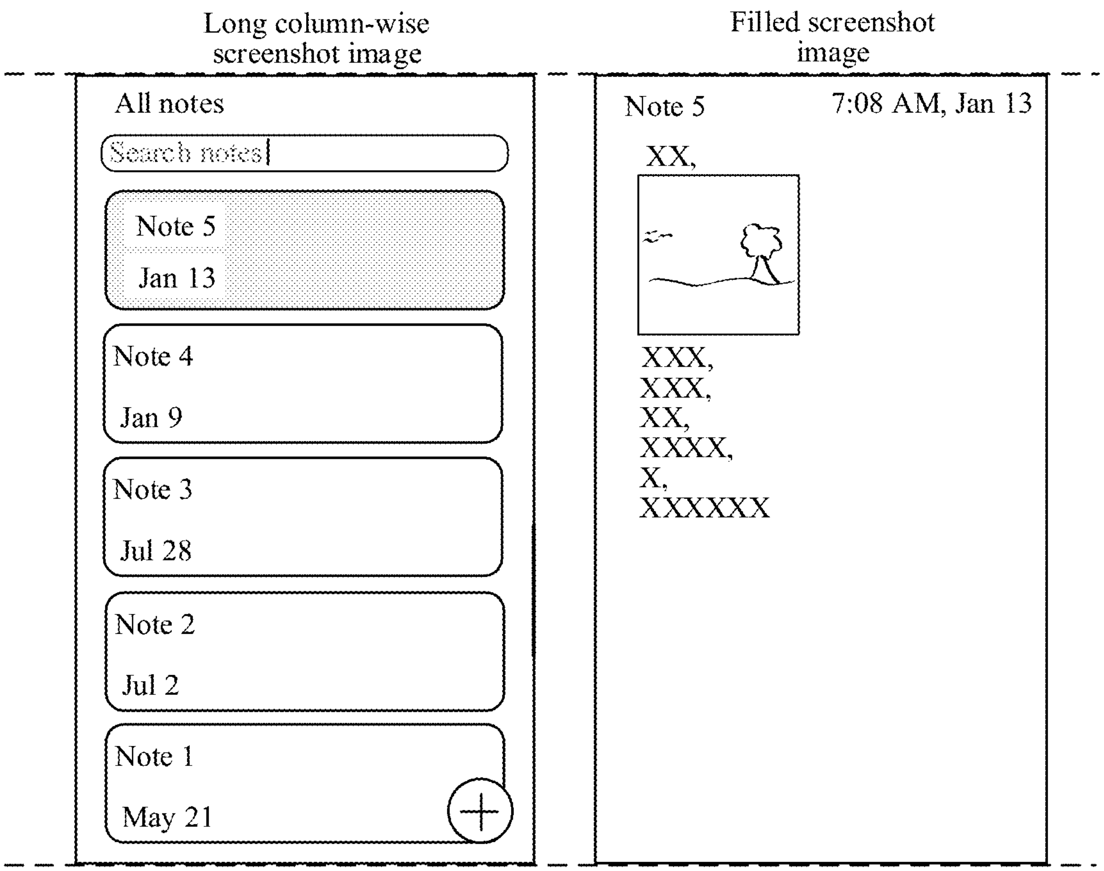

For example, after splicing the preset background image at the bottom of the short column-wise screenshot image in FIG. 15B, the electronic device 100 may obtain a filled screenshot image shown in FIG. 15C. A length of the filled screenshot image is the same as that of the long column-wise screenshot image. The electronic device 100 may splice the fixed bar 313 shown in FIG. 3A and FIG. 3B at the bottom of the long column-wise screenshot image, to obtain a long column-wise screenshot image including the fixed bar shown in FIG. 15D. The electronic device 100 may splice the fixed bar 323 shown in FIG. 3A and FIG. 3B at the bottom of the short column-wise screenshot image, to obtain a filled screenshot image including the fixed bar shown in FIG. 15D.

In an embodiment, the electronic device 100 detects that the display area has a fixed bar, and the electronic device 100 may first separate a fixed bar part from other parts of all column-wise screenshot images, to obtain separate fixed bar images and separate non-fixed bar images, and record a correspondence between the fixed bar images and the non-fixed bar images. Then, a longest image in the non-fixed bar images is used as a standard, and the preset background image is spliced at the bottom of the other non-fixed bar images until a length of the non-fixed bar image is the same as that of the longest image. Finally, the electronic device 100 splices a corresponding fixed-bar image at the bottom of the longest image in the non-fixed bar images to obtain a long column-wise screenshot image, and the electronic device 100 splices a corresponding fixed-bar image at the bottom of a non-fixed-bar image spliced with the preset background image, to obtain a filled screenshot image.

In an embodiment, the electronic device 100 detects that the specified display area has a fixed bar, and the electronic device 100 may first separate a fixed bar part from other parts of all short column-wise screenshot images, to obtain separate fixed bar images and separate non-fixed bar images, and record a correspondence between the fixed bar images and the non-fixed bar images. The electronic device 100 splices the preset background image between a corresponding fixed bar image and a corresponding non-fixed bar image by using the long column-wise screenshot image as a standard, to obtain a filled screenshot image whose length is the same as that of the long column screenshot.

In an embodiment, the electronic device 100 detects that the specified display area has a fixed bar, and the electronic device 100 may compare lengths of column-wise screenshot images including a fixed bar part, where a longest column-wise screenshot image is referred to as a long column-wise screenshot image, and another column-wise screenshot image is referred to as a short column-wise screenshot image, and splice the preset background image at the bottom of the short column-wise screenshot image to obtain a filled screenshot image.

Figure 16A:
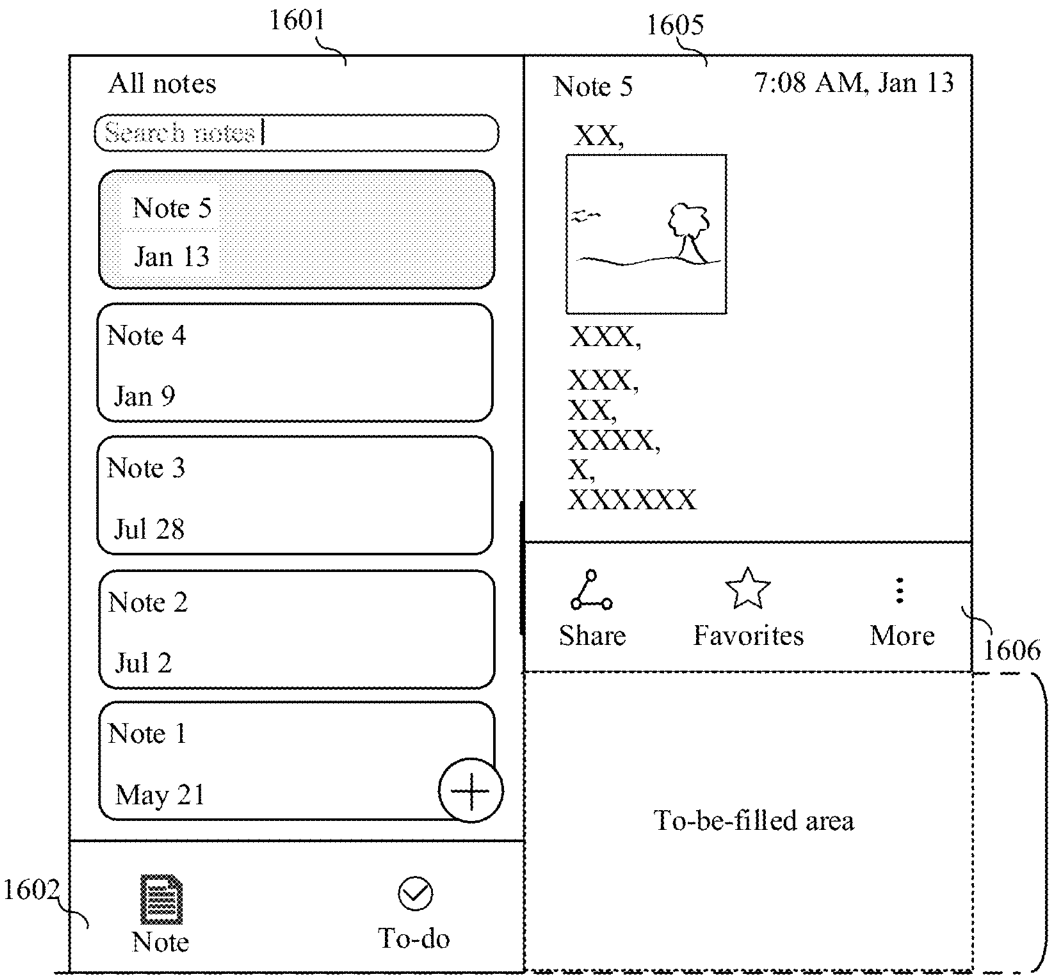
FIG. 16A to FIG. 16C are schematic diagrams of splicing operations of another scrolling screenshot method according to an embodiment of this application.
Figure 16B:
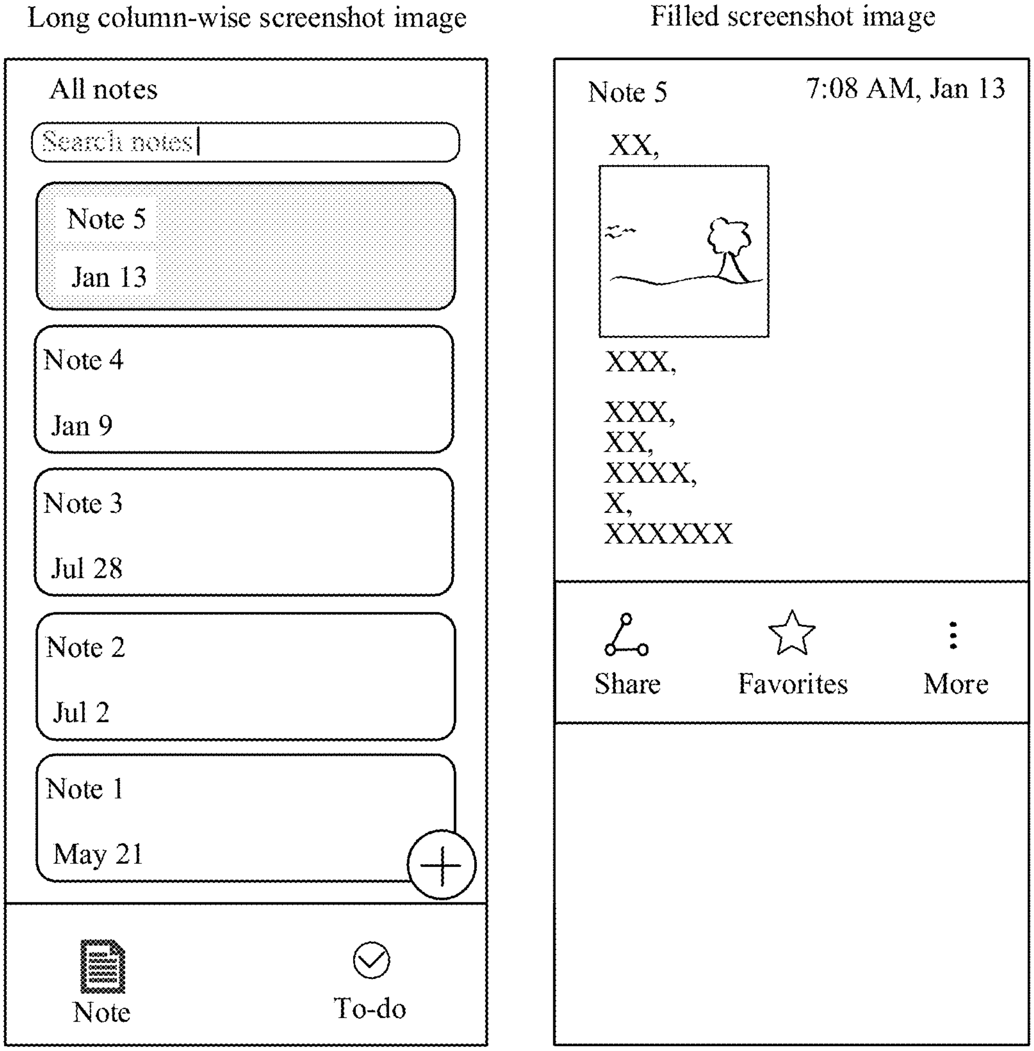

For example, as shown in FIG. 16A, after performing operation S1001 to operation S1009, the electronic device 100 obtains two column-wise screenshot images including a fixed bar, namely, a long column-wise screenshot image 1601 and a short column-wise screenshot image 1605. The long column-wise screenshot image 1601 includes a fixed bar part image 1602. The short column-wise screenshot image 1605 includes a fixed bar part image 1606. The electronic device 100 may splice the preset background image at the bottom of the short column-wise screenshot image 1605, to obtain a filled screenshot image, as shown in FIG. 16B.

In an embodiment, the electronic device 100 detects that a multiple-column interface includes a status bar, and the electronic device 100 may process the status bar with reference to a manner of processing the fixed bar by the electronic device 100 in the foregoing embodiments. Alternatively, after obtaining the filled screenshot image and the long column-wise screenshot image, the electronic device 100 may splice, on the top of the filled screenshot image, a picture of a part of the status bar that is on the top of the filled screenshot image, and splice, on the top of the long column-wise screenshot image, a picture of a part of the status bar that is on the top of long column-wise screenshot image.

S1011. The electronic device 100 splices the long column-wise screenshot image and the filled screenshot image, to obtain a long screenshot image.

The electronic device 100 may splice the long column-wise screenshot image and the filled screenshot image into one long screenshot image based on a relative position of the display area.

In an embodiment, the electronic device 100 detects that the multi-column interface includes a status bar, and after splicing the filled screenshot image and the long column-wise screenshot image together, the electronic device 100 may splice a complete picture of the status bar on top of the filled screenshot image and the long column-wise screenshot image that are spliced.

Figure 15D:
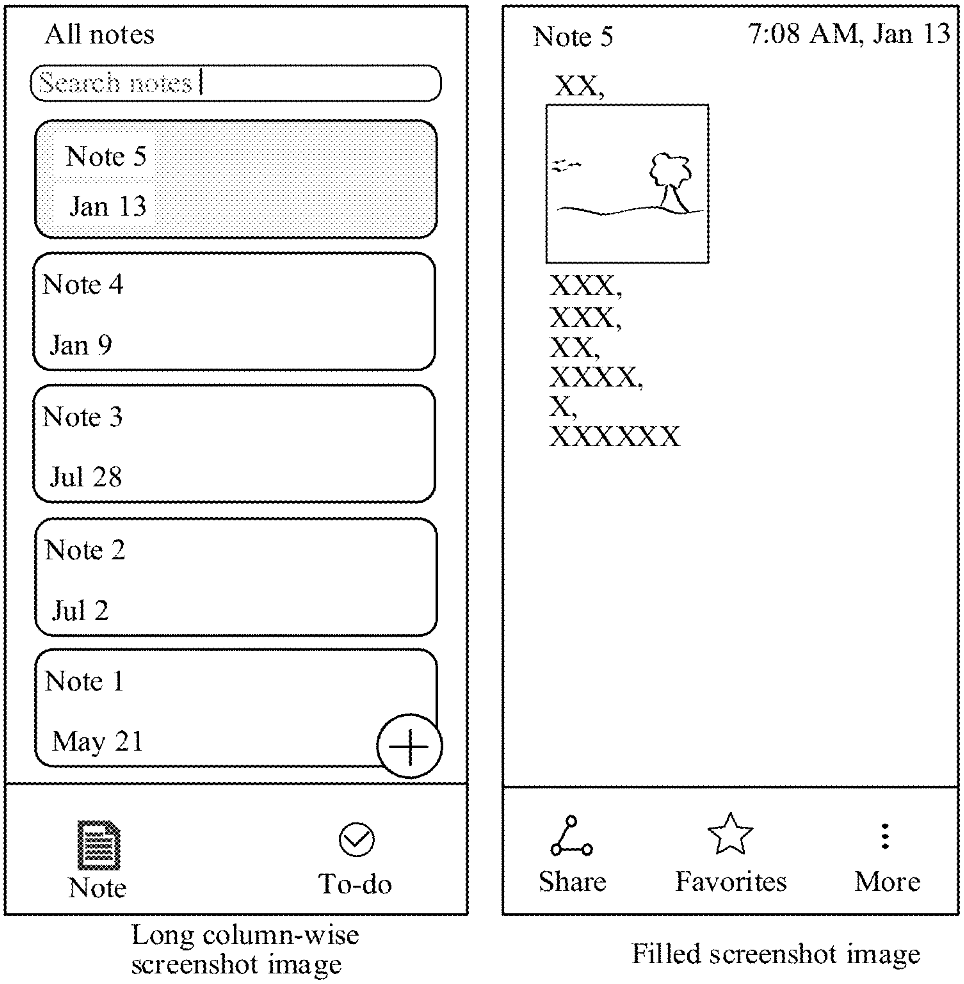
Figure 15E:
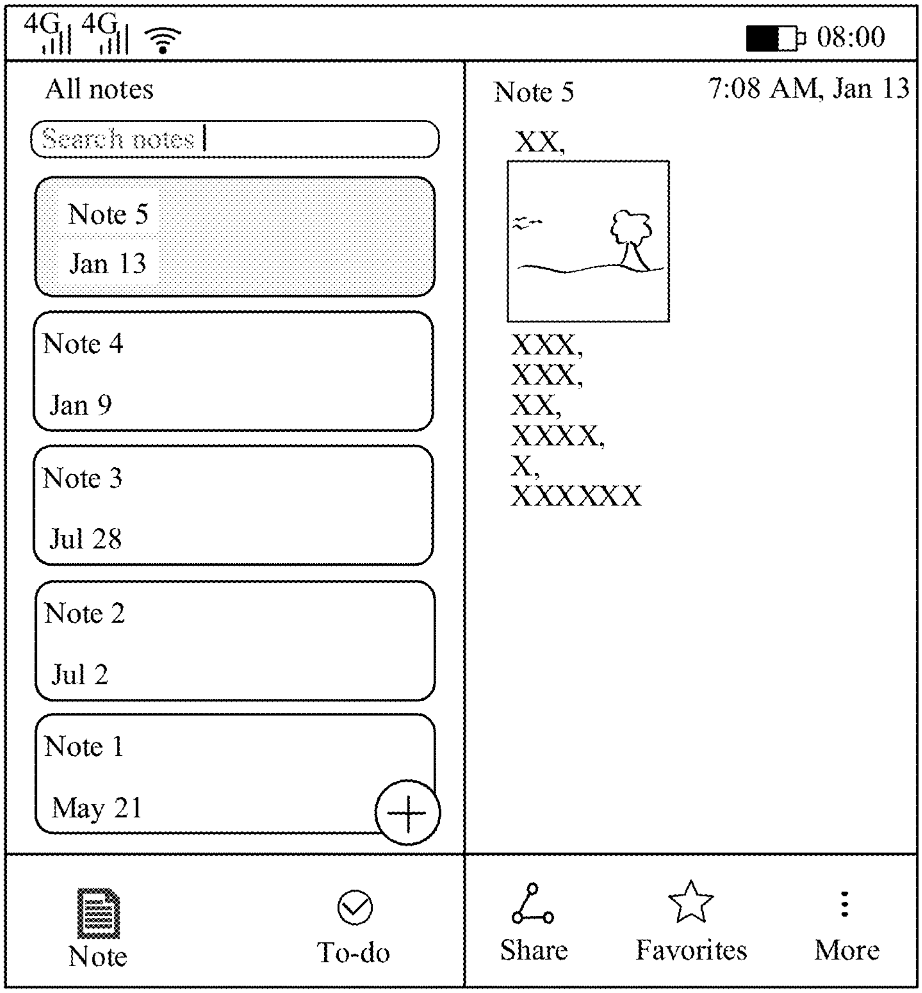

For example, as shown in FIG. 15E, after the electronic device 100 performs operation S1001 to operation S1010, the long column-wise screenshot image and the filled screenshot image shown in FIG. 15D are obtained. The electronic device 100 may splice the long column-wise screenshot image and the filled screenshot image left and right, and then splice the status bar 302 shown in FIG. 3A and FIG. 3B on the top of an image obtained by splicing the long column-wise screenshot image and the filled screenshot image left and right, to obtain the long screenshot image shown in FIG. 15E.

Figure 16C:
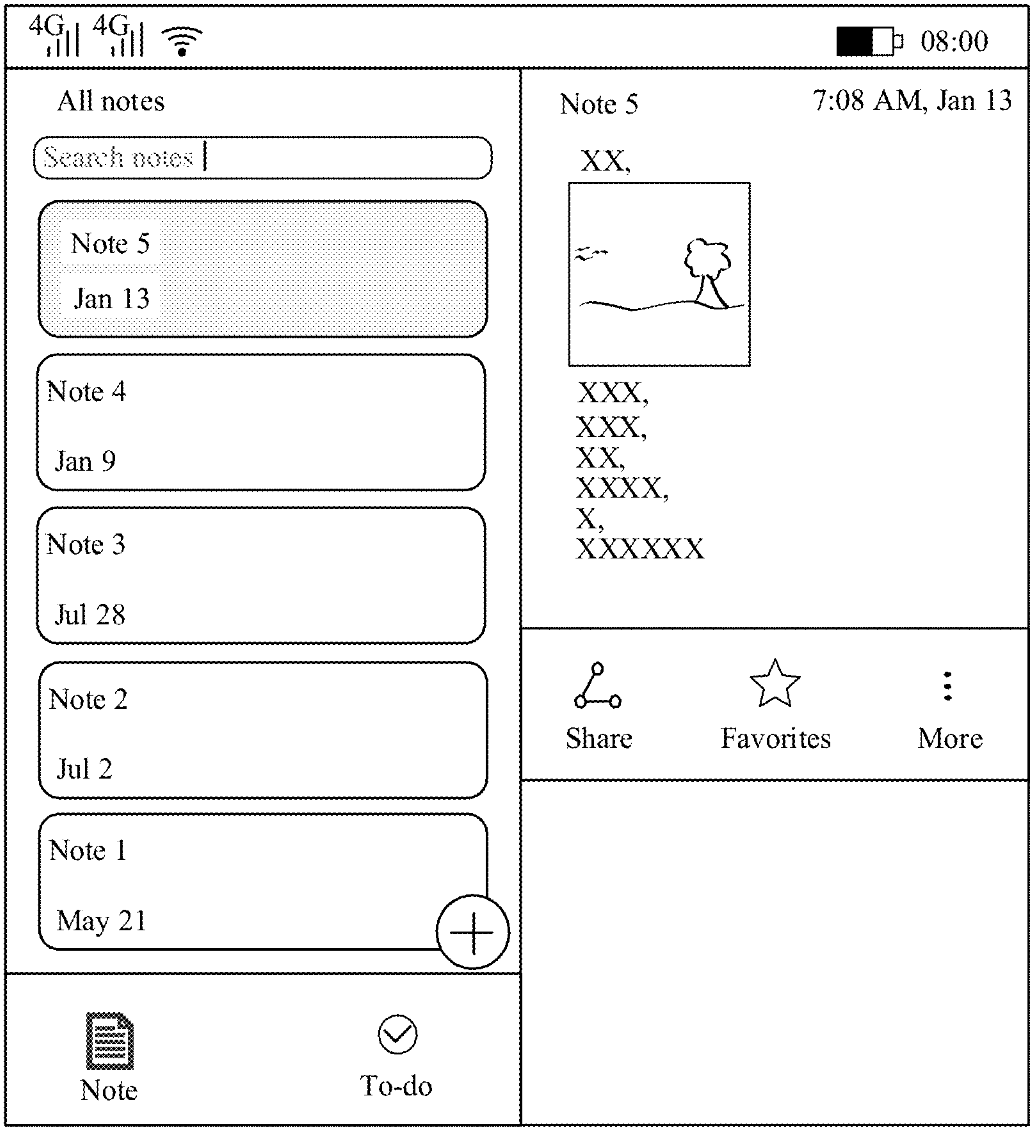

For example, as shown in FIG. 16C, after the electronic device 100 performs operation S1001 to operation S1010, the long column-wise screenshot image and the filled screenshot image shown in FIG. 16B are obtained. The electronic device 100 may splice the long column-wise screenshot image and the filled screenshot image left and right, and then splice the status bar 302 shown in FIG. 3A and FIG. 3B on the top of an image obtained by splicing the long column-wise screenshot image and the filled screenshot image left and right, to obtain the long screenshot image shown in FIG. 16C.

After receiving some operations (for example, sliding down with three fingers) by the user, the electronic device 100 may perform, in response to the operations, a scrolling screenshot operation on a currently displayed interface of the electronic device 100 by using the scrolling screenshot method provided in embodiments of this application. The electronic device 100 may obtain a suspected column line and a scrollable page element of the currently displayed interface. Then, the electronic device 100 may obtain an actual column line through verification, and determine whether the current display interface is a multi-column interface. After the electronic device 100 determines that the current interface is a multi-column interface, the electronic device 100 may separately take a scrolling screenshot of each display area of the multi-column interface, and deduplicate and splice a plurality of obtained screenshot images, to obtain a final long screenshot image. Content of the long screenshot image is complete and does not include a repeatedly displayed area.

In an embodiment, when the electronic device 100 detects that the multi-column interface has a plurality of suspected column lines, when determining whether a specified suspected column line is an actual column line, the electronic device 100 enables long pages of all scrolling windows on a first side of the specified suspected column line to scroll by a distance. Then, change boundary coordinates are obtained by comparing pixels column by column. In an embodiment, to increase accuracy of change boundary coordinates obtained by the electronic device 100, the electronic device 100 may control all the long pages on the first side of the suspected column line to scroll for a plurality of times, take a screenshot of interfaces currently displayed by the electronic device 100 before and after the scrolling, to obtain a plurality of screenshot images, and compare the plurality of screenshot images in a pairwise manner to obtain a plurality of change boundary coordinates. Then, the electronic device 100 selects leftmost and rightmost change boundary coordinates from all the change boundary coordinates as final change boundary coordinates.

In an embodiment, the electronic device 100 displays a first interface, where the first interface includes a first scrolling window: a second scrolling window, and a third scrolling window. The first scrolling window displays a first part of a first page, the second scrolling window displays a second part of a second page, and the third scrolling window displays a ninth part of a third page. The electronic device 100 controls, after the electronic device 100 receives a first input for screenshot, the first scrolling window to display a third part of the first page, the second scrolling window to display a fourth part of the second page, and the third scrolling window to display a tenth part of the third page. The electronic device 100 obtains a first long screenshot image, where the first long screenshot image includes the first part and the third part of the first page, the second part and the fourth part of the second page, and the ninth part and the tenth part of the third page. The first part, the second part, the third part, the fourth part, the ninth part, and the tenth part are different from each other.

For example, when the electronic device 100 detects that the displayed interface is a three-column interface (for example, the interface 1700 shown in FIG. 17) or an M-column interface (where M is a positive integer greater than 3, for example, M is 4), the electronic device 100 may perform a scrolling screenshot operation on the multi-column interface by using the method provided in embodiments of this application.

For example, the electronic device 100 may perform a scrolling screenshot operation on pages of three display areas, to obtain three column-wise screenshot images. Then, the electronic device 100 may splice the three column-wise screenshot images together based on relative positions of the scrolling window: to obtain a long screenshot image.

In an embodiment, the electronic device 100 displays a second interface, where the second interface includes a first display area and a second display area. The first display area displays a fourth page, the second display area includes a fourth scrolling window; and the fourth scrolling window displays an eleventh part of a fifth page. After the electronic device 100 receives a sixth input performed by a user for screenshot, the electronic device 100 captures the fourth page displayed in the first display area to obtain a third column-wise screenshot image, and captures the eleventh part of the fifth page displayed in the fourth scrolling window to obtain an eleventh image. The electronic device 100 controls the fourth scrolling window to display a twelfth part of the fifth page, and the electronic device 100 captures the twelfth part displayed in the fourth scrolling window to obtain a twelfth image. The electronic device 100 obtains a fourth column-wise screenshot image through synthesis, where the fourth column-wise screenshot image includes the eleventh image and the twelfth image. The electronic device 100 splices the third column-wise screenshot image and the fourth column-wise screenshot image to obtain a second long screenshot image.

For example, when the electronic device 100 detects that the displayed second interface includes the fourth scrolling window, the fourth page is further displayed on a left side or a right side of the fourth scrolling window. The electronic device 100 may obtain, by using the scrolling screenshot method provided in embodiments of this application, a screenshot image including all content of the fifth page and all content of the fourth page.

In an embodiment, the electronic device 100 may use the method provided in embodiments of this application to perform a scrolling screenshot operation on an interface (for example, the interface 1800 shown in FIG. 18) with upper and lower columns. When the electronic device 100 obtains a horizontal suspected column line, the electronic device 100 may connect target rectangular frames with a same vertical coordinate by using a horizontal line, to obtain the suspected column line. Similarly, the electronic device 100 may separately take a scrolling screenshot of an upper display area and a lower display area. Finally, the electronic device 100 may directly splice a plurality of column-wise screenshot images in the display area up and down, to obtain a long screenshot image. Alternatively, the electronic device 100 may compare lengths of a plurality of column-wise screenshot images, splice a preset background image at the bottom of a short column-wise screenshot image to obtain a filled screenshot image, and then splice, in a top-to-bottom order of a display area, a long column-wise screenshot image or filled image corresponding to the display area left to right, to obtain a long screenshot image. Alternatively, the electronic device 100 may compare lengths of a plurality of column-wise screenshot images, splice a preset background image at the bottom of a short column-wise screenshot image to obtain a filled screenshot image, and then splice, in a bottom-to-top order of a display area, a long column-wise screenshot image or filled image corresponding to the display area left to right, to obtain a long screenshot image.

The following describes a procedure of a scrolling screenshot method provided in an embodiment of this application.

Figure 19:
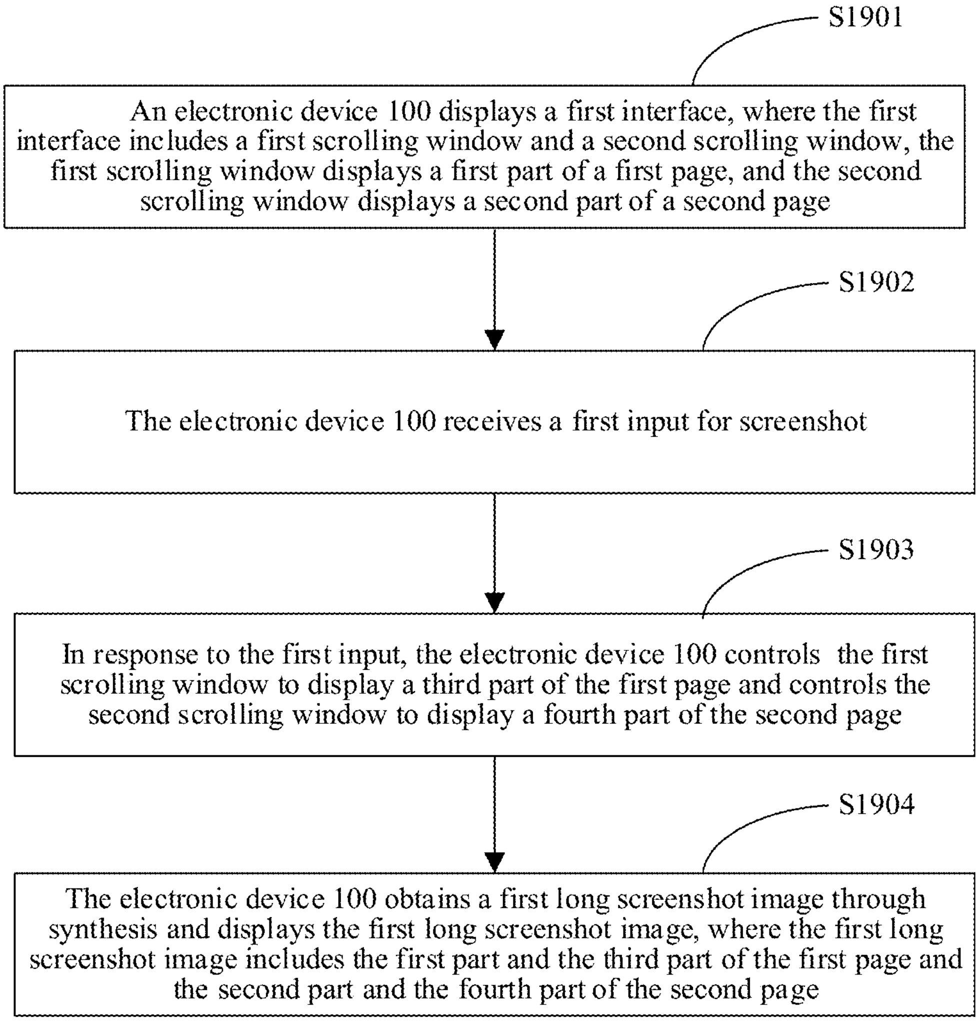
FIG. 19 is a schematic flowchart of a scrolling screenshot method according to an embodiment of this application.

FIG. 19 is a schematic flowchart of a scrolling screenshot method according to an embodiment of this application.

S1901. An electronic device 100 displays a first interface, where the first interface includes a first scrolling window and a second scrolling window; the first scrolling window displays a first part of a first page, and the second scrolling window displays a second part of a second page.

Figure 17:
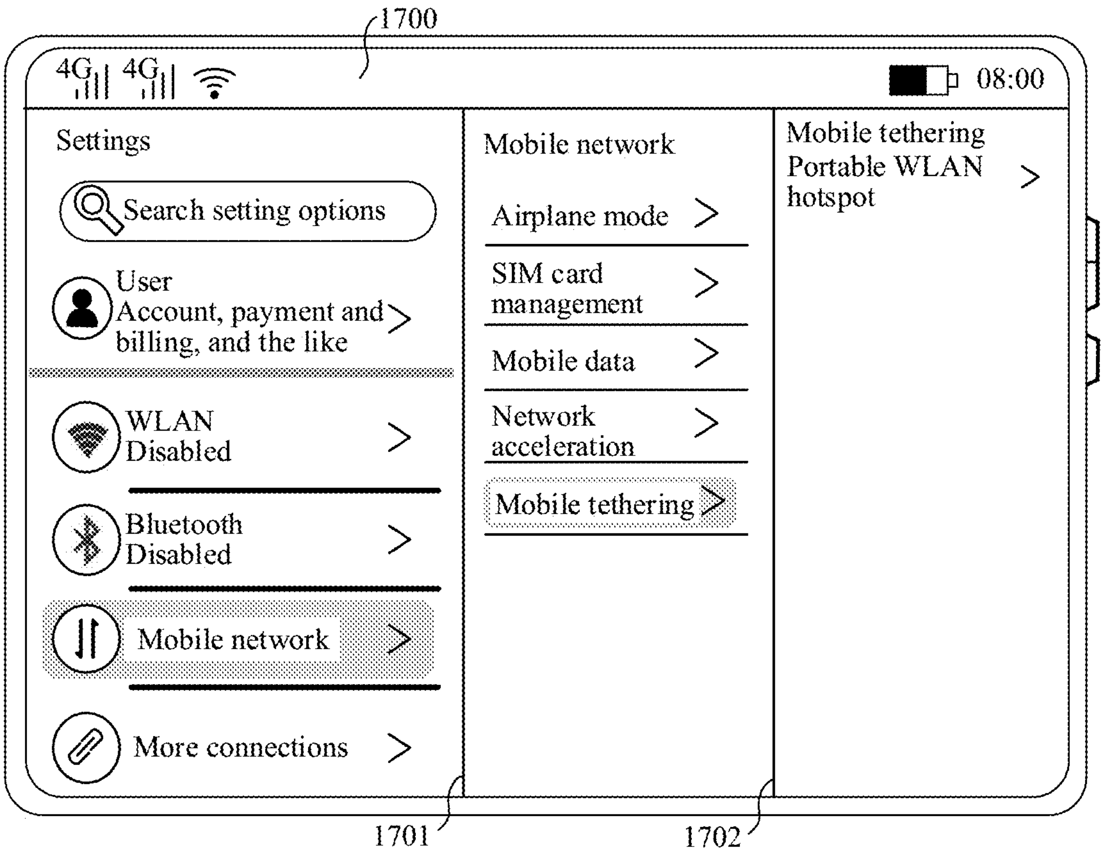
FIG. 17 is a schematic diagram of another group of interfaces according to an embodiment of this application.
Figure 18:
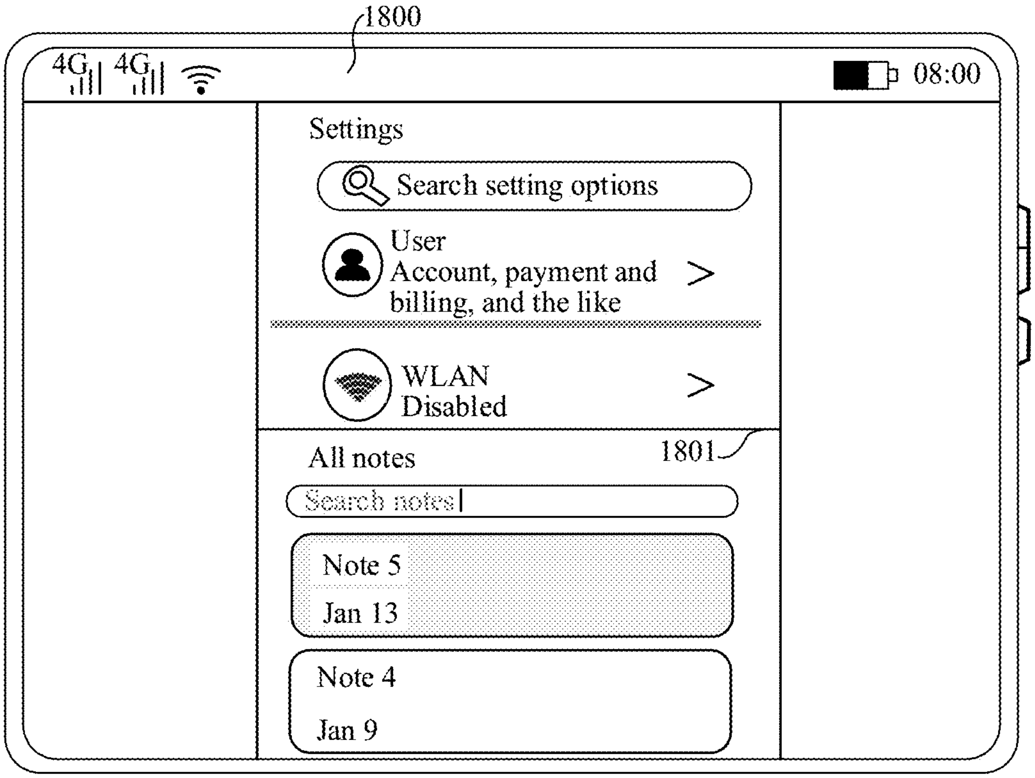
FIG. 18 is a schematic diagram of another group of interfaces according to an embodiment of this application.

In an embodiment, the first interface is the multi-column interface, for example, a setting application interface 10 shown in FIG. 1A, a memo application interface 420 shown in FIG. 4B, a setting application interface 1700 shown in FIG. 17, and a split-screen interface 1800 shown in FIG. 18.

For example, the first scrolling window may be obtained by using the operations provided in the embodiments in FIG. 11A to FIG. 11C, FIG. 12A, and FIG. 12B, and the first scrolling window may be the scrolling window 422 shown in FIG. 4B.

The first page may be the long page 314 shown in FIG. 3A and FIG. 3B or the page 424 shown in FIG. 4B. The first scrolling window can display only a part of the first page. For the first part, refer to a part of content of the page 424 displayed in the scrolling window 422 shown in FIG. 4B.

Similarly, the second scrolling window may be obtained by using the operations provided in the embodiments in FIG. 11A to FIG. 11C, FIG. 12A, and FIG. 12B, and the second scrolling window may be the scrolling window 432 shown in FIG. 4B. The second page may be the long page 324 shown in FIG. 3A and FIG. 3B or the page 434 shown in FIG. 4B. The second scrolling window can display only a part of the second page. For the second part, refer to a part of content of the page 434 displayed in the scrolling window 432 shown in FIG. 4B.

S1902. The electronic device 100 receives a first input for screenshot.

S1903. In response to the first input, the electronic device 100 controls the first scrolling window to display a third part of the first page and controls the second scrolling window to display a fourth part of the second page.

The first input is not limited to single-tapping, double-tapping, touching and holding, sliding, voice instruction input, and the like. The first input may be a set of user operations. For example, the first input may be a user operation shown in FIG. 4B to FIG. 4D, that is, pressing a volume "–" button and a power button, and sliding down at the floating window 411. For example, the first input may be sliding down with three fingers or tapping with a knuckle and drawing a specified pattern on a screen.

The third part may be a part of content of the page 424 displayed in the scrolling window 422 shown in FIG. 4E, or may be a part of content of the page 424 displayed in the scrolling window 422 shown in FIG. 4F, or may be a part of content of the page 424 displayed in the scrolling window 422 shown in FIG. 4I, or the like. For an entire process in which the electronic device 100 controls the first scrolling window to display the third part of the first page, refer to the embodiments shown in FIG. 4E to FIG. 4I.

The fourth part may be a part of content of the page 434 displayed in the scrolling window 432 shown in FIG. 4I, or may be a part of content of the page 434 displayed in the scrolling window 432 shown in FIG. 4J, or may be a part of content of the page 434 displayed in the scrolling window 432 shown in FIG. 4K, or the like. For an entire process in which the electronic device 100 controls the second scrolling window to display the fourth part of the second page, refer to the embodiments shown in FIG. 4I to FIG. 4K.

S1904: The electronic device 100 obtains a first long screenshot image through synthesis and displays a first long screenshot image, where the first long screenshot image includes the first part and the third part of the first page and the second part and the fourth part of the second page.

In an embodiment, for a detailed operation that the electronic device 100 obtains the first long screenshot image through synthesis and displays the first long screenshot image, refer to the embodiment in 10. First, the electronic device 100 may identify positions of the first scrolling window and the second scrolling window on the first interface, to obtain a first column-wise screenshot image and a second column-wise screenshot image respectively. The first column-wise screenshot image includes all content of the first page, and the second column-wise screenshot image includes all content of the second page. The electronic device 100 may splice the first column-wise screenshot image and the second column-wise screenshot image based on the relative positions of the first scrolling window and the second scrolling window. In addition, the electronic device 100 may measure lengths of the first column-wise screenshot image and the second column-wise screenshot image, and splice a preset background image at the bottom/top of a shorter image until the first column-wise screenshot image and the second column-wise screenshot image are the same in length.

In an embodiment, when other page elements (for example, a fixed bar and a status bar) exist in a preset direction (for example, above or below) of the first scrolling window and/or the second scrolling window; the electronic device 100 may splice the other page elements in the preset direction of the first column-wise screenshot image and the second column-wise screenshot image when synthesizing the first column-wise screenshot image and the second column-wise screenshot image. Alternatively, when obtaining the first long screenshot image through synthesis, the electronic device 100 may splice the other page elements in the preset direction of the first column-wise screenshot image and the second column-wise screenshot image. For detailed descriptions, refer to the embodiments in FIG. 15A to FIG. 15E and FIG. 16A to FIG. 16C.

The first long screenshot image may include all content of the first page and the second page. The first long screenshot image may be the long screenshot image 492 shown in FIG. 4L. The long screenshot image 492 includes all content of the page 424 and the page 434.

In an embodiment, the electronic device 100 receives a second input performed by the user, and the electronic device 100 may control the second scrolling window to display the fourth part of the second page in response to the second input. The second input may be dragging, single-tapping, or the like. For example, the second input may be a single-tap operation on the display area 511 in FIG. 5A.

In an embodiment, the electronic device 100 receives a third input performed on the first interface, and the electronic device 100 may obtain the first long screenshot image through synthesis and display the first long screenshot image in response to the third input. The third input may be dragging, single-tapping, or the like. For example, the third input may be a single-tap operation on the display area 521 in FIG. 5C.

In an embodiment, the first interface includes a third scrolling window; where the third scrolling window displays a third page, and the third scrolling window may be a leftmost scrolling window shown in FIG. 17. The electronic device 100 may obtain a long screenshot image of all interface content including the third page.

In an embodiment, an interface displayed by the electronic device 100 includes only one scrolling window: As shown in the scrolling window 13 in FIG. 1A, the electronic device 100 may obtain a long screenshot image of all interface content including a page shown in the scrolling window:

In this way, the electronic device 100 may obtain a long screenshot image including all content of the first page and the second page.

In conclusion, the foregoing embodiments are merely intended for describing the technical solutions of this application, but not for limiting this application. Although this application is described in detail with reference to the foregoing embodiments, one of ordinary skilled in the art should understand that they may still make modifications to the technical solutions described in the foregoing embodiments or make equivalent replacements to some technical features thereof, without departing from the scope of the technical solutions of embodiments of this application.

What is claimed is:

1. A scrolling screenshot method, comprising:

displaying, by an electronic device, a first interface comprising a first scrolling window and a second scrolling window, wherein the first scrolling window displays a first part of a first page, and wherein the second scrolling window displays a second part of a second page;

controlling, by the electronic device after the electronic device receives a first input for screenshot, the first scrolling window to display a third part of the first page in response to the first input;

controlling, by the electronic device, the second scrolling window to display a fourth part of the second page; and obtaining, by the electronic device, a first long screenshot image through synthesis and displaying the first long screenshot image comprising the first part and the third part of the first page and the second part and the fourth part of the second page, wherein the first part, the second part, the third part, and the fourth part are different from each other.

2. The method according to claim 1, wherein after the controlling the first scrolling window to display the third part of the first page, the method further comprises:

receiving, by the electronic device, a second input performed by a user on the first interface; and wherein the controlling the second scrolling window to display the fourth part of the second page comprises:

after receiving the second input, controlling, by the electronic device, the second scrolling window to display the fourth part of the second page in response to the second input.

3. The method according to claim 1, wherein the controlling the second scrolling window to display the fourth part of the second page comprises:

after the electronic device detects that the first scrolling window displays a bottom of the first page, controlling, by the electronic device, the second scrolling window to display the fourth part of the second page.

4. The method according to claim 1, wherein after the controlling the second scrolling window to display the fourth part of the second page, the method further comprises:

receiving, by the electronic device, a third input performed on the first interface; and wherein the obtaining the first long screenshot image through synthesis and displaying the first long screenshot image comprises:

obtaining, by the electronic device, the first long screenshot image through synthesis and displaying the first long screenshot image in response to the third input.

5. The method according to claim 1, wherein the obtaining the first long screenshot image through synthesis and displaying the first long screenshot image comprises:

after the electronic device detects that the second scrolling window displays a bottom of the second page, obtaining, by the electronic device, the first long screenshot image through synthesis and displaying the first long screenshot image.

6. The method according to claim 1, wherein before the controlling the first scrolling window to display the third part of the first page, the method further comprises:

receiving, by the electronic device, a first drag operation of dragging the first page upward by a user; and wherein the controlling the first scrolling window to display the third part of the first page comprises:

controlling, by the electronic device, the first scrolling window to display the third part of the first page in response to the first drag operation.

7. The method according to claim 6, wherein after the controlling the first scrolling window to display the third part of the first page, the method further comprises:

controlling, by the electronic device, the first scrolling window to display a fifth part of the first page, wherein the fifth part is below the third part of the first page, and the first long screenshot image further comprises the fifth part of the first page.

8. The method according to claim 6, wherein after the controlling the first scrolling window to display the third part of the first page in response to the first drag operation, the method further comprises:

when duration in which the electronic device controls the first scrolling window to display the third part of the first page in response to the first drag operation is greater than a first preset time threshold, controlling, by the electronic device, the first scrolling window to display the first part of the first page; and controlling, by the electronic device, the first scrolling window to automatically scroll to display the third part of the first page.

9. The method according to claim 6, wherein the controlling the second scrolling window to display the fourth part of the second page comprises:

after receiving the first drag operation, controlling, by the electronic device, the second scrolling window to display the fourth part of the second page.

10. The method according to claim 1, wherein after the controlling the first scrolling window to display the third part of the first page, the method further comprises:

controlling, by the electronic device, the first scrolling window to display a fifth part of the first page, wherein the fifth part is below the third part of the first page;

receiving, by the electronic device, a second drag operation of dragging the first page downward by a user; and controlling, by the electronic device, the first scrolling window to display the third part of the first page in response to the second drag operation.

11. The method according to claim 10, wherein after the controlling the first scrolling window to display the third part of the first page in response to the second drag operation, the method further comprises:

controlling, by the electronic device, the first scrolling window to display the fifth part of the first page, wherein the first long screenshot image further comprises the fifth part of the first page.

12. The method according to claim 10, wherein after the controlling the first scrolling window to display the third part of the first page in response to the second drag operation, the method further comprises:

when duration in which the electronic device controls the first scrolling window to display the first part of the first page in response to the second drag operation is greater than a second preset time threshold, controlling, by the electronic device, the first scrolling window to display the fifth part of the first page; and controlling, by the electronic device, the first scrolling window to automatically scroll to display a seventh part of the first page, wherein the seventh part is below the fifth part of the first page, and the first long screenshot image further comprises the fifth part of the first page and the seventh part of the first page.

13. The method according to claim 10, wherein the controlling the second scrolling window to display the fourth part of the second page comprises:

after receiving the second drag operation, controlling, by the electronic device, the second scrolling window to display the fourth part of the second page.

14. The method according to claim 1, wherein before the controlling the second scrolling window to display the fourth part of the second page, the method further comprises:

receiving, by the electronic device, a third drag operation of dragging the second page upward by a user; and wherein the controlling the second scrolling window to display the fourth part of the second page comprises:

controlling, by the electronic device, the second scrolling window to display the fourth part of the second page in response to the third drag operation.

15. The method according to claim 14, wherein after the controlling the second scrolling window to display the fourth part of the second page, the method further comprises:

controlling, by the electronic device, the second scrolling window to display a sixth part of the second page, wherein the sixth part is below the fourth part of the second page, and the first long screenshot image further comprises the sixth part of the second page.

16. The method according to claim 14, wherein after the controlling the second scrolling window to display the fourth part of the second page in response to the third drag operation, the method further comprises:

when duration in which the electronic device controls the second scrolling window to display the fourth part of the second page in response to the third drag operation is greater than a third preset time threshold, controlling, by the electronic device, the second scrolling window to display the second part of the second page; and controlling, by the electronic device, the second scrolling window to automatically scroll to display the fourth part of the second page.

17. The method according to claim 14, wherein the controlling the second scrolling window to display the fourth part of the second page comprises:

after the electronic device receives the first drag operation, obtaining, by the electronic device, the first long screenshot image through synthesis and displaying the first long screenshot image.

18. The method according to claim 1, wherein after the controlling the second scrolling window to display the fourth part of the second page, the method further comprises:

controlling, by the electronic device, the second scrolling window to display a sixth part of the second page, wherein the sixth part is below the fourth part of the second page;

receiving, by the electronic device, a fourth drag operation of dragging the second page downward by a user; and controlling, by the electronic device, the second scrolling window to display the fourth part of the second page in response to the fourth drag operation.

19. An electronic device, comprising:

a processor, a display screen coupled to the processor, and a memory coupled to the processor to store instructions, which when executed by the processor, cause the electronic device to:

display a first interface, wherein the first interface comprises a first scrolling window and a second scrolling window, wherein the first scrolling window displays a first part of a first page, and wherein the second scrolling window displays a second part of a second page;

control, after the electronic device receives a first input for screenshot, the first scrolling window to display a third part of the first page in response to the first input;

control the second scrolling window to display a fourth part of the second page; and obtain a first long screenshot image through synthesis and displaying the first long screenshot image comprising the first part and the third part of the first page and the second part and the fourth part of the second page, wherein the first part, the second part, the third part, and the fourth part are different from each other.

20. A non-transitory machine-readable storage medium having instructions stored therein, which when executed by a processor, cause an electronic device to:

display a first interface, wherein the first interface comprises a first scrolling window and a second scrolling window, wherein the first scrolling window displays a first part of a first page, and wherein the second scrolling window displays a second part of a second page;

control, after the electronic device receives a first input for screenshot, the first scrolling window to display a third part of the first page in response to the first input;

control the second scrolling window to display a fourth part of the second page; and obtain a first long screenshot image through synthesis and displaying the first long screenshot image comprising the first part and the third part of the first page and the second part and the fourth part of the second page, wherein the first part, the second part, the third part, and the fourth part are different from each other.

* * * * *